United States Patent
Steinfort

(10) Patent No.: US 11,803,592 B2
(45) Date of Patent: Oct. 31, 2023

(54) METHOD, SYSTEM, AND COMPUTER PROGRAM PRODUCT FOR DEVELOPING DIALOGUE TEMPLATES FOR AN INTELLIGENT INDUSTRIAL ASSISTANT

(71) Applicant: iT SpeeX LLC, Wilmington, DE (US)

(72) Inventor: Kyle David Steinfort, Mason, OH (US)

(73) Assignee: iT SpeeX LLC, Wilmington, DE (US)

( * ) Notice: Subject to any disclaimer, the term of this patent is extended or adjusted under 35 U.S.C. 154(b) by 172 days.

(21) Appl. No.: 16/786,105

(22) Filed: Feb. 10, 2020

(65) Prior Publication Data

US 2020/0257734 A1 Aug. 13, 2020

Related U.S. Application Data

(60) Provisional application No. 62/802,970, filed on Feb. 8, 2019.

(51) Int. Cl.
*G06F 16/9032* (2019.01)
*G06F 9/451* (2018.01)
(Continued)

(52) U.S. Cl.
CPC ... *G06F 16/90332* (2019.01); *G05B 23/0216* (2013.01); *G06F 3/0484* (2013.01);
(Continued)

(58) Field of Classification Search
CPC ...... G06F 16/90332; G06F 9/453; G06F 8/34; G06F 3/0484; G06F 3/0482; G06F 9/451; G06F 3/167; G06F 40/35; G06F 40/186; G06F 16/3329; G05B 23/0216; H04M 2201/42; H04M 3/493; G10L 15/22
See application file for complete search history.

(56) References Cited

U.S. PATENT DOCUMENTS 4,462,080 A 7/1984 Johnstone et al.
6,510,411 B1 1/2003 Norton et al.
(Continued)

FOREIGN PATENT DOCUMENTS

CN 100470420 C 3/2009
EP 1973072 A1 9/2008
(Continued)

*Primary Examiner* — Rami R Okasha
(74) *Attorney, Agent, or Firm* — The Webb Law Firm

(57) ABSTRACT

Provided is a method for developing at least one dialogue template for an intelligent industrial assistant. The method may include receiving first group identification data associated with a first group of features. First feature identification data associated with a first feature of the first group of features may be received. First sequence identification data associated with a first sequence performable by an intelligent industrial assistant based on the first feature may be received. Expected dialogue data associated with expected dialogue of the first sequence may be received. Action data associated with at least one action of the first sequence may be received. A first dialogue template based on the first group identification data, the first feature identification data, the first sequence identification data, the expected dialogue data, and the action data may be generated. A system and computer program product are also disclosed.

15 Claims, 25 Drawing Sheets

(51) Int. Cl.
*G06F 8/34* (2018.01)
*G06F 3/0484* (2022.01)
*G05B 23/02* (2006.01)

(52) U.S. Cl.
CPC ............... *G06F 8/34* (2013.01); *G06F 9/451* (2018.02); *G06F 9/453* (2018.02)

(56) References Cited

U.S. PATENT DOCUMENTS

| | | | |
|---|---|---|---|
| 6,757,362 | B1 | 6/2004 | Cooper et al. |
| 6,895,380 | B2 | 5/2005 | Sepe, Jr. |
| 6,912,428 | B2 | 6/2005 | Nakai et al. |
| 7,245,990 | B2 | 7/2007 | Watanabe et al. |
| 7,920,678 | B2 | 4/2011 | Cooper et al. |
| 8,000,453 | B2 | 8/2011 | Cooper et al. |
| 8,196,155 | B2 | 6/2012 | Huang et al. |
| 9,082,239 | B2 | 7/2015 | Ricci |
| 9,826,599 | B2 | 11/2017 | Banta |
| 9,830,044 | B2 | 11/2017 | Brown et al. |
| 9,966,065 | B2 | 5/2018 | Gruber et al. |
| 10,678,406 | B1* | 6/2020 | Banfi .................. G06F 9/453 |
| 2004/0034532 | A1 | 2/2004 | Mukhopadhyay et al. |
| 2005/0005266 | A1 | 1/2005 | Datig |
| 2009/0055692 | A1* | 2/2009 | Kroupnova ........ G05B 23/00 718/1 |
| 2012/0221998 | A1* | 8/2012 | Rowley .................. G06F 8/34 717/105 |
| 2012/0317038 | A1* | 12/2012 | Erbey .................. G06F 9/453 705/304 |
| 2013/0317816 | A1 | 11/2013 | Potter |
| 2014/0095543 | A1* | 4/2014 | Hsiao ............... G06F 16/24553 707/779 |
| 2014/0310127 | A1* | 10/2014 | Hoch ............... G06Q 30/0641 705/26.41 |
| 2015/0121216 | A1* | 4/2015 | Brown .................. G06N 3/008 715/707 |
| 2016/0212090 | A1* | 7/2016 | Kshirsagar ............ H04L 51/34 |
| 2016/0259767 | A1* | 9/2016 | Gelfenbeyn ........ G06F 3/0481 |
| 2017/0038763 | A1 | 2/2017 | Brown et al. |
| 2017/0068550 | A1 | 3/2017 | Zeitlin |
| 2017/0116982 | A1* | 4/2017 | Gelfenbeyn ............ G10L 15/22 |
| 2017/0278000 | A1 | 9/2017 | Kohlhepp |
| 2018/0090141 | A1* | 3/2018 | Periorellis ........... G10L 15/1815 |
| 2018/0107461 | A1* | 4/2018 | Balasubramanian ..... G06F 8/38 |
| 2018/0129484 | A1* | 5/2018 | Kannan ................ G06F 3/0482 |
| 2018/0143967 | A1* | 5/2018 | Anbazhagan ......... G10L 15/183 |
| 2018/0359198 | A1* | 12/2018 | Eidem .................. H04L 67/306 |
| 2019/0042185 | A1 | 2/2019 | Young |
| 2019/0138600 | A1* | 5/2019 | Krishnan ................ G10L 15/22 |
| 2019/0166069 | A1* | 5/2019 | Yao ........................ G06N 20/00 |
| 2019/0215283 | A1* | 7/2019 | Nahum .................... G06F 3/167 |
| 2019/0266280 | A1* | 8/2019 | Acampado ................ G06F 8/60 |

FOREIGN PATENT DOCUMENTS

| | | |
|---|---|---|
| EP | 3173983 A1 | 5/2017 |
| EP | 3185094 A1 | 6/2017 |
| EP | 3244301 A1 | 11/2017 |
| EP | 2140370 B1 | 12/2018 |
| WO | 0109724 A1 | 2/2001 |
| WO | 0156016 A1 | 8/2001 |
| WO | 2007052285 A2 | 5/2007 |
| WO | 2011163062 A2 | 12/2011 |
| WO | 2014197126 A1 | 12/2014 |

* cited by examiner

METHOD, SYSTEM, AND COMPUTER PROGRAM PRODUCT FOR DEVELOPING DIALOGUE TEMPLATES FOR AN INTELLIGENT INDUSTRIAL ASSISTANT

CROSS-REFERENCE TO RELATED APPLICATIONS

This application claims priority to U.S. Provisional Patent Application No. 62/802,970, filed Feb. 8, 2019, the disclosure of which is hereby incorporated by reference in its entirety.

BACKGROUND

1. Field

This disclosed subject matter relates generally to methods, systems, and products for an intelligent assistant and, in some particular embodiments, to a method, system, and computer program product for developing at least one dialogue template for an intelligent industrial assistant.

2. Technical Considerations

Users of certain machines (e.g., operators of industrial machines and/or the like) may be trained to use such machines. For example, each machine may be usable (e.g., controllable and/or the like) via a physical interface (e.g., keyboard, keypad, and/or the like) integrated with the machine. Such interfaces may vary based on the type of machine, e.g., based on the manufacturer, third party controller/interface provider, model, and/or the like associated with such machine.

However, training to use such interfaces may be time consuming. Additionally, manual efforts (e.g., multiple key strokes, clicks, and/or the like), time, and/or the like may be required to use (e.g., control and/or the like) such machines via such interfaces. Moreover, a user (e.g., machine operator and/or the like) may not be able to control other machines (e.g., separate industrial machine on a factory floor, newly acquired industrial machine, upgraded industrial machine, and/or the like) without separately learning (e.g., being trained on and/or the like) the interfaces of such other machines. Even if a user did know how to use multiple machines, it may require manual efforts and time to move between machines, and/or such a user may not be able to monitor multiple separate machines simultaneously. Further, if a user's hands are occupied (e.g., carrying an object, writing notes, assisting another individual on the factory floor, and/or the like), such a user may not be able to suitably manipulate the interface of the machine. In addition, if such an interface includes only visual indications of status or other information (e.g., display screen, indicator lights, and/or the like), a user may not be able to adequately be able to receive such indications of status or other information while looking elsewhere (e.g., looking at anything else that may be anywhere else on a factory floor).

Certain voice interfaces (e.g., general purpose voice interfaces) may allow a user to provide input to a computer using spoken words. However, it can be difficult to develop domain-specific commands and/or make such commands compatible with a voice interface. The difficulty can be even greater in a domain in which different users have different roles that involve different tasks and/or using different devices or machines that may not be readily connectable to a computer with a general purpose voice interface. Moreover, as tasks for users in certain roles change and/or as new devices or machines are desired to be used, it may be difficult to change and/or develop new domain-specific commands and/or make such commands compatible with a voice interface.

SUMMARY

Accordingly, it is an object of the presently disclosed subject matter to provide methods, systems, and computer program products for developing at least one dialogue template for an intelligent industrial assistant.

According to non-limiting embodiments, provided is a method for developing at least one dialogue template for an intelligent industrial assistant. In some non-limiting embodiments, a method for developing at least one dialogue template for an intelligent industrial assistant may include receiving (e.g., by a graphical user interface) first group identification data associated with a first group of features. First feature identification data associated with a first feature of the first group of features may be received (e.g., by a graphical user interface). First sequence identification data associated with a first sequence performable by an intelligent industrial assistant based on the first feature may be received (e.g., by a graphical user interface). Expected dialogue data associated with expected dialogue of the first sequence may be received (e.g., by a graphical user interface). Action data associated with at least one action of the first sequence may be received (e.g., by the graphical user interface). A first dialogue template may be generated based on the first group identification data, the first feature identification data, the first sequence identification data, the expected dialogue data, and the action data.

In some non-limiting embodiments, the first dialogue template may be added to package data for the intelligent industrial assistant. Additionally or alternatively, the package data may be communicated to the intelligent industrial assistant.

In some non-limiting embodiments, the first dialogue template may be communicated to the intelligent industrial assistant. Additionally or alternatively, the intelligent industrial assistant may add the first dialogue template to package data of the intelligent industrial assistant.

In some non-limiting embodiments, a first view of the graphical user interface may be displayed. Additionally or alternatively, the first view may include a first set of graphical elements to receive first input associated with the first group identification data and/or a second set of graphical elements to receive second input associated with the first feature identification data. In some non-limiting embodiments, receiving first group identification data may include receiving the first input via the first set of graphical elements. Additionally or alternatively, receiving first feature identification data may include receiving the second input via the second set of graphical elements.

In some non-limiting embodiments, a second view of the graphical user interface may be displayed. Additionally or alternatively, the second view may include a third set of graphical elements to receive third input associated with the first sequence identification data and/or a fourth set of graphical elements to receive fourth input associated with a portion of the expected dialogue data. For example, the portion of the expected dialogue data may include expected initiating dialogue data associated with at least one phrase for initiating the first sequence. In some non-limiting embodiments, receiving the first sequence identification data may include receiving the third input via the third set of graphical elements. Additionally or alternatively, receiving the expected dialogue data may include receiving the fourth input via the fourth set of graphical elements.

In some non-limiting embodiments, a third view of the graphical user interface may be displayed. Additionally or alternatively, the third view may include a fifth set of graphical elements to receive fifth input associated with a second portion of the expected dialogue data. For example, the second portion of the expected dialogue data may include at least one parameter of the expected dialogue data. In some non-limiting embodiments, receiving the expected dialogue data may include receiving the fifth input via the fifth set of graphical elements.

In some non-limiting embodiments, a fourth view of the graphical user interface may be displayed. Additionally or alternatively, the fourth view may include a sixth set of graphical elements to receive sixth input associated with a third portion of the expected dialogue data. For example, the third portion of the expected dialogue data may include script data based on the at least one parameter of the expected dialogue data. In some non-limiting embodiments, receiving the expected dialogue data may include receiving the sixth input via the sixth set of graphical elements.

In some non-limiting embodiments, a fifth view of the graphical user interface may be displayed. Additionally or alternatively, the fifth view may include a seventh set of graphical elements to receive seventh input associated with the action data based on the first sequence identification data and the at least one parameter of the expected dialogue data. In some non-limiting embodiments, receiving the action data may include receiving the seventh input via the seventh set of graphical elements.

In some non-limiting embodiments, wherein the action data may include at least one of an audio output of the intelligent industrial assistant, a media item for display by the intelligent industrial assistant, a tabular list for display by the intelligent industrial assistant, a report template for outputting by the intelligent industrial assistant, a machine interface for accessing by the intelligent industrial assistant, a database interface for accessing by the intelligent industrial assistant, any combination thereof, and/or the like.

In some non-limiting embodiments, the first dialogue template may be verified, e.g., as not containing errors.

In some non-limiting embodiments, language data may be received. Additionally or alternatively, the language data may be associated with at least one language associated with at least one of the group identification data, the feature identification data, the sequence identification data, any combination thereof, and/or the like.

In some non-limiting embodiments, the first dialogue template may be communicated to a remote system. Additionally or alternatively, the remote system may add the first dialogue template to package data for the intelligent industrial assistant. In some non-limiting embodiments, the remote system may communicate the package data to the intelligent industrial assistant.

According to non-limiting embodiments, provided is a system for developing at least one dialogue template for an intelligent industrial assistant. In some non-limiting embodiments, the system for developing at least one dialogue template for an intelligent industrial assistant may include at least one processor and at least one non-transitory computer readable medium, which may include instructions to direct the at least one processor to receive (e.g., by a graphical user interface) first group identification data associated with a first group of features. First feature identification data associated with a first feature of the first group of features may be received (e.g., by a graphical user interface). First sequence identification data associated with a first sequence performable by an intelligent industrial assistant based on the first feature may be received (e.g., by a graphical user interface). Expected dialogue data associated with expected dialogue of the first sequence may be received (e.g., by a graphical user interface). Action data associated with at least one action of the first sequence may be received (e.g., by the graphical user interface). A first dialogue template may be generated based on the first group identification data, the first feature identification data, the first sequence identification data, the expected dialogue data, and the action data.

In some non-limiting embodiments, the first dialogue template may be added to package data for the intelligent industrial assistant. Additionally or alternatively, the package data may be communicated to the intelligent industrial assistant.

In some non-limiting embodiments, the first dialogue template may be communicated to the intelligent industrial assistant. Additionally or alternatively, the intelligent industrial assistant may add the first dialogue template to package data of the intelligent industrial assistant.

In some non-limiting embodiments, a first view of the graphical user interface may be displayed. Additionally or alternatively, the first view may include a first set of graphical elements to receive first input associated with the first group identification data and/or a second set of graphical elements to receive second input associated with the first feature identification data. In some non-limiting embodiments, receiving first group identification data may include receiving the first input via the first set of graphical elements. Additionally or alternatively, receiving first feature identification data may include receiving the second input via the second set of graphical elements.

In some non-limiting embodiments, a second view of the graphical user interface may be displayed. Additionally or alternatively, the second view may include a third set of graphical elements to receive third input associated with the first sequence identification data and/or a fourth set of graphical elements to receive fourth input associated with a portion of the expected dialogue data. For example, the portion of the expected dialogue data may include expected initiating dialogue data associated with at least one phrase for initiating the first sequence. In some non-limiting embodiments, receiving the first sequence identification data may include receiving the third input via the third set of graphical elements. Additionally or alternatively, receiving the expected dialogue data may include receiving the fourth input via the fourth set of graphical elements.

In some non-limiting embodiments, a third view of the graphical user interface may be displayed. Additionally or alternatively, the third view may include a fifth set of graphical elements to receive fifth input associated with a second portion of the expected dialogue data. For example, the second portion of the expected dialogue data may include at least one parameter of the expected dialogue data. In some non-limiting embodiments, receiving the expected dialogue data may include receiving the fifth input via the fifth set of graphical elements.

In some non-limiting embodiments, a fourth view of the graphical user interface may be displayed. Additionally or alternatively, the fourth view may include a sixth set of graphical elements to receive sixth input associated with a third portion of the expected dialogue data. For example, the third portion of the expected dialogue data may include script data based on the at least one parameter of the expected dialogue data. In some non-limiting embodiments, receiving the expected dialogue data may include receiving the sixth input via the sixth set of graphical elements.

In some non-limiting embodiments, a fifth view of the graphical user interface may be displayed. Additionally or alternatively, the fifth view may include a seventh set of graphical elements to receive seventh input associated with the action data based on the first sequence identification data and the at least one parameter of the expected dialogue data. In some non-limiting embodiments, receiving the action data may include receiving the seventh input via the seventh set of graphical elements.

In some non-limiting embodiments, wherein the action data may include at least one of an audio output of the intelligent industrial assistant, a media item for display by the intelligent industrial assistant, a tabular list for display by the intelligent industrial assistant, a report template for outputting by the intelligent industrial assistant, a machine interface for accessing by the intelligent industrial assistant, a database interface for accessing by the intelligent industrial assistant, any combination thereof, and/or the like.

In some non-limiting embodiments, the first dialogue template may be verified, e.g., as not containing errors.

In some non-limiting embodiments, language data may be received. Additionally or alternatively, the language data may be associated with at least one language associated with at least one of the group identification data, the feature identification data, the sequence identification data, any combination thereof, and/or the like.

In some non-limiting embodiments, the first dialogue template may be communicated to a remote system. Additionally or alternatively, the remote system may add the first dialogue template to package data for the intelligent industrial assistant. In some non-limiting embodiments, the remote system may communicate the package data to the intelligent industrial assistant.

According to non-limiting embodiments, provided is a computer program product for developing at least one dialogue template for an intelligent industrial assistant. The computer program product may include at least one non-transitory computer-readable medium including one or more instructions that, when executed by at least one processor, cause the at least one processor to receive (e.g., by a graphical user interface) first group identification data associated with a first group of features. First feature identification data associated with a first feature of the first group of features may be received (e.g., by a graphical user interface). First sequence identification data associated with a first sequence performable by an intelligent industrial assistant based on the first feature may be received (e.g., by a graphical user interface). Expected dialogue data associated with expected dialogue of the first sequence may be received (e.g., by a graphical user interface). Action data associated with at least one action of the first sequence may be received (e.g., by the graphical user interface). A first dialogue template may be generated based on the first group identification data, the first feature identification data, the first sequence identification data, the expected dialogue data, and the action data.

In some non-limiting embodiments, the first dialogue template may be added to package data for the intelligent industrial assistant. Additionally or alternatively, the package data may be communicated to the intelligent industrial assistant.

In some non-limiting embodiments, the first dialogue template may be communicated to the intelligent industrial assistant. Additionally or alternatively, the intelligent industrial assistant may add the first dialogue template to package data of the intelligent industrial assistant.

In some non-limiting embodiments, a first view of the graphical user interface may be displayed. Additionally or alternatively, the first view may include a first set of graphical elements to receive first input associated with the first group identification data and/or a second set of graphical elements to receive second input associated with the first feature identification data. In some non-limiting embodiments, receiving first group identification data may include receiving the first input via the first set of graphical elements. Additionally or alternatively, receiving first feature identification data may include receiving the second input via the second set of graphical elements.

In some non-limiting embodiments, a second view of the graphical user interface may be displayed. Additionally or alternatively, the second view may include a third set of graphical elements to receive third input associated with the first sequence identification data and/or a fourth set of graphical elements to receive fourth input associated with a portion of the expected dialogue data. For example, the portion of the expected dialogue data may include expected initiating dialogue data associated with at least one phrase for initiating the first sequence. In some non-limiting embodiments, receiving the first sequence identification data may include receiving the third input via the third set of graphical elements. Additionally or alternatively, receiving the expected dialogue data may include receiving the fourth input via the fourth set of graphical elements.

In some non-limiting embodiments, a third view of the graphical user interface may be displayed. Additionally or alternatively, the third view may include a fifth set of graphical elements to receive fifth input associated with a second portion of the expected dialogue data. For example, the second portion of the expected dialogue data may include at least one parameter of the expected dialogue data. In some non-limiting embodiments, receiving the expected dialogue data may include receiving the fifth input via the fifth set of graphical elements.

In some non-limiting embodiments, a fourth view of the graphical user interface may be displayed. Additionally or alternatively, the fourth view may include a sixth set of graphical elements to receive sixth input associated with a third portion of the expected dialogue data. For example, the third portion of the expected dialogue data may include script data based on the at least one parameter of the expected dialogue data. In some non-limiting embodiments, receiving the expected dialogue data may include receiving the sixth input via the sixth set of graphical elements.

In some non-limiting embodiments, a fifth view of the graphical user interface may be displayed. Additionally or alternatively, the fifth view may include a seventh set of graphical elements to receive seventh input associated with the action data based on the first sequence identification data and the at least one parameter of the expected dialogue data. In some non-limiting embodiments, receiving the action data may include receiving the seventh input via the seventh set of graphical elements.

In some non-limiting embodiments, wherein the action data may include at least one of an audio output of the intelligent industrial assistant, a media item for display by the intelligent industrial assistant, a tabular list for display by the intelligent industrial assistant, a report template for outputting by the intelligent industrial assistant, a machine interface for accessing by the intelligent industrial assistant, a database interface for accessing by the intelligent industrial assistant, any combination thereof, and/or the like.

In some non-limiting embodiments, the first dialogue template may be verified, e.g., as not containing errors.

In some non-limiting embodiments, language data may be received. Additionally or alternatively, the language data may be associated with at least one language associated with at least one of the group identification data, the feature identification data, the sequence identification data, any combination thereof, and/or the like.

In some non-limiting embodiments, the first dialogue template may be communicated to a remote system. Additionally or alternatively, the remote system may add the first dialogue template to package data for the intelligent industrial assistant. In some non-limiting embodiments, the remote system may communicate the package data to the intelligent industrial assistant.

Further embodiments are set forth in the following numbered clauses:

Clause 1: A method for developing at least one dialogue template for an intelligent industrial assistant, comprising: receiving, by a graphical user interface, first group identification data associated with a first group of features; receiving, by the graphical user interface, first feature identification data associated with a first feature of the first group of features; receiving, by the graphical user interface, first sequence identification data associated with a first sequence performable by an intelligent industrial assistant based on the first feature; receiving, by the graphical user interface, expected dialogue data associated with expected dialogue of the first sequence; receiving, by the graphical user interface, action data associated with at least one action of the first sequence; and generating, with at least one processor, a first dialogue template based on the first group identification data, the first feature identification data, the first sequence identification data, the expected dialogue data, and the action data.

Clause 2: The method of clause 1, further comprising: adding the first dialogue template to package data for the intelligent industrial assistant; and communicating the package data to the intelligent industrial assistant.

Clause 3: The method of clauses 1 or 2, further comprising: communicating the first dialogue template to the intelligent industrial assistant, wherein the intelligent industrial assistant adds the first dialogue template to package data of the intelligent industrial assistant.

Clause 4: The method of any preceding clause, further comprising: displaying, with at least one processor, a first view of the graphical user interface, the first view comprising a first set of graphical elements to receive first input associated with the first group identification data and a second set of graphical elements to receive second input associated with the first feature identification data, wherein receiving first group identification data comprises receiving the first input via the first set of graphical elements, and wherein receiving first feature identification data comprises receiving the second input via the second set of graphical elements.

Clause 5: The method of any preceding clause, further comprising: displaying, with at least one processor, a second view of the graphical user interface, the second view comprising a third set of graphical elements to receive third input associated with the first sequence identification data and a fourth set of graphical elements to receive fourth input associated with a portion of the expected dialogue data, the portion of the expected dialogue data comprising expected initiating dialogue data associated with at least one phrase for initiating the first sequence, wherein receiving the first sequence identification data comprises receiving the third input via the third set of graphical elements, and wherein receiving the expected dialogue data comprises receiving the fourth input via the fourth set of graphical elements.

Clause 6: The method of any preceding clause, further comprising: displaying, with at least one processor, a third view of the graphical user interface, the third view comprising a fifth set of graphical elements to receive fifth input associated with a second portion of the expected dialogue data, the second portion of the expected dialogue data comprising at least one parameter of the expected dialogue data, wherein receiving the expected dialogue data further comprises receiving the fifth input via the fifth set of graphical elements.

Clause 7: The method of any preceding clause, further comprising: displaying, with at least one processor, a fourth view of the graphical user interface, the fourth view comprising a sixth set of graphical elements to receive sixth input associated with a third portion of the expected dialogue data, the third portion of the expected dialogue data comprising script data based on the at least one parameter of the expected dialogue data, wherein receiving the expected dialogue data further comprises receiving the sixth input via the sixth set of graphical elements.

Clause 8: The method of any preceding clause, further comprising: displaying, with at least one processor, a fifth view of the graphical user interface, the fifth view comprising a seventh set of graphical elements to receive seventh input associated with the action data based on the first sequence identification data and the at least one parameter of the expected dialogue data, wherein receiving the action data comprises receiving the seventh input via the seventh set of graphical elements.

Clause 9: The method of any preceding clause, wherein the action data comprises at least one of an audio output of the intelligent industrial assistant, a media item for display by the intelligent industrial assistant, a tabular list for display by the intelligent industrial assistant, a report template for outputting by the intelligent industrial assistant, a machine interface for accessing by the intelligent industrial assistant, a database interface for accessing by the intelligent industrial assistant, or a combination thereof.

Clause 10: The method of any preceding clause, further comprising verifying, with at least one processor, the first dialogue template does not contain errors.

Clause 11: The method of any preceding clause, further comprising: receiving, with at least one processor, language data associated with at least one language associated with at least one of the group identification data, the feature identification data, the sequence identification data, or a combination thereof.

Clause 12: The method of any preceding clause, further comprising: communicating the first dialogue template to a remote system, wherein the remote system adds the first dialogue template to package data for the intelligent industrial assistant.

Clause 13: The method of any preceding clause, wherein the remote system communicates the package data to the intelligent industrial assistant.

Clause 14: A system for developing at least one dialogue template for an intelligent industrial assistant, comprising: at least one processor; and at least one non-transitory computer readable medium comprising instructions to direct the at least one processor to: receive, by a graphical user interface, first group identification data associated with a first group of features; receive, by the graphical user interface, first feature identification data associated with a first feature of the first group of features; receive, by the graphical user interface, first sequence identification data associated with a first sequence performable by an intelligent industrial assistant based on the first feature; receive, by the graphical user interface, expected dialogue data associated with expected dialogue of the first sequence; receive, by the graphical user interface, action data associated with at least one action of the first sequence; and generate, with at least one processor, a first dialogue template based on the first group identification data, the first feature identification data, the first sequence identification data, the expected dialogue data, and the action data.

Clause 15: The system of clause 14, wherein the instructions further direct the at least one processor to: add the first dialogue template to package data for the intelligent industrial assistant; and communicate the package data to the intelligent industrial assistant.

Clause 16: The system of clauses 14 or 15, wherein the instructions further direct the at least one processor to: communicate the first dialogue template to the intelligent industrial assistant, wherein the intelligent industrial assistant adds the first dialogue template to package data of the intelligent industrial assistant.

Clause 17: The system of any one of clauses 14-16, wherein the instructions further direct the at least one processor to: display a first view of the graphical user interface, the first view comprising a first set of graphical elements to receive first input associated with the first group identification data and a second set of graphical elements to receive second input associated with the first feature identification data, wherein receiving first group identification data comprises receiving the first input via the first set of graphical elements, and wherein receiving first feature identification data comprises receiving the second input via the second set of graphical elements.

Clause 18: The system of any one of clauses 14-17, wherein the instructions further direct the at least one processor to: display a second view of the graphical user interface, the second view comprising a third set of graphical elements to receive third input associated with the first sequence identification data and a fourth set of graphical elements to receive fourth input associated with a portion of the expected dialogue data, the portion of the expected dialogue data comprising expected initiating dialogue data associated with at least one phrase for initiating the first sequence, wherein receiving the first sequence identification data comprises receiving the third input via the third set of graphical elements, and wherein receiving the expected dialogue data comprises receiving the fourth input via the fourth set of graphical elements.

Clause 19: The system of any one of clauses 14-18, wherein the instructions further direct the at least one processor to: display a third view of the graphical user interface, the third view comprising a fifth set of graphical elements to receive fifth input associated with a second portion of the expected dialogue data, the second portion of the expected dialogue data comprising at least one parameter of the expected dialogue data, wherein receiving the expected dialogue data further comprises receiving the fifth input via the fifth set of graphical elements.

Clause 20: The system of any one of clauses 14-19, wherein the instructions further direct the at least one processor to: display a fourth view of the graphical user interface, the fourth view comprising a sixth set of graphical elements to receive sixth input associated with a third portion of the expected dialogue data, the third portion of the expected dialogue data comprising script data based on the at least one parameter of the expected dialogue data, wherein receiving the expected dialogue data further comprises receiving the sixth input via the sixth set of graphical elements.

Clause 21: The system of any one of clauses 14-20, wherein the instructions further direct the at least one processor to: display a fifth view of the graphical user interface, the fifth view comprising a seventh set of graphical elements to receive seventh input associated with the action data based on the first sequence identification data and the at least one parameter of the expected dialogue data, wherein receiving the action data comprises receiving the seventh input via the seventh set of graphical elements.

Clause 22: The system of any one of clauses 14-21, wherein the action data comprises at least one of an audio output of the intelligent industrial assistant, a media item for display by the intelligent industrial assistant, a tabular list for display by the intelligent industrial assistant, a report template for outputting by the intelligent industrial assistant, a machine interface for accessing by the intelligent industrial assistant, a database interface for accessing by the intelligent industrial assistant, or a combination thereof.

Clause 23: The system of any one of clauses 14-22, wherein the instructions further direct the at least one processor to: verify the first dialogue template does not contain errors.

Clause 24: The system of any one of clauses 14-23, wherein the instructions further direct the at least one processor to: receive language data associated with at least one language associated with at least one of the group identification data, the feature identification data, the sequence identification data, or a combination thereof.

Clause 25: The system of any one of clauses 14-24, wherein the instructions further direct the at least one processor to: communicate the first dialogue template to a remote system, wherein the remote system adds the first dialogue template to package data for the intelligent industrial assistant.

Clause 26: The system of any one of clauses 14-25, wherein the remote system communicates the package data to the intelligent industrial assistant.

Clause 27: A computer program product for developing at least one dialogue template for an intelligent industrial assistant, the computer program product comprising at least one non-transitory computer-readable medium including one or more instructions that, when executed by at least one processor, cause the at least one processor to: receive, by a graphical user interface, first group identification data associated with a first group of features; receive, by the graphical user interface, first feature identification data associated with a first feature of the first group of features; receive, by the graphical user interface, first sequence identification data associated with a first sequence performable by an intelligent industrial assistant based on the first feature; receive, by the graphical user interface, expected dialogue data associated with expected dialogue of the first sequence; receive, by the graphical user interface, action data associated with at least one action of the first sequence; and generate, with at least one processor, a first dialogue template based on the first group identification data, the first feature identification data, the first sequence identification data, the expected dialogue data, and the action data.

Clause 28: The computer program product of clause 27, wherein the instructions further cause the at least one processor to: add the first dialogue template to package data for the intelligent industrial assistant; and communicate the package data to the intelligent industrial assistant.

Clause 29: The computer program product of clauses 27 or 28, wherein the instructions further cause the at least one processor to: communicate the first dialogue template to the intelligent industrial assistant, wherein the intelligent industrial assistant adds the first dialogue template to package data of the intelligent industrial assistant.

Clause 30: The computer program product of any one of clauses 27-29, wherein the instructions further cause the at least one processor to: display a first view of the graphical user interface, the first view comprising a first set of graphical elements to receive first input associated with the first group identification data and a second set of graphical elements to receive second input associated with the first feature identification data, wherein receiving first group identification data comprises receiving the first input via the first set of graphical elements, and wherein receiving first feature identification data comprises receiving the second input via the second set of graphical elements.

Clause 31: The computer program product of any one of clauses 27-30, wherein the instructions further cause the at least one processor to: display a second view of the graphical user interface, the second view comprising a third set of graphical elements to receive third input associated with the first sequence identification data and a fourth set of graphical elements to receive fourth input associated with a portion of the expected dialogue data, the portion of the expected dialogue data comprising expected initiating dialogue data associated with at least one phrase for initiating the first sequence, wherein receiving the first sequence identification data comprises receiving the third input via the third set of graphical elements, and wherein receiving the expected dialogue data comprises receiving the fourth input via the fourth set of graphical elements.

Clause 32: The computer program product of any one of clauses 27-31, wherein the instructions further cause the at least one processor to: display a third view of the graphical user interface, the third view comprising a fifth set of graphical elements to receive fifth input associated with a second portion of the expected dialogue data, the second portion of the expected dialogue data comprising at least one parameter of the expected dialogue data, wherein receiving the expected dialogue data further comprises receiving the fifth input via the fifth set of graphical elements.

Clause 33: The computer program product of any one of clauses 27-32, wherein the instructions further cause the at least one processor to: display a fourth view of the graphical user interface, the fourth view comprising a sixth set of graphical elements to receive sixth input associated with a third portion of the expected dialogue data, the third portion of the expected dialogue data comprising script data based on the at least one parameter of the expected dialogue data, wherein receiving the expected dialogue data further comprises receiving the sixth input via the sixth set of graphical elements.

Clause 34: The computer program product of any one of clauses 27-33, wherein the instructions further cause the at least one processor to: display a fifth view of the graphical user interface, the fifth view comprising a seventh set of graphical elements to receive seventh input associated with the action data based on the first sequence identification data and the at least one parameter of the expected dialogue data, wherein receiving the action data comprises receiving the seventh input via the seventh set of graphical elements.

Clause 35: The computer program product of any one of clauses 27-34, wherein the action data comprises at least one of an audio output of the intelligent industrial assistant, a media item for display by the intelligent industrial assistant, a tabular list for display by the intelligent industrial assistant, a report template for outputting by the intelligent industrial assistant, a machine interface for accessing by the intelligent industrial assistant, a database interface for accessing by the intelligent industrial assistant, or a combination thereof.

Clause 36: The computer program product of any one of clauses 27-35, wherein the instructions further cause the at least one processor to: verify the first dialogue template does not contain errors.

Clause 37: The computer program product of any one of clauses 27-36, wherein the instructions further cause the at least one processor to: receive language data associated with at least one language associated with at least one of the group identification data, the feature identification data, the sequence identification data, or a combination thereof.

Clause 38: The computer program product of any one of clauses 27-37, wherein the instructions further cause the at least one processor to: communicate the first dialogue template to a remote system, wherein the remote system adds the first dialogue template to package data for the intelligent industrial assistant.

Clause 39: The computer program product of any one of clauses 27-38, wherein the remote system communicates the package data to the intelligent industrial assistant.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, as well as the attached Appendix, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIGS. 5A-5L are screenshots of an exemplary graphical user interface according to a non-limiting implementation of the process of FIG. 3, according to principles of the presently disclosed subject matter;

DESCRIPTION

Figure 1A:
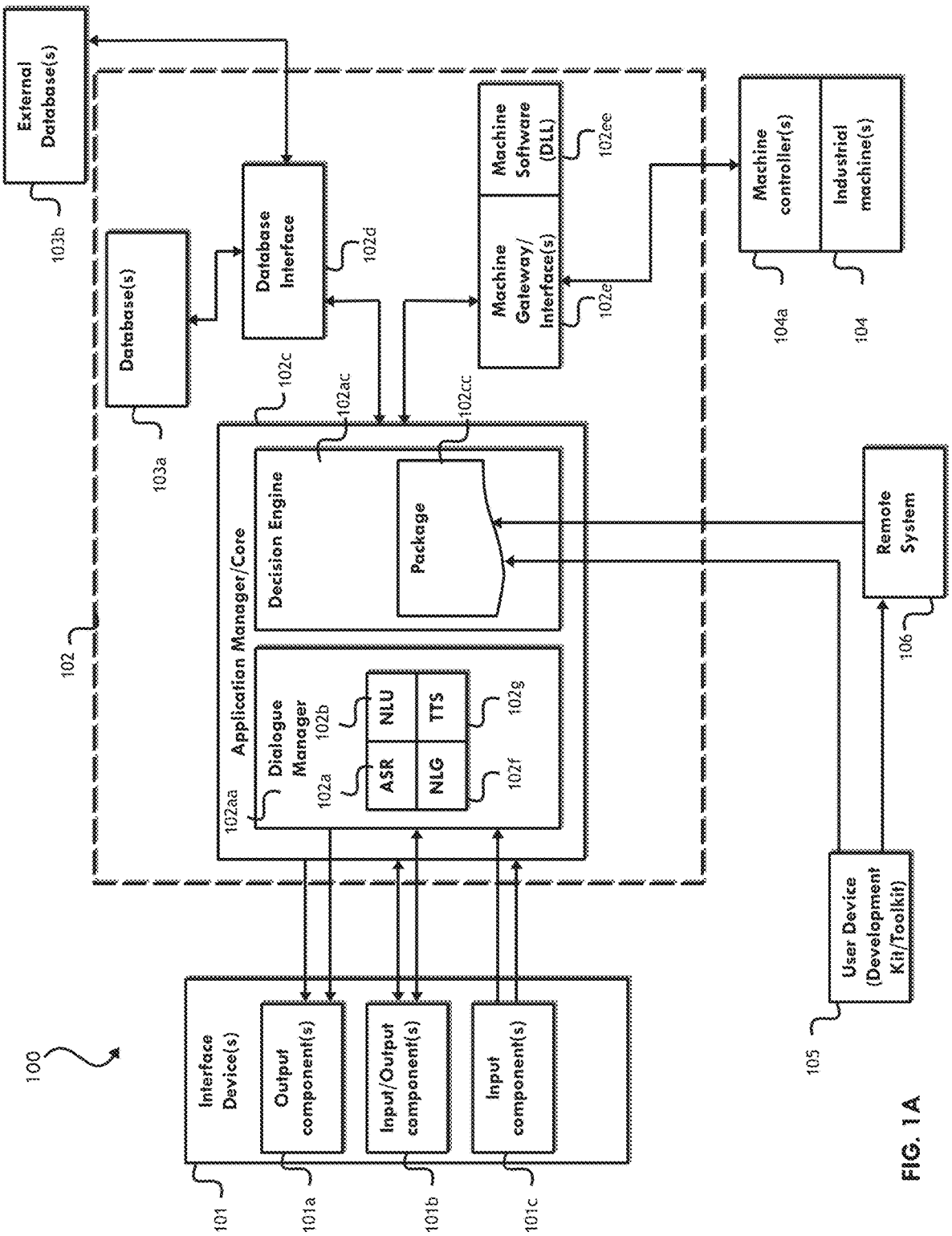
FIGS. 1A-1E are diagrams of non-limiting embodiments of an environment in which methods, systems, and/or computer program products, described herein, may be implemented according to the principles of the presently disclosed subject matter.
Figure 1B:
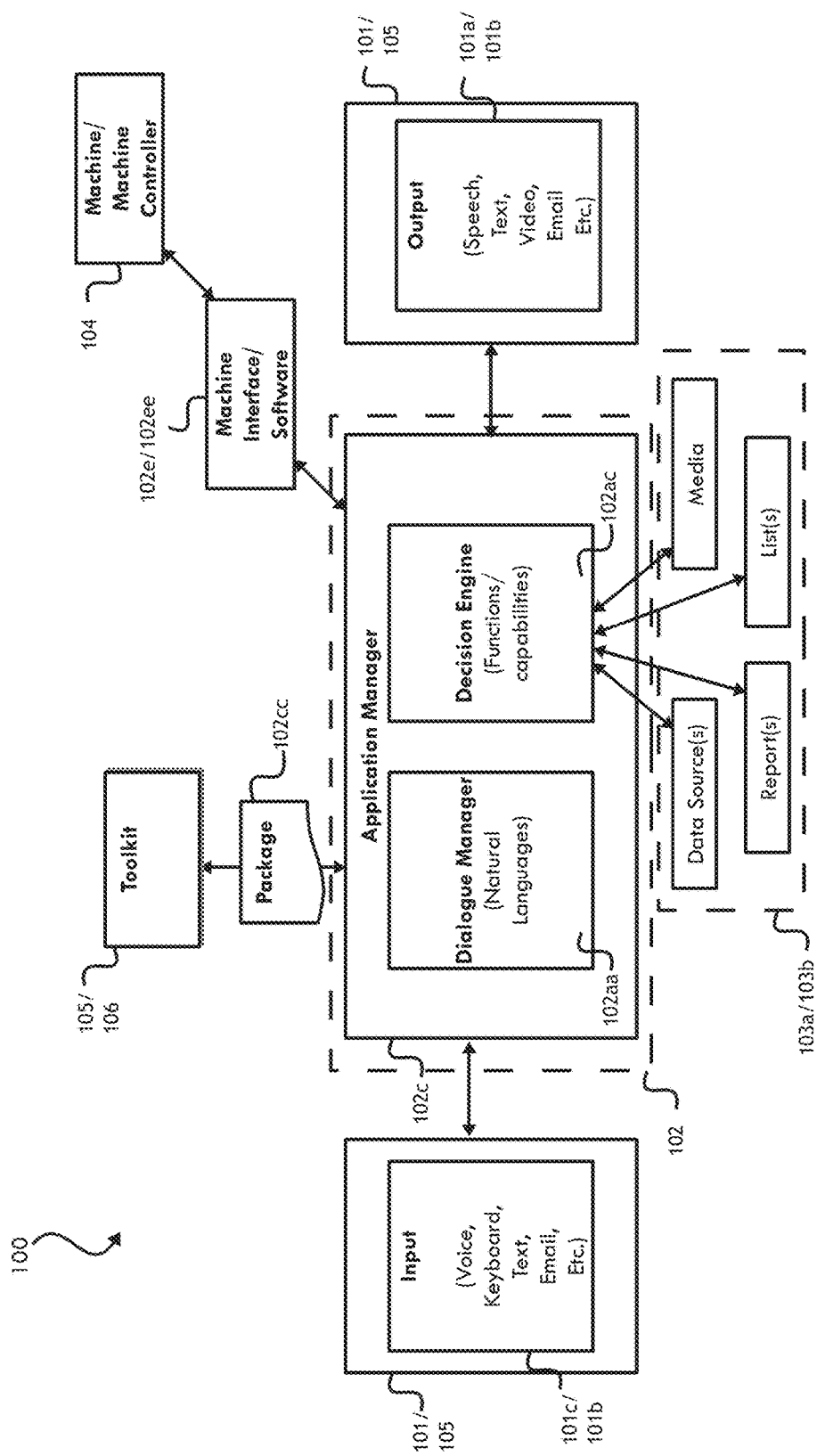
Figure 1C:
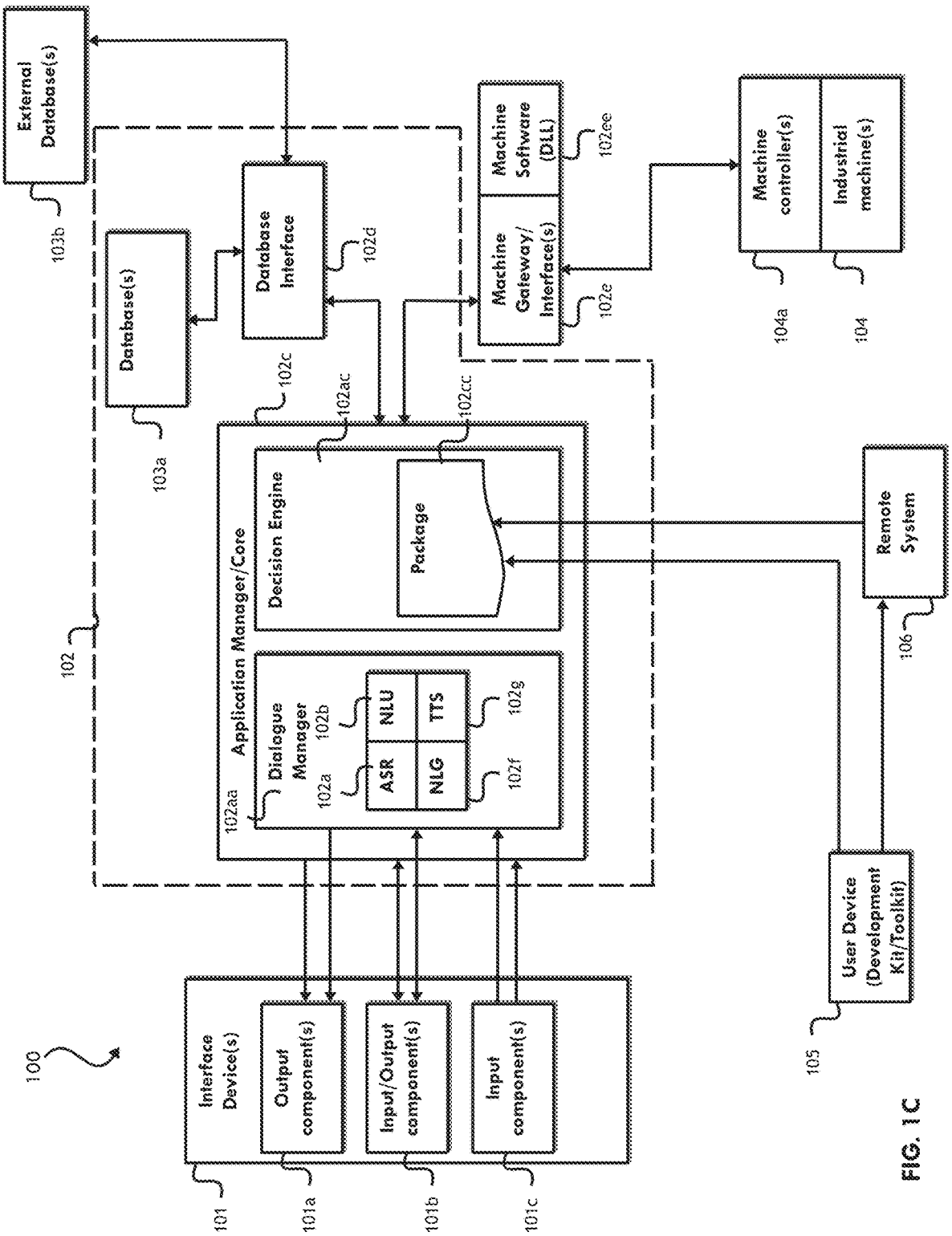
Figure 1D:
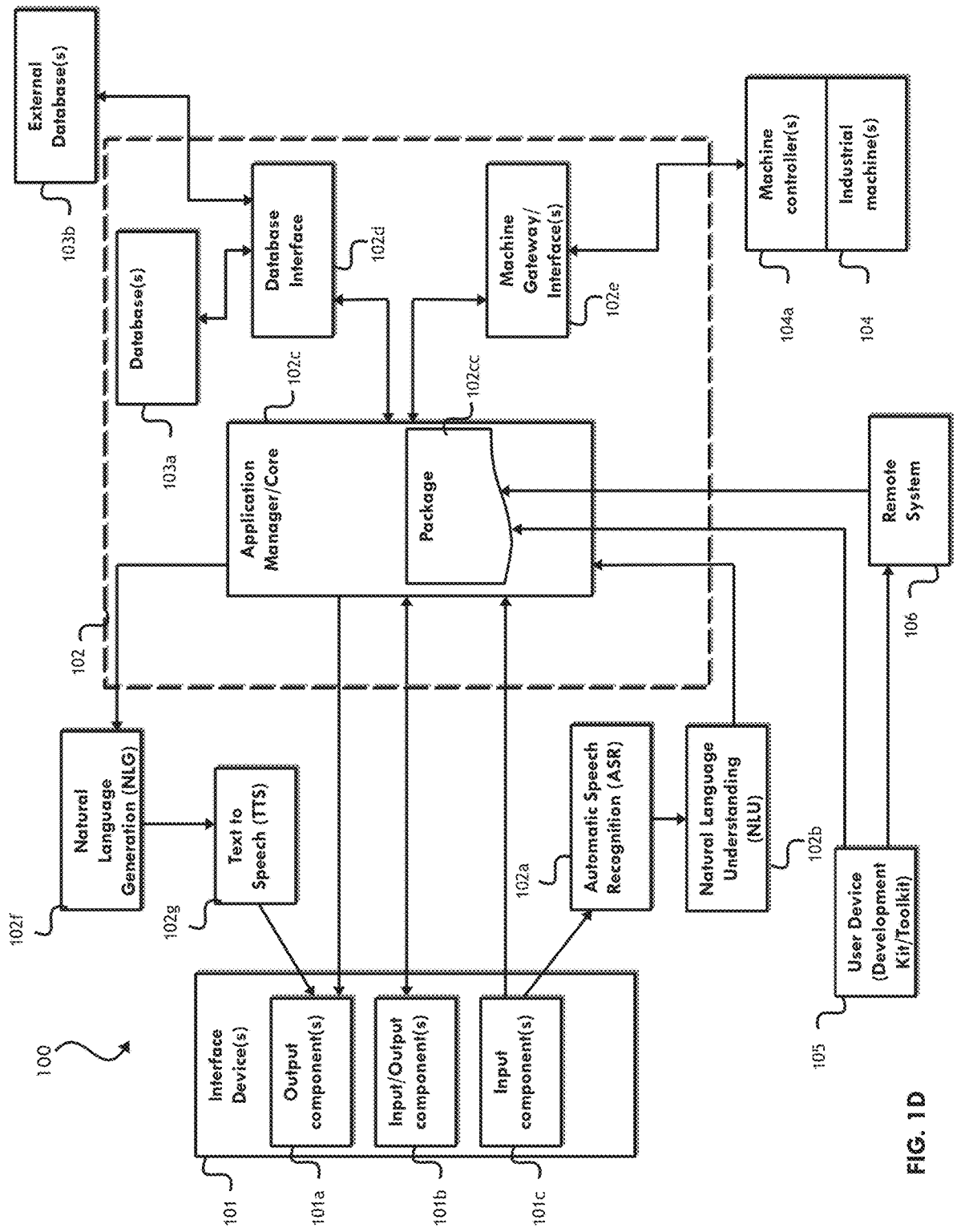
Figure 1E:
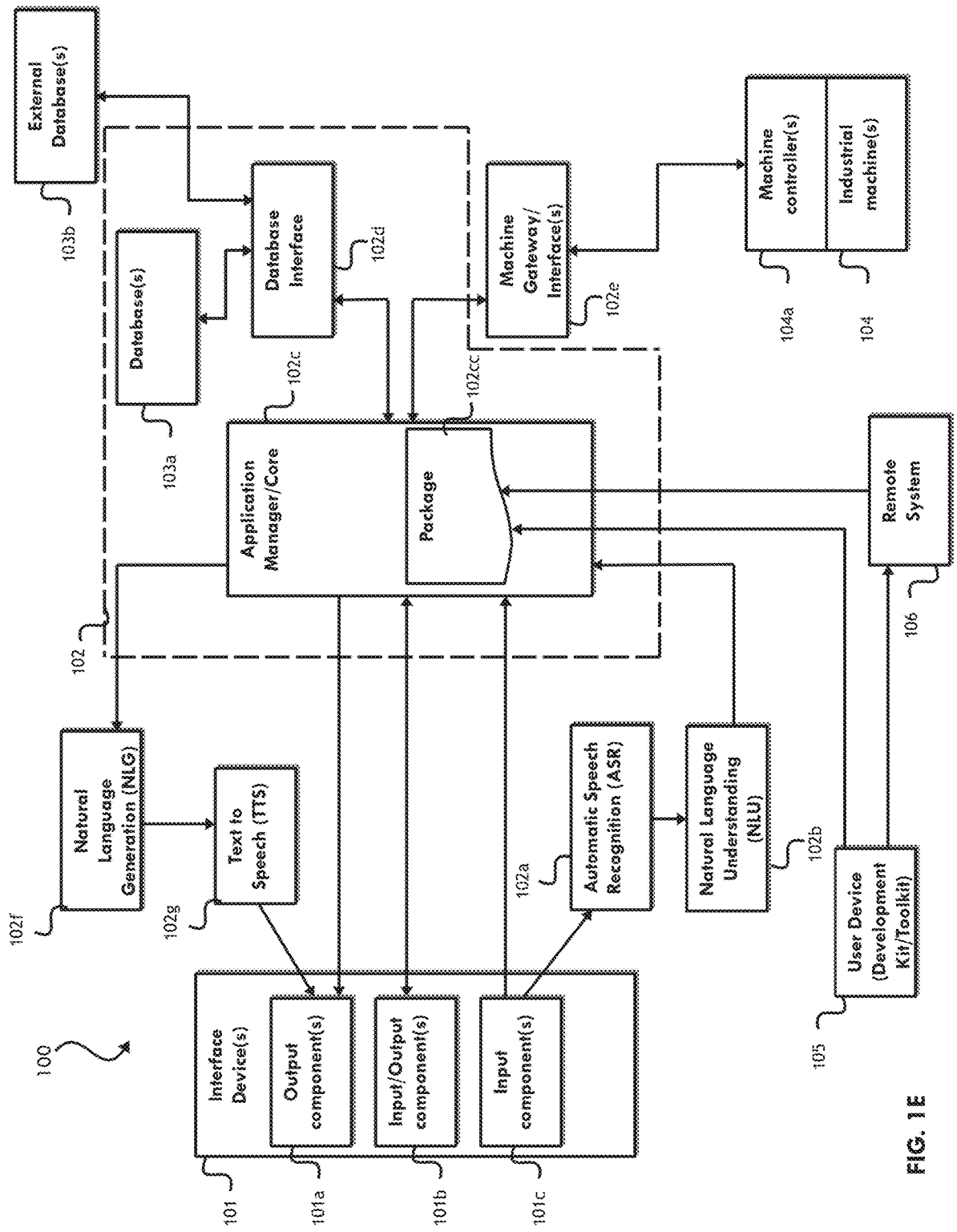

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

The terms "digital assistant," "virtual assistant," "intelligent automated assistant," or "automatic digital assistant" may refer to any information processing system that interprets natural language input in spoken and/or textual form to infer user intent, and performs actions based on the inferred user intent. The term "intelligent industrial assistant" may refer to an information processing system that is specifically designed, constructed, and/or implemented to interpret natural language input and/or inputs from industrial machines (e.g., manufacturing machines and/or the like), databases related thereto, and/or the like and perform actions based on the inferred intent in the context of or in relation to such industrial machines. For example, to act on an inferred intent, the intelligent industrial assistant may perform one or more of the following: identifying a task flow in the context of or in relation to at least one industrial machine with steps and parameters designed to accomplish the inferred intent; inputting specific requirements from the inferred intent into the task flow; executing the task flow by invoking programs, methods, services, APIs, or the like, e.g., to report, control, coach, calculate, plan, maintain, repair, teach, anticipate, record and/or the like in the context of or in relation to at least one industrial machine; and generating output responses to the user in an appropriate medium and/or mode, e.g., audible (e.g., speech, tone, and/or the like), text (e.g., text message, email, document, HTML, and/or the like), other visual form (e.g., graphic, video, and/or the like), any combination thereof, and/or the like.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the disclosed subject matter are directed to methods, systems, and computer program products for an intelligent industrial assistant. For example, non-limiting embodiments of the disclosed subject matter provide using an intelligent industrial assistant based on mapping natural language input to at least one dialogue template included in package data to determine and communicate command data based thereon. Such embodiments provide techniques and systems that enable a user (e.g., operator of an industrial machine and/or the like) to use natural language inputs (e.g., spoken requests and/or the like), which may reduce and/or eliminate training to use individual machines (e.g., industrial machines). Additionally or alternatively, such embodiments provide techniques and systems that reduce and/or eliminate manual efforts (e.g., navigating through menus, multiple key strokes, clicks, and/or the like), time, and/or the like of such a user controlling a machine (e.g., industrial machine and/or the like). Additionally or alternatively, such embodiments provide techniques and systems that allow such a user to concurrently (e.g., simultaneously, contemporaneously, and/or the like) control, monitor, and/or the like multiple machines through a single intelligent industrial assistant. Additionally or alternatively, such embodiments provide techniques and systems that enable a user (e.g., operator of an industrial machine and/or the like) to control, monitor, and/or the like a machine without using the user's hands (e.g., when a user's hands are occupied, such as when carrying an object, writing notes, assisting another individual on the factory floor, and/or the like). Additionally or alternatively, such embodiments provide techniques and systems that enable such a user to receive indications of status or other information in various formats including non-visual formats (e.g., audible and/or the like), thereby reducing and/or eliminating a need for such a user to be physically near and/or looking at a machine while operating such a machine.

Additionally or alternatively, non-limiting embodiments of the disclosed subject matter provide techniques and systems for interoperability, e.g., determining which medium and/or mode of communication (e.g., audible, text, HTML, visual, any combination thereof, and/or the like) to use for output to a user from the intelligent industrial assistant. In some non-limiting embodiments, such a determination may be based on ethnographic relationship(s), ethnographic mapping(s), and/or the like, which may be specific to users (e.g., operators) of industrial machines and/or related thereto. Additionally or alternatively, non-limiting embodiments of the disclosed subject matter provide techniques and systems for universality, e.g., allowing a single user (e.g., machine operator and/or the like) to operate many different devices (e.g., industrial machines, databases related thereto, and/or the like) through a single interface of the intelligent industrial assistant. For the purpose of illustration, a person knowledgeable regarding a type of industrial machine (e.g., machine tool, additive manufacturing device, subtractive manufacturing device, electrical discharge machining (EDM) device, milling device, cutting device grinding device, drilling device, micromachining device, part-producing device, and/or the like) may be able to operate many different devices of that type from different manufacturers/sources without a need to learn a separate interface/control system for each such machine. Additionally or alternatively, non-limiting embodiments of the disclosed subject matter provide techniques and systems for enablement of a user (e.g., operator, worker, and/or the like), e.g., in understanding and operating industrial machines, databases related thereto, and/or the like through the intelligent industrial assistant. For the purpose of illustration, the intelligent industrial assistant may enable a user (e.g., operator, worker, and/or the like) with respect to the industrial machine, databases related thereto, and/or the like, e.g., to understand, be prompted to, or be coached/taught how to control various types of machines; understand or be prompted about upcoming steps, processes, and/or the like; understand or be prompted about what is needed (e.g., parameters, requirements, materials, tools, and/or the like); understand or be informed of relevant information in a database (e.g., without being familiar with the particular database or how to perform searches, queries, and/or the like thereof); and/or the like.

Additionally or alternatively, non-limiting embodiments of the disclosed subject matter are directed to methods, systems, and computer program products for developing at least one dialogue template for an intelligent industrial assistant. For example, non-limiting embodiments of the disclosed subject matter provide developing such dialogue template(s) through a graphical user interface that enables a user to align group and/or machine identification data, feature identification data, sequence identification data, expected dialogue data, and action data to generate a dialogue template based on the first group identification data, the first feature identification data, the first sequence identification data, the expected dialogue data, the action data, and/or the like to generate a dialogue template based thereon. Such embodiments provide techniques and systems that allow a user to efficiently develop domain-specific (e.g., industrial machine-specific, machine operator-specific, role-specific, and/or the like) dialogue templates (e.g., including and/or based on action data associated with at least one domain-specific command). Additionally or alternatively, such embodiments provide techniques and systems that use a step-by-step graphical user interface for the user to create such domain-specific dialogue template(s), thus enabling a user without software development expertise to develop such dialogue template(s) while simultaneously ensuring that such dialogue template(s) include all desirable (e.g., necessary and/or the like) inputs therefor (e.g., for the dialogue template(s) to be compatible with the voice interface and any devices or machines connected thereto). Additionally or alternatively, such embodiments provide techniques and systems that enable creation of dialogue template(s) that are specific to particular machines (e.g., industrial machines) and/or groups of features thereof, specific to particular roles (e.g., machine operator, factory floor staff member, a supervisor, a manager, an engineer, a maintenance worker, a salesman, an inspector, an analyst, and/or the like), and/or the like. Additionally or alternatively, such embodiments provide techniques and systems that enable efficiently updating such dialogue template(s) (e.g., in package data including a plurality of such dialogue templates) and/or adding such dialogue template(s) (e.g., to package data including a plurality of such dialogue templates).

For the purpose of illustration, in the following description, while the presently disclosed subject matter is described with respect to methods, systems, and computer program products for developing at least one dialogue template for an intelligent industrial assistant, one skilled in the art will recognize that the disclosed subject matter is not limited to the illustrative embodiments or aspects. For example, the methods, systems, and computer program products described herein may be used with a wide variety of settings, such as any setting suitable for an intelligent assistant, an industrial machine, and/or the like.

Referring now to FIGS. 1A-1E, FIGS. 1A-1E are diagrams of non-limiting embodiments of environment 100 in which systems, products, and/or methods, as described herein, may be implemented. As shown in FIGS. 1A-1E, environment 100 may include interface device 101, intelligent industrial assistant 102, database 103a, external database 103b, industrial machine 104, user device 105, and/or remote system 106.

Interface device 101 may include one or more devices capable of receiving information from and/or communicating information to intelligent industrial assistant 102 (e.g., via direct connection, wired and/or wireless network, and/or any other suitable communication technique). Additionally or alternatively, each interface device 101 may include a device capable of receiving information from and/or communicating information to other interface devices 101 (e.g., via wired or wireless network and/or any other suitable communication technique), user device(s) 105, and/or remote system 106. In some non-limiting embodiments, interface device 101 may include one or more input components 101c, one or more output components 101a, one or more input/output component 101b (e.g., a component that performs as both an input component and an output component, such as a touchscreen display, a headset with microphone and speaker/headphone, and/or the like), and/or one or more communication interfaces, as described herein. In some non-limiting embodiments, interface device 101 may or may not be capable of receiving information (e.g., from intelligent industrial assistant 102 and/or from another interface device 101) via a short-range wireless communication connection (e.g., an NFC communication connection, an RFID communication connection, a Bluetooth® communication connection, a Zigbee® communication connection, and/or the like), and/or communicating information (e.g., to intelligent industrial assistant 102, another interface device 101, user device 105, remote system 106, and/or the like) via a short-range wireless communication connection. In some non-limiting embodiments, interface device 101 may include input component 101c (e.g., a microphone), an output component 101a (e.g., a speaker, headphone, and/or the like), an input/output component 101b (e.g., a touchscreen, a headset, and/or the like), and/or the like. In some non-limiting embodiments, interface device 101 may include multiple devices. For example, interface device 101 may include a headset including output component 101a (e.g., a speaker, such as headphones) and/or input component 101c (e.g., a microphone). Additionally or alternatively, interface device 101 may include a portable and/or handheld device (e.g., a computer, a laptop, a personal digital assistant (PDA), a smartphone, a tablet, and/or the like) with input and/or output components (e.g., input/output component 101b, such as a touchscreen; input components 101c such as a keyboard, a mouse, and/or the like; output components 101a such as a speaker and/or the like; and/or the like).

Intelligent industrial assistant 102 may include one or more devices capable of receiving information from and/or communicating information to interface device 101, database 103a, external database 103b, industrial machine 104, user device 105, and/or remote system 106. In some non-limiting embodiments, intelligent industrial assistant 102 may be integrated with (e.g., completely, partially, and/or the like) and/or directly connected to interface device 101. In some non-limiting embodiments, intelligent industrial assistant 102 may include a computing device, such as a portable and/or handheld device (e.g., a computer, a laptop, a personal digital assistant (PDA), a smartphone, a tablet, and/or the like), a desktop computer, a server, a group of servers, and/or other like devices. In some non-limiting embodiments, intelligent industrial assistant 102 may be associated with a service provider, e.g., a third party separate from the user of the interface device 101, the maintainer of the database 103a, the maintainer of the external database 103b, the operator/owner/provider/manufacturer of the industrial machine 104, the provider of remote system 106, and/or the user of user device 105. In some non-limiting embodiments, intelligent industrial assistant 102 may be in communication with a data storage device, which may be local or remote to intelligent industrial assistant 102. In some non-limiting embodiments, intelligent industrial assistant 102 may be capable of receiving information from, storing information in, communicating information to, or searching information stored in the data storage device.

In some non-limiting embodiments, intelligent industrial assistant 102 may have various hardware and/or software modules and/or may store information and/or software related to the operation and use of intelligent industrial assistant 102. For example, intelligent industrial assistant 102 may include dialogue manager 102aa, decision engine 102ac, automatic speech recognition (ASR)/speech to text (STT) module 102a, natural language understanding (NLU) module 102b, application manager 102c, database interface 102d, machine gateway 102e, natural language generator (NLG) module 102f, text to speech (TTS) module 102g, and/or the like. Additionally or alternatively, database interface 102d may include a hardware and/or a software interface (e.g., an application-programming interface and/or the like) to enable communication between intelligent industrial assistant 102, database 103a, and/or external database 103b. In some non-limiting embodiments, application manager 102c may include at least one of dialogue manager 102aa, decision engine 102ac, any combination thereof, and/or the like. Additionally or alternatively, dialogue manager 102aa may include at least one of ASR/STT module 102a, NLU module 102b, NLG module 102f, TTS module 102g, other speech processing, and/or the like. In some non-limiting embodiments, ASR/STT module 102a, NLU module 102b, other speech to text processing, and/or the like may be a single module (e.g., STT module 102a). Additionally or alternatively, NLG module 102f, TTS module 102g, other text to speech processing, and/or the like may be a single module (e.g., TTS module 102g). In some non-limiting embodiments, ASR/STT module 102a, NLU module 102b, other speech to text processing, NLG module 102f, TTS module 102g, other text to speech processing, and/or the like may be a single module (e.g., dialogue manager 102aa). In some non-limiting embodiments, at least one of ASR/STT module 102a, NLU module 102b, NLG module 102f, TTS module 102g, dialogue manager 102aa, any combination thereof, and/or the like may be separate from and/or in communication with intelligent industrial assistant 102. In some non-limiting embodiments, intelligent industrial assistant 102 and/or machine gateway 102e may include at least one machine interface, e.g., a hardware and/or a software interface (e.g., an application-programming interface, dynamic load library, and/or the like) to enable communication between the intelligent industrial assistant 102 (e.g., application manager 102c) and industrial machine 104 (e.g., machine controller 104a of industrial machine 104). Additionally or alternatively, in some non-limiting embodiments, intelligent industrial assistant 102, machine gateway 102e, and/or industrial machine 104 (e.g., machine controller 104a of industrial machine 104) may include machine-specific software 102ee (e.g., a dynamic load library (DLL)) to enable communication between the intelligent industrial assistant 102 (e.g., application manager 102c) and industrial machine 104 (e.g., machine controller 104a of industrial machine 104). For example, machine-specific software 102ee (e.g., DLL) may include a library of at least one of functions, commands, variables, fields, inputs, outputs, any combination thereof, and/or the like of industrial machine 104 (e.g., machine controller 104a of industrial machine 104) that are accessible, usable, and/or the like by intelligent industrial assistant 102 (e.g., application manager 102c). In some non-limiting embodiments, machine gateway 102e may be separate from and/or in communication with intelligent industrial assistant 102. For example, machine gateway may be implemented (e.g., completely, partially, and/or the like) with industrial machine 104 (e.g., machine controller 104a of industrial machine 104). In some non-limiting embodiments, intelligent industrial assistant 102 may include at least one output interface (e.g., an audio card, a video card, a renderer, a coder, a decoder, a coder-decoder (codec), a communication interface, and/or the like) to enable communication between the intelligent industrial assistant 102 (e.g., application manager 102c) and at least one of output component(s) 101a, input/output component(s) 101b, and/or the like.

In some non-limiting embodiments, application manager 102c may be an industrial process application manager. Additionally or alternatively, application manager 102c may include decision engine 102ac. In some non-limiting embodiments, application manager 102c (e.g., decision engine 102ac thereof and/or the like) may include, receive, and/or be configured with package 102cc. In some non-limiting embodiments, package 102cc may include at least one module (e.g., software module, firmware module, and/or the like) and/or package data that may include at least one of dialogue templates, machine/group identification data, features, sequences, actions, functions, commands, variables, fields, inputs, outputs, parameters, classes, interfaces (e.g., machine interface(s) of machine gateway 102e, database interface 102d, and/or the like), any combination thereof, and/or the like of the intelligent industrial assistant 102 (e.g., application manager 102c, decision engine 102ac thereof, and/or the like). In some non-limiting embodiments, application manager 102c (e.g., decision engine 102ac thereof and/or the like) and/or package 102cc may include and/or be configured to determine ethnographic relationships, e.g., mapping(s) and/or cross-correlations between functions performable by intelligent industrial assistant 102 (e.g., report, control, coach, calculate, plan, maintain, repair, teach, anticipate, record, and/or the like) and sequences/task groups (e.g., task flows of users specific to the role of such user, such as machine operator, and/or the like). Additionally or alternatively, application manager 102c (e.g., decision engine 102ac thereof and/or the like) and/or package 102cc may include and/or be configured to determine mappings to industrial machine(s) 104 and/or databases (e.g., database(s) 103a and/or external database(s) 103b), which may be based (e.g., completely, partially, and/or the like) on one or more predetermined ethnographic relationship(s).

In some non-limiting embodiments, application manager 102c (e.g., dialog manager 102aa thereof, decision engine 102ac thereof, and/or the like) and/or package 102cc may include and/or be configured to implement interoperability, e.g., determining which medium and/or mode of communication (e.g., audible, text, HTML, visual, tactile, any combination thereof, and/or the like) to use for input from or output to a user from intelligent industrial assistant 102. In some non-limiting embodiments, such a determination may be based on one or more predetermined ethnographic relationship(s), dialogue template(s), and/or the like. Additionally or alternatively, such a determination may be based on selecting a medium and/or mode of communication that reduces (e.g., minimizes and/or the like) a number of steps (e.g., successive iterations of inputs and/or outputs) by the user using the intelligent industrial assistant 102. Additionally or alternatively, such a determination may be based on providing a way to accomplish a task (e.g., at least one action and/or the like) that increases efficiency, effectiveness, and/or the like. Additionally or alternatively, such a determination may be based on selecting a medium and/or mode of communication to reduce (e.g., eliminate, decrease, and/or the like) inputs requiring a use of the user's hands (e.g., enable voice/speech input and/or voice/speech output to allow a user to operate a machine without the user's hands), thereby enabling the user to interact with intelligent industrial assistant 102 while the user's hands are occupied. In some non-limiting embodiments, if content (e.g., a response, a prompt, and/or the like) is short (e.g., concise, less than a threshold number of characters, less than a threshold number of words (e.g., 10 words), less than a threshold number of sentences, less than a threshold number of seconds of speech (e.g., 5 seconds), and/or the like), such content may be output by intelligent industrial assistant 102 audibly (e.g., spoken words), as text (e.g., in dialogue window on a display screen, as part of an HTML page, and/or the like), and/or the like. In some non-limiting embodiments, a user (e.g., machine operator and/or the like) may not be able to (e.g., be prevented from and/or the like) provide input (e.g., natural language input) until audible output (e.g., spoken words of a response) is completed, so content that is long (e.g., greater than the aforementioned thresholds and/or the like) may be undesirable, cause delays in time, and/or the like. In some non-limiting embodiments, when content includes the results of at least one calculation, such content may be out in a tabular format (e.g., a tabular list), a report template, and/or the like. Additionally or alternatively, such output (e.g. tabular list, report template, and/or the like) may be displayed in a separate window (e.g., on the display screen), communicated by a separate channel (e.g., email, text (e.g., SMS) message, multimedia (e.g., MMS) message, and/or the like). Additionally or alternatively, a user may optionally be able to select (e.g., touch on a touch screen, click with a pointer device such as a mouse, and/or the like) an item in such a list rather than or in addition to providing subsequent natural language input (e.g., voice/speech input, typed input, and/or the like), e.g., when the item may be cumbersome to speak or type (e.g., a word greater than a threshold length, a string of words greater than a threshold number of words, a number with multiple digits greater than a threshold number of digits, and/or the like). In some non-limiting embodiments, if content includes identification information (e.g., contact information, email addresses, phone numbers, and/or the like), such content may be displayed (e.g., in a dialogue window, in a separate window on the display screen, and/or the like). In some non-limiting embodiments, number values with multiple digits following a decimal point may be rounded to a selected (e.g., predetermined, selectable, and/or the like) number of digits after the decimal before being output (e.g., as audible speech, text in a dialogue window, text on an HTML page, and/or the like). In some non-limiting embodiments, when content includes at least one media item, the media item(s) may be displayed in a separate window (e.g., on a display screen and/or the like). Additionally or alternatively, large media items (e.g., greater than a threshold number of pages (e.g., for documents), seconds (e.g., for audio, visual, or audiovisual files), and/or the like) may be divided (e.g., segmented and/or the like) into smaller media items, which may reduce load times. Additionally or alternatively, such smaller media items may be displayed serially, concurrently, and/or the like. In some non-limiting embodiments, when content includes warnings (e.g., alarms, alerts, and/or the like), such content may include at least one of audible output (e.g., spoken words, loud and/or repetitive noises, tones, and/or the like), visual output (e.g., display in the dialogue window, in a separate window, and/or the like), communication by at least one other channel (e.g., email, text (e.g., SMS) message, multimedia (e.g., MMS) message, and/or the like), any combination thereof, and/or the like. In some non-limiting embodiments, output (e.g., content, media items, warnings, and/or the like) may include tactile output (e.g., haptic, vibration, and/or the like output). In some non-limiting embodiments, output (e.g., content, media items, warnings, and/or the like) may include a combination of modes of communication, e.g., tactile and visual (e.g., via a touchscreen), visual and audible (e.g., display of information in a dialogue window with accompanying audible speech, audiovisual media content, and/or the like), and/or the like. In some non-limiting embodiments, intelligent industrial assistant 102 may include an image capture device (e.g., camera, barcode scanner, and/or the like as at least one of input component 101*c*, input/output component 101*b*, and/or the like), which may be used to input data (e.g., barcode, quick response (QR) code, alphanumeric information, optical character recognition, and/or the like), and/or intelligent industrial assistant 102 may display (e.g., via a display screen as output component 101*a*, input/output component 101*b*, and/or the like) such data (e.g., barcode, quick response (QR) code, alphanumeric information, and/or the like) as output. In some non-limiting embodiments, output may include indications of status or other information in various formats including non-visual formats (e.g., audible and/or the like), thereby reducing and/or eliminating a need for such a user to be physically near and/or looking at a machine while operating such a machine.

In some non-limiting embodiments, each dialogue template (e.g., of package 102*cc* and/or the like) may include at least one of function data, group data, feature data, sequence data, parameter data, expected dialogue data, action data, any combination thereof, and/or the like. For example, function data may be associated with (e.g., identify and/or the like) of at least one function (e.g., report, control, coach, calculate, plan, maintain, repair, teach, anticipate, record and/or the like) of intelligent industrial assistant 102 into which the dialogue template is categorized (e.g., classified and/or the like). Additionally or alternatively, group data may be associated with (e.g., identify and/or the like) a group of features (e.g., a group of features associated with an industrial machine 104, a database such as database 103*a* and/or external database 103*b*, and/or the like). For example, a group may include all features (e.g., functions, commands, variables, fields, inputs, outputs, any combination thereof, and/or the like) associated with a particular industrial machine 104. Additionally or alternatively, each industrial machine 104 (or make/model of industrial machines 104) may have at least one group associated therewith. In some non-limiting embodiments, the group data may include an alphanumeric string (e.g., a four digit number, a four character string, and/or the like). Additionally or alternatively, feature data may be associated with (e.g., identify and/or the like) a feature (e.g., a first feature) of the group of features. In some non-limiting embodiments, a feature may be associated with at least one operation for a user (e.g., machine operator and/or the like) to interact with intelligent industrial assistant 102. For example, a feature may include a direction, e.g., a request (e.g., command, question, and/or the like) for intelligent industrial assistant 102 to perform an action. Additionally or alternatively, a feature may include a confirmation, e.g., an input (e.g., spoken/verbal input, click, key stroke, and/or the like) to intelligent industrial assistant 102 confirming that intelligent industrial assistant 102 should perform an action (e.g., "yes," "no," "cancel," and/or the like). Additionally or alternatively, a feature may be a complex feature, e.g., a series of decision steps in which a user (e.g., machine operator and/or the like) provides multiple inputs (e.g., directions, confirmations, and/or the like) to intelligent industrial assistant 102 in at least one specified sequence. Additionally or alternatively, a feature may include a compound feature, e.g., a batch of actions, which may be performed in parallel, in series, any combination thereof, and/or the like. In some non-limiting embodiments, sequence data may be associated with (e.g., identify, include, and/or the like) a sequence of expected dialogue by the user (e.g., machine operator and/or the like), by intelligent industrial assistant 102, and/or the like. For example, sequence data may be associated with (e.g., identify, include, and/or the like) at least one item of expected dialogue data. Additionally or alternatively, expected dialogue data may be associated with (e.g., identify, include, and/or the like) at least one item of expected dialogue of the sequence. For example, each item of expected dialogue may include at least one of an expected natural language input from the user (e.g., machine operator), a response from intelligent industrial assistant 102 to the user, and/or the like. In some non-limiting embodiments, expected dialogue data may include a plurality of alternative items of expected dialogue associated with one dialogue template. For example, the plurality of alternative items of expected dialogue may include synonyms, alternative phrasings, and/or the like that express a same intent of the user to perform an activity (e.g., at least one action, task, and/or the like) associated with the same dialogue template (e.g., "Start warm up cycle," "Warm up the machine," and/or the like may be alternative items of expected dialogue to initiate a warm-up process for an industrial machine 104; "Run process 1234," "Start m-code 1234," and/or the like may be alternative items of expected dialogue to initiate a process associated with the stated code; "Report current tool," "Inform about current tool," and/or the like may be alternative items of expected dialogue to request information on a current tool; "Turn on the lights," "Lights on," and/or the like may be alternative items of expected dialogue to request turning on the lights; and/or the like). In some non-limiting embodiments, expected dialogue data may include initiating dialogue data associated with at least one natural language input (e.g., phrase and/or the like) for initiating the sequence associated with the expected dialogue data. In some non-limiting embodiments, parameter data may be associated with (e.g., identify, include, and/or the like) at least one parameter (e.g., value, category, word, and/or the like) associated with at least one item of expected dialogue. For example, parameter data may be associated with a part number, a part identification, a machine number (e.g., of a particular industrial machine 104, a model of industrial machine 104, and/or the like), a machine identifier, a number, a category (e.g., low, medium, high, slow, fast, on, off, and/or the like), a word (e.g., name of a part, a machine, a database, an item of media, and/or the like), an alphanumeric string, and/or the like. In some non-limiting embodiments, at least one item of parameter data may be associated with input from the user to intelligent industrial assistant 102. Additionally or alternatively, at least one item of parameter data may be associated with output (e.g., response and/or the like) from intelligent industrial assistant 102. In some non-limiting embodiments, action data may be associated with (e.g., identify and/or the like) at least one action performable by intelligent industrial assistant 102, at least one action performable by another device (e.g., industrial machine 104, database 103*a*, external database 103*b*, and/or the like) separate from intelligent industrial assistant 102 (which may be at least partially controlled by intelligent industrial assistant 102), and/or the like. In some non-limiting embodiments, a dialogue template (e.g., the action data thereof and/or the like) may be associated with (e.g., identify, include, and/or the like) at least one of a media item, a tabular list, a report template, a machine interface, a database interface, custom content (e.g., of a user, the user's organization, and/or the like, which may be output by any suitable mode or medium of communication as described herein, such as email, text, visual display, audible output, and/or the like), an item of software (e.g., an executable file, a process, a module, a routine, a sub-routine, a function, and/or the like), a search (e.g., for a document, a retrievable item of data, and/or the like), a combination thereof, and/or the like.

In some non-limiting embodiments, certain actions may have prerequisites. For example, at least one of sequence data, action data, and/or the like may include prerequisite data associated with (e.g., identifying, including, and/or the like) at least one prerequisite (e.g., prerequisite action, prerequisite event, prerequisite condition, and/or the like). For example, warming up a machine (such as industrial machine 104) may be a prerequisite action to performing certain operations with such a machine, and sequence data, action data, and/or the like associated with such operations may include prerequisite data identifying sequence data, action data, and/or the like associated with warming up the machine. For example, a lack of warnings (e.g., alarms, alerts, and/or the like) may be a prerequisite condition to performing certain operations with a machine (e.g., industrial machine 104), and sequence data, action data, and/or the like associated with such operations may include prerequisite data identifying sequence data, action data, and/or the like associated with such warnings. In some non-limiting embodiments, intelligent industrial assistant 102 may prevent performing an action if the prerequisite is not satisfied. Additionally or alternatively, intelligent industrial assistant 102 may provide a response indicating such action cannot be performed and/or identifying the prerequisite to the user. In some non-limiting embodiments, intelligent industrial assistant 102 may communicate a prompt to the user requesting additional input associated with the prerequisite, confirmation associated with the prerequisite, and/or the like. Additionally or alternatively, if the user does not provide a reply to the prompt (e.g., because the user does not know), intelligent industrial assistant 102 may recommend a reply (e.g., at least one item of expected dialogue in response to the prompt, which may be based on the dialogue template, the expected dialogue data thereof, and/or the like). In some non-limiting embodiments, the machine (e.g., industrial machine 104, machine interface 102e thereof, machine-specific software 102ee (e.g., DLL) of industrial machine 104, and/or the like) may include code (e.g., software, firmware, protocols, executable instructions, parameters, and/or the like) to perform certain actions, and such code may include prerequisite data (e.g., dependencies and/or the like) identifying prerequisites of at least one some the actions.

In some non-limiting embodiments, at least one of (e.g., each of) ASR module 102a, NLU module 102b, NLG module 102f, TTS module 102g, application manager 102c (e.g., dialogue manager 102aa thereof, decision engine 102ac thereof, and/or the like), and/or package 102cc may include and/or be configured to implement a corpus of vocabulary (e.g., customized lexicon and/or the like). In some non-limiting embodiments, at least a portion of the corpus of vocabulary may be specific to the environment, e.g., in the context of or in relation to manufacturing generally; one or more specific types of manufacturing; industrial machines generally; one or more specific types of industrial machines; industrial processes generally; one or more specific industrial processes; databases related to manufacturing, industrial machines, and/or industrial processes; standard work and/or task flows related to manufacturing, industrial machines, and/or industrial processes; and/or the like. Additionally or alternatively, at least a portion of the corpus of vocabulary may be specific to one or more roles of individuals e.g., in the context of or in relation to manufacturing; industrial machines; industrial processes; databases related to manufacturing, industrial machines, and/or industrial processes; standard work and/or task flows related to manufacturing, industrial machines, and/or industrial processes; and/or the like. For example, such roles may include an operator (e.g., machine operator) of industrial machines in general, an operator of one or more specific types of industrial machines, a factory floor staff member, a supervisor, a manager (e.g., operations manager, production manager, and/or the like), an engineer (e.g., manufacturing engineer, field service engineer, and/or the like), a maintenance worker, a salesman, an inspector, an analyst, and/or the like. Additionally or alternatively, at least a portion of the corpus of vocabulary may be specific to technically-alike meanings, e.g., synonyms, metonyms, equivalents, associated words, substitutes, and/or the like. For example, at least some such technically-alike meanings may be based on predetermined ethnographic relationships.

Database 103a may include one or more devices capable of receiving information from and/or communicating information to intelligent industrial assistant 102. Additionally or alternatively, database 103a may include a data storage device, which may be local or remote to intelligent industrial assistant 102. In some non-limiting embodiments, database 103a may be integrated with (e.g., completely, partially, and/or the like) and/or directly connected to intelligent industrial assistant 102. Additionally or alternatively, database 103a may be implemented (e.g., completely, partially, and/or the like) separate from intelligent industrial assistant 102. For example, database 103a may be a separate device and/or system from intelligent industrial assistant 102. In some non-limiting embodiments, database 103a and intelligent industrial assistant 102 may be maintained by the same entity. In some non-limiting embodiments, database 103a may include a computing device, such as a server, a group of servers, and/or other like devices. Additionally or alternatively, database 103a may include at least one structured query language (SQL) database, at least one non-SQL database, any combination thereof, and/or the like. In some non-limiting embodiments, database 103a may be capable of retrieving information from, storing information in, communicating information to, or searching information stored in the data storage device.

External database 103b may include one or more devices capable of receiving information from and/or communicating information to intelligent industrial assistant 102. Additionally or alternatively, external database 103b may include a data storage device, which may be local or remote to intelligent industrial assistant 102. In some non-limiting embodiments, external database 103b may be associated with a third party, e.g., separate from the user of interface device 101, intelligent industrial assistant 102, and/or the operator/owner/provider/manufacturer of the industrial machine 104. In some non-limiting embodiments, external database 103b and intelligent industrial assistant 102 may be maintained by the same entity (e.g., different groups within the same party). In some non-limiting embodiments, external database 103b may include a computing device, such as a server, a group of servers, and/or other like devices. Additionally or alternatively, external database 103b may include at least one SQL database, at least one non-SQL database, any combination thereof, and/or the like. In some non-limiting embodiments, external database 103b may be capable of retrieving information from, storing information in, communicating information to, or searching information stored in the data storage device.

Industrial machine 104 may include one or more devices capable of receiving information from and/or communicating information to intelligent industrial assistant 102. Additionally or alternatively, industrial machine 104 may include one or more devices capable of performing an industrial, manufacturing, machining, and/or physical task. For example, industrial machine 104 may include at least one of a machine tool, an additive manufacturing device, a subtractive manufacturing device, an electrical discharge machining (EDM) device, a milling device, a cutting device, a grinding device, a drilling device, a micromachining device, a part-producing device, and/or the like. In some non-limiting embodiments, industrial machine 104 may include machine controller 104*a* (e.g., separate from intelligent industrial assistant 102), which may be integrated with (e.g., completely, partially, and/or the like), local to, or remote from industrial machine 104. In some non-limiting embodiments, intelligent industrial assistant 102 may be integrated with (e.g., completely, partially, and/or the like) and/or directly connected to industrial machine 104 and/or machine controller 104*a*.

User device 105 may include one or more devices capable of receiving information from and/or communicating information to intelligent industrial assistant 102 and/or remote system 106 (e.g., via direct connection, wired and/or wireless network, and/or any other suitable communication technique). For example, user device 105 may include a computing device (e.g., a portable and/or handheld device (e.g., a computer, a laptop, a personal digital assistant (PDA), a smartphone, a tablet, and/or the like), a desktop computer, a server, a group of servers, and/or other like devices). In some non-limiting embodiments, user device 105 may include a development kit, toolkit, and/or the like for developing, modifying, generating, communicating, and/or receiving package data (e.g., dialogue templates and/or the like, as described herein), e.g., for package 102*cc*. In some non-limiting embodiments, user device 105 may communicate package data to remote system 106, intelligent industrial assistant 102, and/or the like. In some non-limiting embodiments, user device 105 may be integrated with and/or directly connected to interface device 101, intelligent industrial assistant 102, and/or remote system 106.

Remote system 106 may include one or more devices capable of receiving information from and/or communicating information to intelligent industrial assistant 102 and/or user device 105 (e.g., via direct connection, wired and/or wireless network, and/or any other suitable communication technique). For example, remote system 106 may include a computing device (e.g., a portable and/or handheld device (e.g., a computer, a laptop, a personal digital assistant (PDA), a smartphone, a tablet, and/or the like), a desktop computer, a server, a group of servers, and/or other like devices). In some non-limiting embodiments, remote system 106 may receive package data (e.g., dialogue templates and/or the like, as described herein) from user device 105 and/or communicate package data to user device 105. Additionally or alternatively, remote system 106 may communicate package data (e.g., package 102*cc* and/or the like, as described herein) to intelligent industrial assistant 102*c* and/or receive package data from intelligent industrial assistant 102*c*. In some non-limiting embodiments, remote system 106 may be integrated with and/or directly connected to user device 105.

In some non-limiting embodiments, intelligent industrial assistant 102 may be connected to interface device 101, database 103*a*, external database 103*b*, industrial machine 104, user device 105, remote system 106, and/or any combination thereof by one or more networks. The network(s) may include one or more wired and/or wireless networks. For example, the network(s) may include a cellular network (e.g., a long-term evolution (LTE) network, a third generation (3G) network, a fourth generation (4G) network, a fifth generation network (5G), a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, a virtual private network (VPN), a local network, an ad hoc network, an intranet, the Internet, a fiber optic-based network, a cloud computing network, and/or the like, and/or a combination of these or other types of networks. In some non-limiting embodiments, intelligent industrial assistant 102 may be capable of (e.g., configured to) communicating (e.g., sending, transmitting, receiving, and/or the like) messages (e.g., email, text (e.g., SMS) messages, multimedia (e.g., MMS) messages), and/or the like over such networks. Additionally or alternatively, intelligent industrial assistant 102 may be capable of (e.g., configured to) accessing media items (e.g., documents and/or the like) available through such networks.

The number and arrangement of systems, devices, and/or networks shown in FIGS. 1A-1E are provided as an example. There may be additional systems, devices, and/or networks; fewer systems, devices, and/or networks; different systems, devices, and/or networks; and/or differently arranged systems, devices, and/or networks than those shown in FIGS. 1A-1E. Furthermore, two or more systems or devices shown in FIGS. 1A-1E may be implemented within a single system or device, or a single system or device shown in FIGS. 1A-1E may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
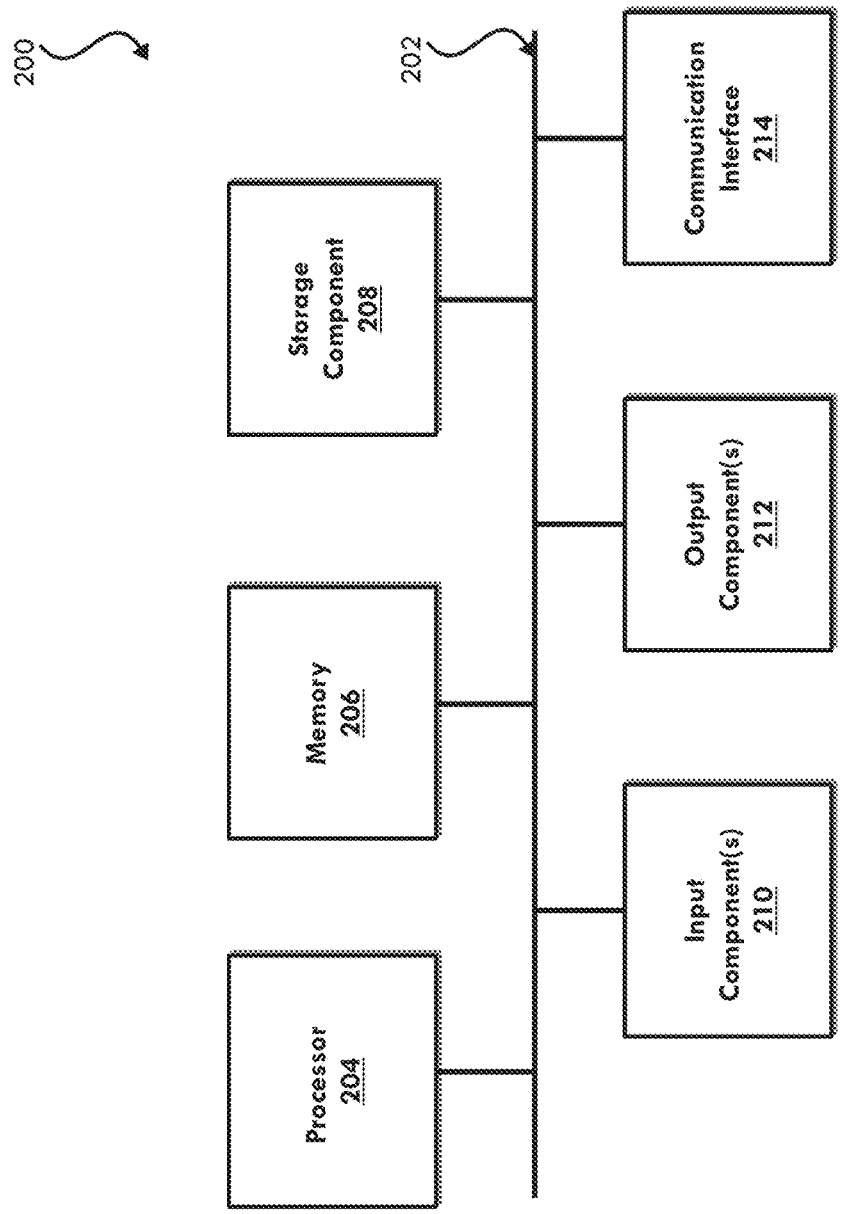
FIG. 2 is a diagram of a non-limiting embodiment of components of one or more devices of FIGS. 1A-1E.

Referring now to FIG. 2, FIG. 2 is a diagram of example components of a device 200. Device 200 may correspond to one or more devices of interface device 101, one or more devices of intelligent industrial assistant 102, one or more devices of database 103*a*, external database 103*b*, one or more devices of industrial machine 104, user device 105, and/or one or more devices of remote system 106. In some non-limiting embodiments, interface device 101, intelligent industrial assistant 102, database 103*a*, external database 103*b*, industrial machine 104, user device 105, and/or remote system 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
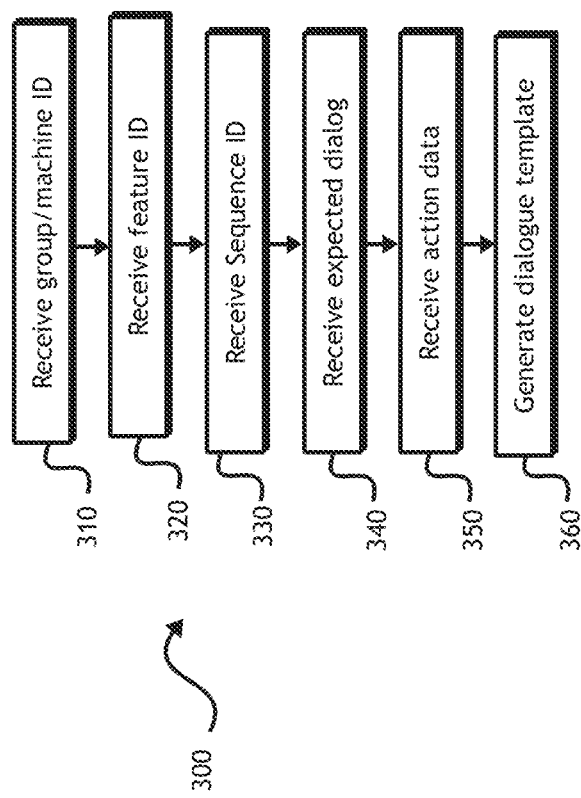
FIG. 3 is a flowchart of a non-limiting embodiment of a process for developing at least one dialogue template for an intelligent industrial assistant according to the principles of the presently disclosed subject matter.

Referring now to FIG. 3, FIG. 3 is a flowchart of a non-limiting embodiment of a process 300 for developing at least one dialogue template for an intelligent industrial assistant. In some non-limiting embodiments, one or more of the steps of process 300 may be performed (e.g., completely, partially, and/or the like) by user device 105, interface device 101, and/or remote system 106. In some non-limiting embodiments, one or more of the steps of process 300 may be performed (e.g., completely, partially, and/or the like) by another system, another device, another group of systems, or another group of devices (e.g., separate from or including user device 105, interface device 101, and/or remote system 106), such as intelligent industrial assistant 102 (e.g., one or more devices of intelligent industrial assistant 102), database 103*a* (e.g., one or more devices of database 103*a*), external database 103*b* (e.g., one or more devices of external database 103*b*), and/or industrial machine 104 (e.g., one or more devices of industrial machine 104).

As shown in FIG. 3, at step 310, process 300 may include receiving group identification data associated with a group of features (e.g., a group of features associated with an industrial machine 104, a database such as database 103*a* and/or external database 103*b*, and/or the like). For example, user device 105, interface device 101, remote system 106, and/or the like may receive group identification data (e.g., first group identification data) associated with a (first) group of features via a graphical user interface (GUI).

In some non-limiting embodiments, a first view of the GUI may be displayed (e.g., by user device 105, interface device 101, remote system 106, and/or the like). Additionally or alternatively, the first view may include a first set of graphical elements to receive first input associated with the group identification data (e.g., first group identification data) and a second set of graphical elements to receive second input associated with the first feature identification data. In some non-limiting embodiments, receiving first group identification data may include receiving the first input via the first set of graphical elements.

In some non-limiting embodiments, group identification data may be received by any suitable input component(s), e.g., a touchscreen display, a keyboard, a keypad, a mouse, a button, a switch, a microphone, a camera, and/or the like. For example, spoken and/or natural language input may be received from a microphone. Additionally or alternatively, the spoken and/or natural language input may be mapped to group identification data.

As shown in FIG. 3, at step 320, process 300 may include receiving feature identification data associated with a feature of the group of features. For example, user device 105, interface device 101, remote system 106, and/or the like may receive feature identification data (e.g., first feature identification data) associated with a (first) feature of the first group of features via a GUI.

In some non-limiting embodiments, a first view of the GUI may be displayed (e.g., by user device 105, interface device 101, remote system 106, and/or the like). Additionally or alternatively, the first view may include a first set of graphical elements to receive first input associated with the group identification data (e.g., first group identification data) and a second set of graphical elements to receive second input associated with the first feature identification data. In some non-limiting embodiments, receiving first feature identification data may include receiving the second input via the second set of graphical elements.

In some non-limiting embodiments, feature identification data may be received by any suitable input component(s), e.g., a touchscreen display, a keyboard, a keypad, a mouse, a button, a switch, a microphone, a camera, and/or the like. For example, spoken and/or natural language input may be received from a microphone. Additionally or alternatively, the spoken and/or natural language input may be mapped to feature identification data.

As shown in FIG. 3, at step 330, process 300 may include receiving sequence identification data associated with a sequence performable by intelligent industrial assistant 102 based on the feature(s). For example, user device 105, interface device 101, remote system 106, and/or the like may receive (e.g., via a GUI) sequence identification data (e.g., first sequence identification data) associated with a (first) sequence performable by intelligent industrial assistant 102 based on the (first) feature(s).

In some non-limiting embodiments, a second view of the GUI may be displayed (e.g., by user device 105, interface device 101, remote system 106, and/or the like). Additionally or alternatively, the second view may include a third set of graphical elements to receive third input associated with the first sequence identification data and a fourth set of graphical elements to receive fourth input associated with a portion of the expected dialogue data. In some non-limiting embodiments, receiving the first sequence identification data may include receiving the third input via the third set of graphical elements.

In some non-limiting embodiments, sequence identification data may be received by any suitable input component(s), e.g., a touchscreen display, a keyboard, a keypad, a mouse, a button, a switch, a microphone, a camera, and/or the like. For example, spoken and/or natural language input may be received from a microphone. Additionally or alternatively, the spoken and/or natural language input may be mapped to sequence identification data.

As shown in FIG. 3, at step 340, process 300 may include receiving expected dialogue data associated with expected dialogue of the sequence. For example, user device 105, interface device 101, remote system 106, and/or the like may receive expected dialogue data associated with expected dialogue of the (first) sequences via a GUI.

In some non-limiting embodiments, a second view of the GUI may be displayed (e.g., by user device 105, interface device 101, remote system 106, and/or the like). Additionally or alternatively, the second view may include a third set of graphical elements to receive third input associated with the first sequence identification data and a fourth set of graphical elements to receive fourth input associated with a portion of the expected dialogue data. In some non-limiting embodiments, the portion of the expected dialogue data may include expected initiating dialogue data associated with at least one phrase for initiating the first sequence. Additionally or alternatively, receiving the expected dialogue data may include receiving the fourth input via the fourth set of graphical elements.

In some non-limiting embodiments, a third view of the GUI may be displayed (e.g., by user device 105, interface device 101, remote system 106, and/or the like). Additionally or alternatively, the third view may include a fifth set of graphical elements to receive fifth input associated with a second portion of the expected dialogue data. In some non-limiting embodiments, the second portion of the expected dialogue data may include at least one parameter of the expected dialogue data. Additionally or alternatively, receiving the expected dialogue data may include receiving the fifth input via the fifth set of graphical elements.

In some non-limiting embodiments, a fourth view of the graphical user interface may be displayed (e.g., by user device 105, interface device 101, remote system 106, and/or the like). Additionally or alternatively, the fourth view may include a sixth set of graphical elements to receive sixth input associated with a third portion of the expected dialogue data. In some non-limiting embodiments, the third portion of the expected dialogue data may include script data based on the at least one parameter of the expected dialogue data. Additionally or alternatively, receiving the expected dialogue data may include receiving the sixth input via the sixth set of graphical elements.

In some non-limiting embodiments, expected dialogue data may be received by any suitable input component(s), e.g., a touchscreen display, a keyboard, a keypad, a mouse, a button, a switch, a microphone, a camera, and/or the like. For example, spoken and/or natural language input may be received from a microphone. Additionally or alternatively, the spoken and/or natural language input may be mapped to expected dialogue data.

As shown in FIG. 3, at step 350, process 300 may include receiving action data associated with at least one action of the sequence. For example, user device 105, interface device 101, remote system 106, and/or the like may receive action data associated with at least one action of the (first) sequence via a GUI.

In some non-limiting embodiments, a fifth view of the graphical user interface may be displayed (e.g., by user device 105, interface device 101, remote system 106, and/or the like). Additionally or alternatively, the fifth view may include a seventh set of graphical elements to receive seventh input associated with the action data based on the first sequence identification data and the at least one parameter of the expected dialogue data. In some non-limiting embodiments, receiving the action data may include receiving the seventh input via the seventh set of graphical elements.

In some non-limiting embodiments, the action data may include at least one of an audio output of intelligent industrial assistant 102, a text output for display in a dialogue window, a media item for display by intelligent industrial assistant 102 (and/or via interface device 101, user device 105, and/or the like) (e.g., a video, an audio clip, an audiovisual presentation, and combination thereof, and/or the like), a tabular list for display by intelligent industrial assistant 102 (and/or via interface device 101, user device 105, and/or the like), an email output (e.g., indicating an action is complete upon completion thereof), a text message output (e.g., indicating an action is complete upon completion thereof), a report template for outputting by intelligent industrial assistant 102 (and/or via interface device 101, user device 105, and/or the like), a machine interface (e.g., of intelligent industrial assistant 102 and/or machine gateway 102e) for accessing by intelligent industrial assistant 102 (e.g., based on the action data and/or parameter data), a database interface (e.g., database interface 102d) for accessing by the intelligent industrial assistant 102, a document and/or media item search (e.g., in a database such as database 103a, external database 103b, and/or the like), a work order output (e.g., view and/or manage work orders, which may be in a list such as a tabular list, a document, a database, any combination thereof, and/or the like), running an executable file and/or a plugin (e.g., web browser plugin and/or the like), connecting to and/or running an application on a remote system (e.g., remote system 106, a third party remote system, a cloud storage system, a SharePoint system, a computer-aided design and computer-aided manufacturing (CAD/CAM) system, a quality inspection system, any combination thereof, and/or the like), a SQL statement, running a different feature (e.g., identified by feature identification data thereof), any combination thereof, and/or the like. In some non-limiting embodiments at least one media item (e.g., each media item) may include a plurality of media markers (e.g., bookmarks, indexes, time markers/offsets for video and/or audio media, row numbers, column numbers, page numbers, section numbers, portions, and/or the like). Additionally or alternatively, action data may include at least one media marker (e.g., bookmark and/or the like) of the media item (user manual and/or the like) for outputting by intelligent industrial assistant 102.

In some non-limiting embodiments, action data may be received by any suitable input component(s), e.g., a touchscreen display, a keyboard, a keypad, a mouse, a button, a switch, a microphone, a camera, and/or the like. For example, spoken and/or natural language input may be received from a microphone. Additionally or alternatively, the spoken and/or natural language input may be mapped to action data.

As shown in FIG. 3, at step 360, process 300 may include generating a dialogue template based on the group identification data, the feature identification data, the sequence identification data, the expected dialogue data, and the action data. For example, user device 105, interface device 101, remote system 106, and/or the like may generate a dialogue template (e.g., first dialogue template) based on the (first) group identification data, the (first) feature identification data, the (first) sequence identification data, the expected dialogue data, and the action data.

In some non-limiting embodiments, the dialogue template may include group identifier data associated with at least one group of features (e.g., group of features for an industrial machine, group of features for a database, group of features for a provider of industrial machines, group of features for a role of a user (e.g., machine operator and/or the like), and/or the like). Additionally or alternatively, each group of features associated with respective group identifier data may include at least one feature (e.g., a plurality of features and/or the like). Additionally or alternatively, each feature associated with respective feature identifier data may include at least one sequence (e.g., a plurality of sequences). Additionally or alternatively, each sequence associated with respective sequence identifier data may include at least one item of expected dialogue data (e.g., expected initiating dialogue data, parameter data, script data, and/or the like). Additionally or alternatively, each sequence associated with respective sequence identifier data may include at least one action (e.g. a plurality of actions and/or the like). In some non-limiting embodiments, script data may link at least two sequences (e.g., a plurality of sequences and/or the like) to form a complex feature, as described herein.

In some non-limiting embodiments, user device 105, interface device 101, remote system 106, and/or the like may add the first dialogue template to package data (e.g., package 102cc and/or the like) for intelligent industrial assistant 102. Additionally or alternatively, user device 105, interface device 101, remote system 106, and/or the like may communicate the package data (e.g., package 102cc and/or the like) to intelligent industrial assistant 102.

In some non-limiting embodiments, interface device 101, remote system 106, and/or the like may communicate the first dialogue template to intelligent industrial assistant 102. Additionally or alternatively, intelligent industrial assistant 102 may add the first dialogue template to package data (e.g., package 102cc and/or the like) of intelligent industrial assistant 102.

In some non-limiting embodiments, the dialogue template (e.g., first dialogue template) may be verified (e.g., checked to ensure it does not contain errors), e.g., by interface device 101, user device 105, remote system 106, intelligent industrial assistant 102, and/or the like.

In some non-limiting embodiments, the first dialogue template may be communicated to remote system 106 (e.g., from interface device 101, user device 105, intelligent industrial assistant 102, and/or the like). Additionally or alternatively, remote system 106 may add the first dialogue template to package data (e.g., package 102cc and/or the like) for intelligent industrial assistant 102. Additionally or alternatively, remote system 106 may communicate the package data (e.g., package 102cc and/or the like) to intelligent industrial assistant 102.

In some non-limiting embodiments, language data associated with at least one language associated with at least one of the group identification data, the feature identification data, the sequence identification data, any combination thereof, and/or the like may be received (e.g., by user device 105, interface device 101, remote system 106, and/or the like). For example, the first view of the GUI may include an additional set of graphical elements to receive additional input associated with the language data.

Figure 4:
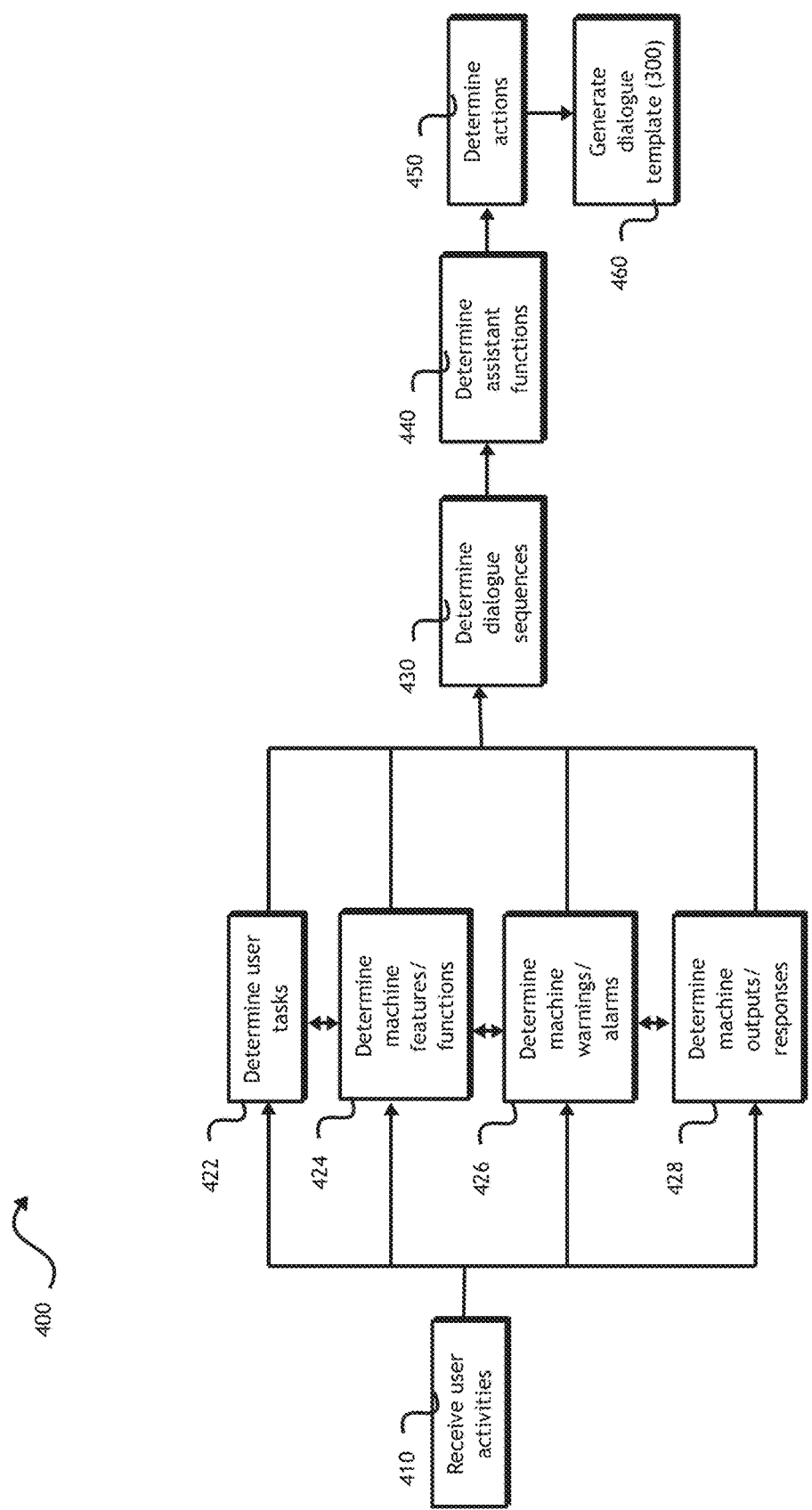
FIG. 4 is a flowchart of a non-limiting embodiment of a process for establishing an ethnographic relationship according to the principles of the presently disclosed subject matter.

Referring now to FIG. 4, FIG. 4 is a flowchart of a non-limiting embodiment of a process 400 for establishing an ethnographic relationship, which may be used with the process 300 shown in FIG. 3. In some non-limiting embodiments, one or more of the steps of process 400 may be performed (e.g., completely, partially, and/or the like) by intelligent industrial assistant 102 (e.g., one or more devices of intelligent industrial assistant 102). In some non-limiting embodiments, one or more of the steps of process 400 may be performed (e.g., completely, partially, and/or the like) by another system, another device, another group of systems, or another group of devices, separate from or including intelligent industrial assistant 102, such as interface device 101 (e.g., one or more devices of interface device 101), database 103a (e.g., one or more devices of database 103a), external database 103b (e.g., one or more devices of external database 103b), industrial machine 104 (e.g., one or more devices of industrial machine 104), user device 105, and/or remote server 106 (e.g., one or more devices of remote server 106).

In some non-limiting embodiments, ethnography may include studying (e.g., observing, receiving activity data regarding, and/or the like) at least one member of a group (e.g., a group of users with a same or similar role). For example, groups of users may include a group of users with roles as machine operators (e.g., of a particular type of machine, a particular model of machine, a set of machines at a particular factory, and/or the like), a group of users with roles as supervisors (e.g., of machine operators, factories, and/or the like), a group of users with roles as manufacturing engineers, a group of users with roles as maintenance personnel, a group of users with roles as salesmen, a group of users with roles as field service engineers, and/or the like. Additionally or alternatively, establishing ethnographic relationships may include generating at least one dialogue template based on at least one activity of at least one member of a group.

As shown in FIG. 4, at step 410, process 400 may include receiving user activity data associated with at least one user activity. For example, intelligent industrial assistant 102 (and/or another device separate from or including intelligent industrial assistant 102, such as interface device 101, database 103a, external database 103b, industrial machine 104, user device 105, and/or remote server 106) may receive user activity data from a user (e.g., operator of an industrial machine and/or the like), from an observer of such a user, and/or the like. In some non-limiting embodiments, the activity data may include at least one activity (e.g., task; action; report; any combination thereof; any sequence, group, flow, and/or the like thereof; and/or the like). In some non-limiting embodiments, the activity (or activities) of the user may be specific to the role of such user (e.g., machine operator and/or the like).

As shown in FIG. 4, at step 422, process 400 may include determining user tasks based on the user activity data. For example, intelligent industrial assistant 102 (and/or another device separate from or including intelligent industrial assistant 102, such as interface device 101, database 103a, external database 103b, industrial machine 104, user device 105, and/or remote server 106) may determine user tasks based on the activity data. For example, intelligent industrial assistant 102 may parse the activity data to identify individual tasks.

As shown in FIG. 4, at step 424, process 400 may include determining machine features/functions based on the user tasks. For example, intelligent industrial assistant 102 (and/or another device separate from or including intelligent industrial assistant 102, such as interface device 101, database 103a, external database 103b, industrial machine 104, user device 105, and/or remote server 106) may determine machine features (e.g., functions, commands, variables, fields, inputs, outputs, any combination thereof, and/or the like) based on the user tasks. In some non-limiting embodiments, intelligent industrial assistant 102 may determine the machine features based on a predetermined mapping between at least one user task and at least one machine feature. Additionally or alternatively, intelligent industrial assistant 102 may receive input from a user (e.g., machine operator), an observer of the user, and/or the like associating at least one user task with at least one machine feature.

As shown in FIG. 4, at step 426, process 400 may include determining possible machine warnings and/or notifications based on the user tasks and/or the machine features. For example, intelligent industrial assistant 102 (and/or another device separate from or including intelligent industrial assistant 102, such as interface device 101, database 103a, external database 103b, industrial machine 104, user device 105, and/or remote server 106) may determine possible machine warnings (e.g., alarms, alerts, and/or the like) and/or notifications (e.g., announcements, status updates, process completion notifications, timer notifications, and/or the like) based on the user tasks and/or the machine features. In some non-limiting embodiments, intelligent industrial assistant 102 may determine possible machine warnings and/or notifications based on a predetermined mapping between at least one machine warning and/or notification and at least one machine feature. Additionally or alternatively, intelligent industrial assistant 102 may receive input from a user (e.g., machine operator), an observer of the user, and/or the like associating at least one possible machine warning and/or notification with at least one machine feature.

As shown in FIG. 4, at step 428, process 400 may include determining possible machine responses. For example, intelligent industrial assistant 102 (and/or another device separate from or including intelligent industrial assistant 102, such as interface device 101, database 103a, external database 103b, industrial machine 104, user device 105, and/or remote server 106) may determine possible machine responses (e.g., outputs, response messages, reports, warnings, and/or the like) based on at least one of the user tasks, the machine features, the possible machine warnings/notifications, any combination thereof, and/or the like. In some non-limiting embodiments, intelligent industrial assistant 102 may determine possible machine responses based on a predetermined mapping between at least one possible machine responses and at least one machine feature. Additionally or alternatively, intelligent industrial assistant 102 may receive input from a user (e.g., machine operator), an observer of the user, and/or the like associating at least one possible machine response with at least one machine feature.

As shown in FIG. 4, at step 430, process 400 may include determining a dialogue sequence. For example, intelligent industrial assistant 102 (and/or another device separate from or including intelligent industrial assistant 102, such as interface device 101, database 103a, external database 103b, industrial machine 104, user device 105, and/or remote server 106) may determine at least one dialogue sequence based on at least one of the user tasks, the machine features, the possible machine warnings/notifications, the possible machine responses, any combination thereof, and/or the like. In some non-limiting embodiments, intelligent industrial assistant 102 may determine the dialogue sequence(s) based on a predetermined mapping between at least one dialogue sequence and at least one of the user tasks, the machine features, the possible machine warnings/notifications, the possible machine responses, any combination thereof, and/or the like. Additionally or alternatively, intelligent industrial assistant 102 may receive input from a user (e.g., machine operator), an observer of the user, and/or the like associating at least one dialogue sequence with at least one of the user tasks, the machine features, the possible machine warnings/notifications, the possible machine responses, any combination thereof, and/or the like.

As shown in FIG. 4, at step 440, process 400 may include determining applicable functions of intelligent industrial assistant 102. For example, intelligent industrial assistant 102 (and/or another device separate from or including intelligent industrial assistant 102, such as interface device 101, database 103a, external database 103b, industrial machine 104, user device 105, and/or remote server 106) may determine at least one applicable function of intelligent industrial assistant 102 based on at least one of the user tasks, the machine features, the possible machine warnings/notifications, the possible machine responses, the dialogue sequences, any combination thereof, and/or the like. In some non-limiting embodiments, intelligent industrial assistant 102 may determine the applicable function(s) of intelligent industrial assistant 102 based on a predetermined mapping between at least one function of industrial assistant 102 and at least one of the user tasks, the machine features, the possible machine warnings/notifications, the possible machine responses, the dialogue sequences, any combination thereof, and/or the like. Additionally or alternatively, intelligent industrial assistant 102 may receive input from a user (e.g., machine operator), an observer of the user, and/or the like associating at least one function of industrial assistant 102 with at least one of the user tasks, the machine features, the possible machine warnings/notifications, the possible machine responses, the dialogue sequences, any combination thereof, and/or the like.

As shown in FIG. 4, at step 450, process 400 may include determining actions. For example, intelligent industrial assistant 102 (and/or another device separate from or including intelligent industrial assistant 102, such as interface device 101, database 103a, external database 103b, industrial machine 104, user device 105, and/or remote server 106) may determine at least one action based on at least one of the applicable functions of intelligent industrial assistant 102, the user tasks, the machine features, the possible machine warnings/notifications, the possible machine responses, the dialogue sequences, any combination thereof, and/or the like. In some non-limiting embodiments, intelligent industrial assistant 102 may determine the actions(s) based on a predetermined mapping between at least one action and at least one applicable functions of intelligent industrial assistant 102. Additionally or alternatively, intelligent industrial assistant 102 may receive input from a user (e.g., machine operator), an observer of the user, and/or the like associating at least one action with at least one of the applicable functions of industrial assistant 102, the user tasks, the machine features, the possible machine warnings/notifications, the possible machine responses, the dialogue sequences, any combination thereof, and/or the like.

As shown in FIG. 4, at step 460, process 400 may include generating at least one dialogue template. For example, intelligent industrial assistant 102 (and/or another device separate from or including intelligent industrial assistant 102, such as interface device 101, database 103a, external database 103b, industrial machine 104, user device 105, and/or remote server 106) may generate a dialogue template based on at least one of the applicable functions of intelligent industrial assistant 102, the user tasks, the machine features, the possible machine warnings/notifications, the possible machine responses, the dialogue sequences, the actions, any combination thereof, and/or the like. For example, a dialogue template may include and/or be based on at least one of function data, group data, feature data, sequence data, parameter data, expected dialogue data, action data, any combination thereof, and/or the like, each of which may be determined at least in part based on at least one of the applicable functions of intelligent industrial assistant 102, the user tasks, the machine features, the possible machine warnings/notifications, the possible machine responses, the dialogue sequences, the actions, any combination thereof, and/or the like. In some non-limiting embodiments, the dialogue template may be generated based on a predetermined mapping between at least a portion of at least one of the applicable functions of intelligent industrial assistant 102, the user tasks, the machine features, the possible machine warnings/notifications, the possible machine responses, the dialogue sequences, the actions, any combination thereof, and/or the like and at least one of function data, group data, feature data, sequence data, parameter data, expected dialogue data, action data, any combination thereof, and/or the like. Additionally or alternatively, input may be received from a user (e.g., machine operator), an observer of the user, and/or the like associating at least a portion of at least one of the applicable functions of intelligent industrial assistant 102, the user tasks, the machine features, the possible machine warnings/notifications, the possible machine responses, the dialogue sequences, the actions, any combination thereof, and/or the like with at least one of function data, group data, feature data, sequence data, parameter data, expected dialogue data, action data, any combination thereof, and/or the like.

In some non-limiting embodiments, generating the dialogue template(s) may include process 300, as described herein, e.g., based (at least partially) on at least one of the applicable functions of intelligent industrial assistant 102, the user tasks, the machine features, the possible machine warnings/notifications, the possible machine responses, the dialogue sequences, the actions, any combination thereof, and/or the like. For example, each user task may be associated with at least one dialogue template (e.g., at least one dialogue template may be generated for each user task).

Additionally or alternatively, the group identification data may be based (at least partially) on the machine features and/or the respective user task. Additionally or alternatively, the features identification data may be based (at least partially) on the machine features and/or the respective user task. Additionally or alternatively, the sequence identification data may be based (at least partially) on the machine features and/or the respective user task. The expected dialog may be based (at least partially) on the machine features, the respective user task, the possible machine warnings/notifications, the possible machine responses, the dialogue sequences, the applicable functions of intelligent industrial assistant 102, and/or the actions. Additionally or alternatively, the action data may be based (at least partially) on the user tasks, the machine features, the possible machine warnings/notifications, the possible machine responses, the dialogue sequences, the applicable functions of intelligent industrial assistant 102, and/or the actions.

Referring now to FIGS. 5A-5L, FIGS. 5A-5L are screenshots of an exemplary GUI according to a non-limiting implementation of the process 300 shown in FIG. 3. In some non-limiting embodiments, one or more of the views of the GUI may be displayed (e.g., completely, partially, and/or the like) by user device 105, interface device 101, and/or remote system 106. In some non-limiting embodiments, one or more of the views of the GUI may be displayed (e.g., completely, partially, and/or the like) by another system, another device, another group of systems, or another group of devices (e.g., separate from or including user device 105, interface device 101, and/or remote system 106), such as intelligent industrial assistant 102 (e.g., one or more devices of intelligent industrial assistant 102), database 103a (e.g., one or more devices of database 103a), external database 103b (e.g., one or more devices of external database 103b), and/or industrial machine 104 (e.g., one or more devices of industrial machine 104).

Figure 5A:
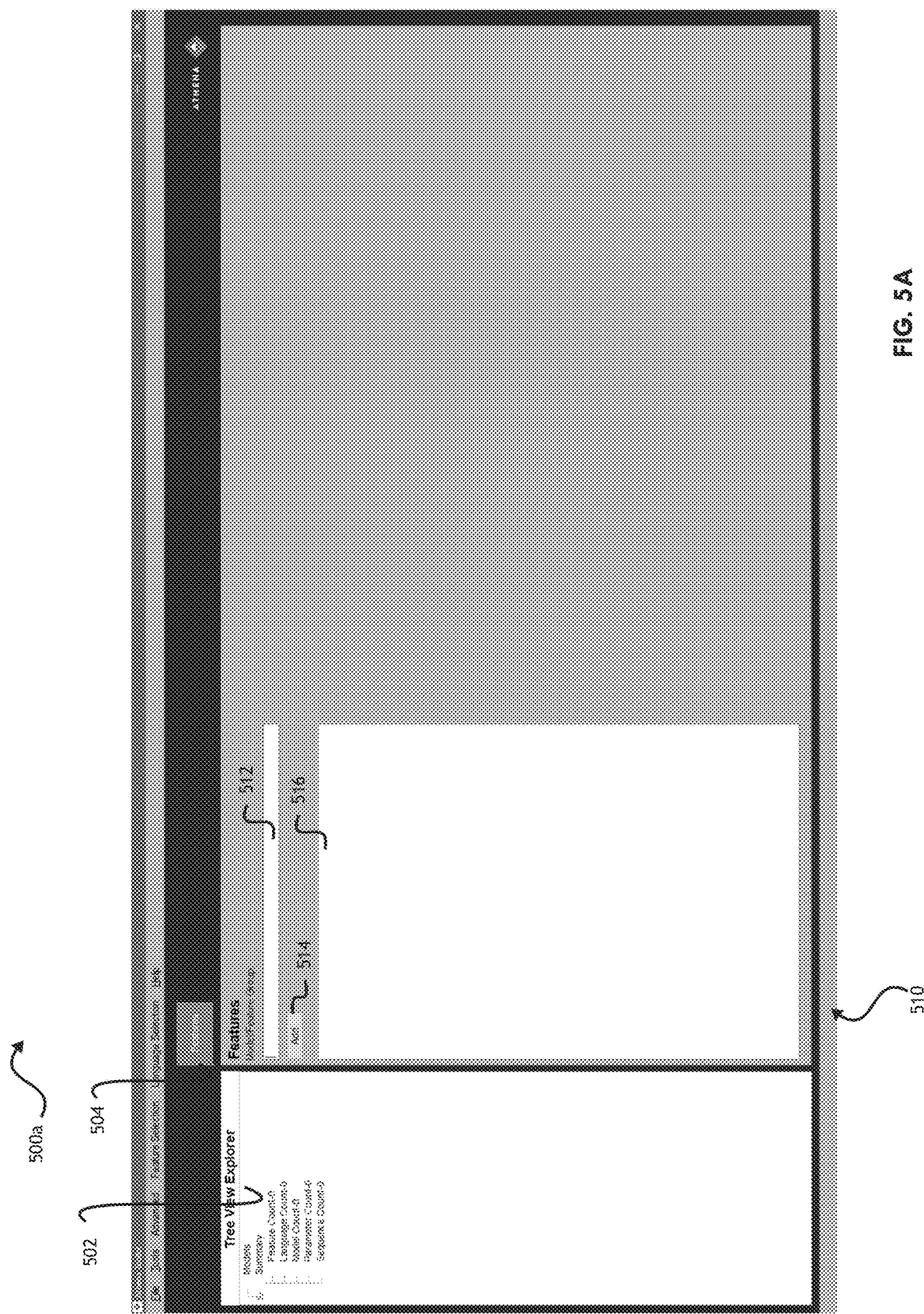

In some non-limiting embodiments, first view 500a of the GUI may be displayed (e.g., by user device 105, interface device 101, remote system 106, and/or the like). For example, as shown in FIG. 5A, first view 500a of the GUI may include tree explorer 502 that dynamically updates a tree summarizing the dialogue template being generated based on inputs received from the user. Additionally or alternatively, at least one button 504 (e.g., navigation button, tab button, and/or the like) may be included in the GUI (e.g., first view 500a thereof), and/or the selection of the button(s) 504 may navigate the GUI between the different views thereof.

In some non-limiting embodiments, first view 500a may include first set of graphical elements 510 (e.g., text boxes, buttons, selectable lists, checkboxes, radio buttons, any combination thereof, and/or the like) to receive a first input associated with the group identification data (e.g., first group identification data). For example, first set of graphical elements 510 may include at least one textbox 512, at least one button 514, at least one selectable list 516, any combination thereof, and/or the like. In some non-limiting embodiments, a user may input (e.g., type and/or the like) at least a portion of the first input (e.g., associated with the (first) group identification data) into textbox 512. Additionally or alternately, the first input may include the user selecting button 514 (e.g., after having typed the (first) group identification data into textbox 512) to add the inputted data to selectable list 516. In some non-limiting embodiments, the group identification data may include a name (e.g., industrial machine name, features group name, any combination thereof, and/or the like), a number (e.g., industrial machine model number, industrial machine serial number, feature group number, any combination thereof, and/or the like), any combination thereof, and/or the like.

Figure 5B:
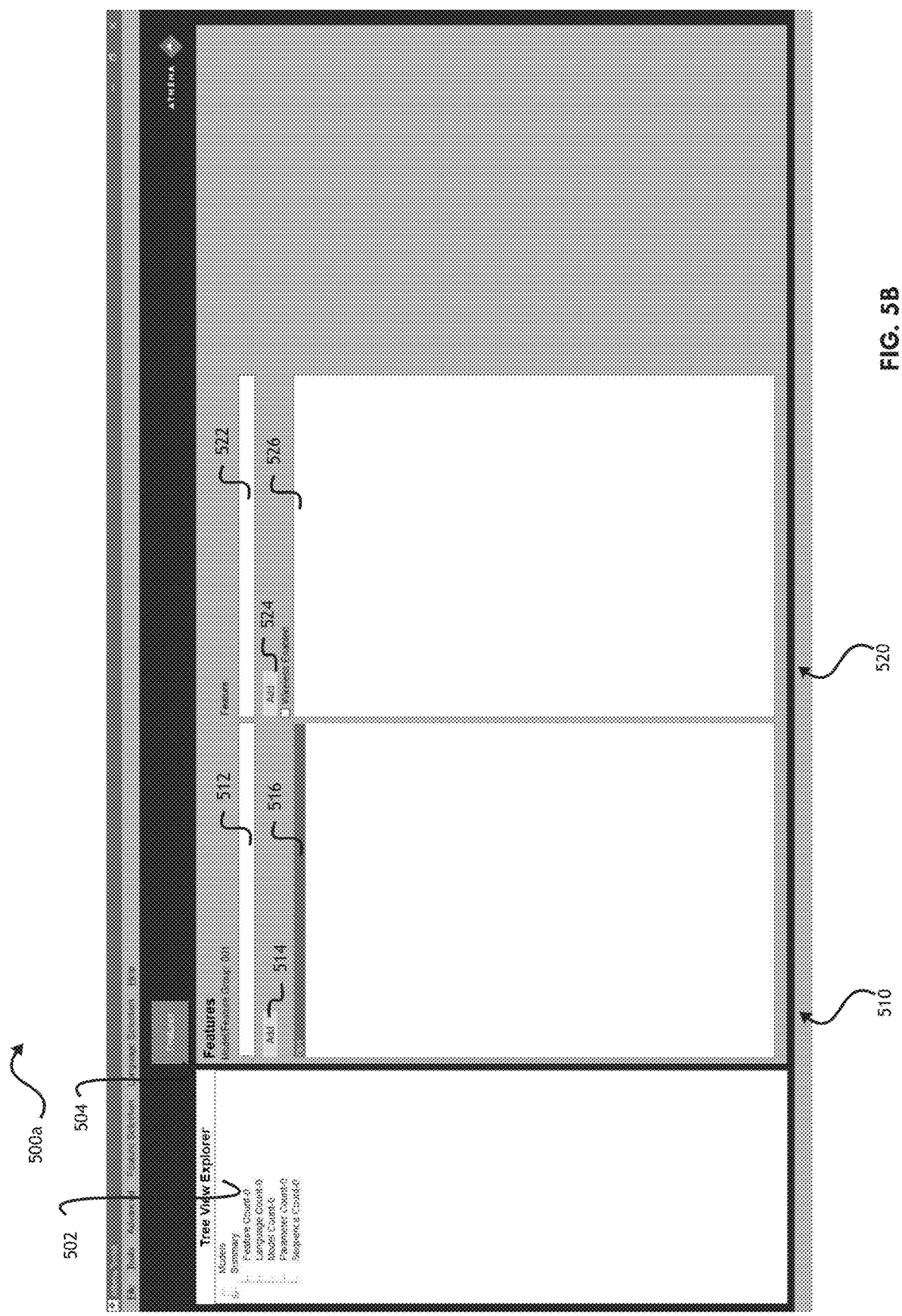

In some non-limiting embodiments, as shown in FIG. 5B, first view 500a may include second set of graphical elements 520 (e.g., text boxes, buttons, selectable lists, checkboxes, radio buttons, any combination thereof, and/or the like) to receive second input associated with feature identification data (e.g., first feature identification data). For example, second set of graphical elements 520 may include at least one textbox 522, at least one button 524, at least one selectable list 526, any combination thereof, and/or the like. In some non-limiting embodiments, second set of graphical elements 520 may be displayed (e.g., in the GUI by user device 105, interface device 101, remote system 106, and/or the like) in response to receiving at least one first input via first set of graphical elements 510. In some non-limiting embodiments, a user may input (e.g., type and/or the like) at least a portion of the second input (e.g., associated with the (first) feature identification data) into textbox 522. Additionally or alternately, the second input may include the user selecting button 524 (e.g., after having typed the (first) feature identification data into textbox 522) to add the inputted data to selectable list 526. In some non-limiting embodiments, the feature identification data may include a name (e.g., feature name and/or the like), a number (e.g., feature number and/or the like), any combination thereof, and/or the like.

Figure 5C:
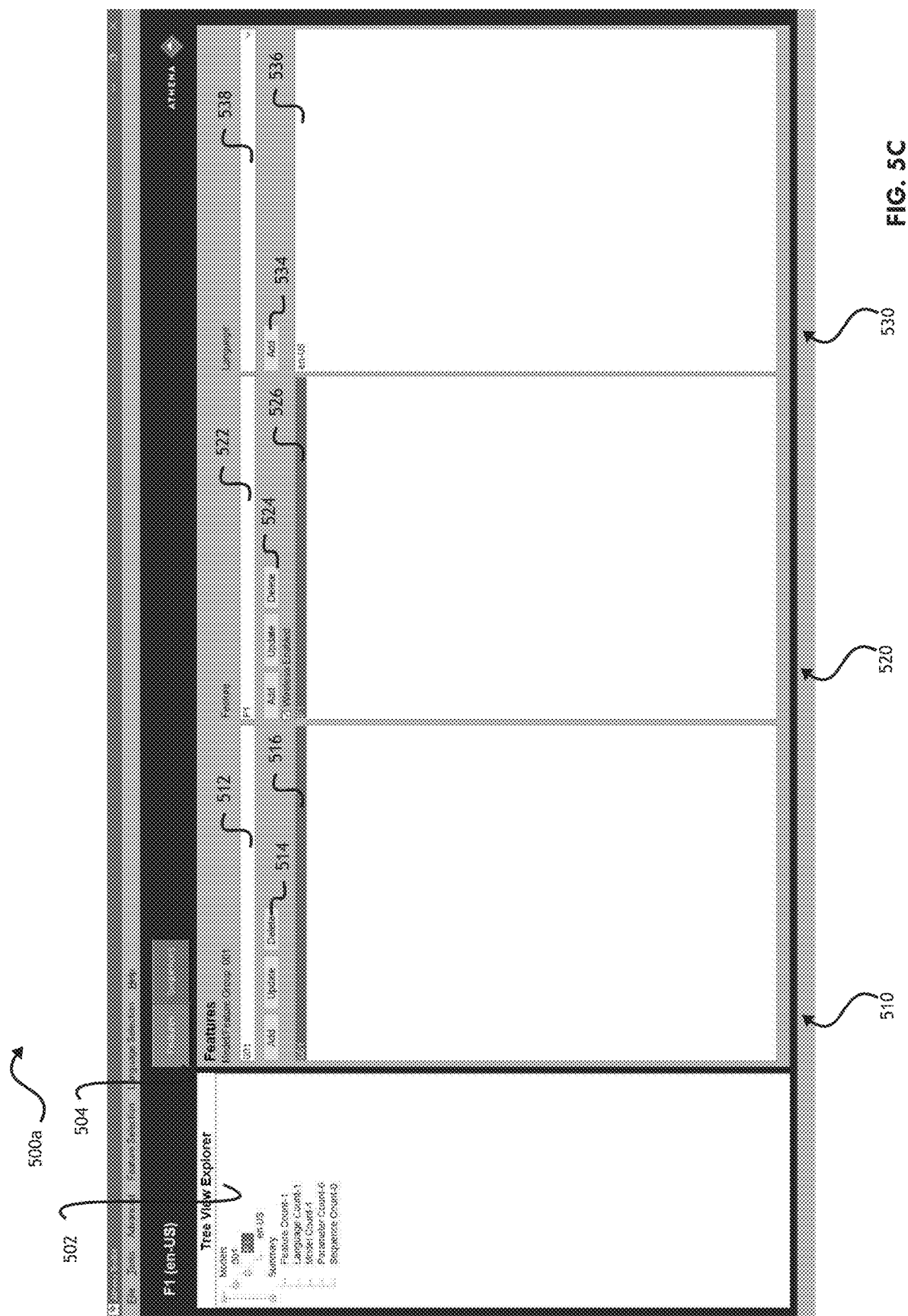

In some non-limiting embodiments, as shown in FIG. 5C, first view 500a may include third set of graphical elements 530 (e.g., text boxes, buttons, selectable lists, checkboxes, radio buttons, any combination thereof, and/or the like) to receive third input associated with language data (e.g., first language data associated with at least one language associated with at least one of the group identification data, the feature identification data, the sequence identification data, any combination thereof, and/or the like). For example, third set of graphical elements 530 may include at least one dropdown menu 532 (e.g., including a listing of supported languages and/or the like), at least one button 534, at least one selectable list 536, any combination thereof, and/or the like. In some non-limiting embodiments, third set of graphical elements 530 may be displayed (e.g., in the GUI by user device 105, interface device 101, remote system 106, and/or the like) in response to receiving at least one second input via second set of graphical elements 520. Additionally or alternatively, at least one additional button 504 for navigating to another view (e.g., second view and/or the like) may be displayed (e.g., in the GUI by user device 105, interface device 101, remote system 106, and/or the like) in response to receiving the second input(s). In some non-limiting embodiments, a user may input (e.g., select and/or the like) at least a portion of the third input (e.g., associated with the language data) via dropdown menu 538. Additionally or alternately, the third input may include the user selecting button 534 (e.g., after having selected at least one language for the language data from dropdown menu 538) to add the inputted data to selectable list 536. In some non-limiting embodiments, the language data may include a name (e.g., language name and/or the like), a number (e.g., language number and/or the like), any combination thereof, and/or the like.

In some non-limiting embodiments, the content of selectable lists 516, 526, and/or 536 may be updated and/or deleted by selecting an item in a respective list and selecting a respective one of the buttons 514, 524, and/or 534.

Figure 5D:

In some non-limiting embodiments, second view 500b of the GUI may be displayed (e.g., by user device 105, interface device 101, remote system 106, and/or the like). For example, as shown in FIG. 5D, second view 500b of the GUI may include tree explorer 502, navigation button(s) 504, and/or the like, as described herein.

In some non-limiting embodiments, second view 500b may include fourth set of graphical elements 540 (e.g., text boxes, buttons, selectable lists, checkboxes, radio buttons, any combination thereof, and/or the like) to receive fourth input associated with sequence identification data (e.g., first sequence identification data) associated with at least one sequence performable by intelligent industrial assistant 102 based on the feature(s). For example, fourth set of graphical elements 540 may include at least one textbox 542, at least one button 544, at least one selectable list 546, any combination thereof, and/or the like. In some non-limiting embodiments, fourth set of graphical elements 540 may be displayed (e.g., in the GUI by user device 105, interface device 101, remote system 106, and/or the like) in response to receiving at least one user selection of a navigation button 504. Additionally or alternatively, at least one additional button 504 for navigating to another view (e.g., third view, fourth view, fifth view, and/or the like) may be displayed (e.g., in the GUI by user device 105, interface device 101, remote system 106, and/or the like) in response to displaying second view 500b. In some non-limiting embodiments, a user may input (e.g., type and/or the like) at least a portion of the fourth input (e.g., associated with the (first) sequence identification data) via textbox 542. Additionally or alternately, the fourth input may include the user selecting button 544 (e.g., after having typed the (first) sequence identification data into textbox 542) to add the inputted data to selectable list 546. In some non-limiting embodiments, the sequence identification data may include a name (e.g., sequence name and/or the like), a number (e.g., sequence number and/or the like), any combination thereof, and/or the like. In some non-limiting embodiments, the content of selectable list 544 may be updated and/or deleted by selecting an item in selectable list 544 and selecting a respective one of the buttons 544.

In some non-limiting embodiments, second view 500b may include fifth set of graphical elements 550 (e.g., text boxes, buttons, selectable lists, checkboxes, radio buttons, any combination thereof, and/or the like) to receive fifth input associated with at least a portion of expected dialog data (e.g., expected initiating dialogue data associated with at least one phrase for initiating the respective sequence by intelligent industrial assistant 102). For example, fifth set of graphical elements 550 may include at least one textbox 552, at least one button 554, at least one selectable list 556, any combination thereof, and/or the like. In some non-limiting embodiments, fifth set of graphical elements 550 may be displayed (e.g., in the GUI by user device 105, interface device 101, remote system 106, and/or the like) in response to receiving the fourth input(s) via fourth set of graphical elements 540. In some non-limiting embodiments, a user may input (e.g., type and/or the like) at least a portion of the fifth input (e.g., at least one phrase associated with expected initiating dialogue data) via textbox 552. Additionally or alternately, the fifth input may include the user selecting button 554 (e.g., after having typed each respective phrase associated with the expected initiating dialogue data into textbox 552) to add the inputted data to selectable list 556. In some non-limiting embodiments, the portion of the expected dialogue data may include a phrase (e.g., set of words and/or the like), a parameter (e.g., replaceable variable set off in angle brackets (e.g., < >) and/or the like), any combination thereof, and/or the like. Additionally or alternatively, inputting a parameter (e.g., set off in angle brackets < >) may cause the parameter to be added to a dropdown menu 568 in a third view 500c (as further described below). In some non-limiting embodiments, the content of selectable list 554 may be updated and/or deleted by selecting an item in selectable list 556 and selecting a respective one of the buttons 554.

In some non-limiting embodiments, expected dialogue data may include a plurality of alternative items of expected dialogue associated with one sequence. For example, the plurality of alternative items of expected dialogue may include synonyms, alternative phrasings, and/or the like that express a same intent of the user to perform an activity (e.g., at least one action, task, and/or the like) associated with the same dialogue template (e.g., "Start warm up cycle," "Warm up the machine," and/or the like may be alternative items of expected dialogue to initiate a warm-up process for an industrial machine 104; "Run process 1234," "Start m-code 1234," and/or the like may be alternative items of expected dialogue to initiate a process associated with the stated code; "Report current tool," "Inform about current tool," and/or the like may be alternative items of expected dialogue to request information on a current tool; "Turn on the lights," "Lights on," and/or the like may be alternative items of expected dialogue to request turning on the lights; and/or the like).

In some non-limiting embodiments, expected dialogue data may include a semantic equivalent for at least a subset of the plurality of alternative items. Additionally or alternatively, each of (the subset of) the plurality of alternative items may be mapped to the semantic equivalent. For example, alternative phrases such as "I want to change the tool," "Change the tool," "Please change the tool," "Change tool <toolname>," "Change tool number <toolnumber>," and/or the like may all be mapped to the semantic equivalent "Change the tool." In some non-limiting embodiments, a user may select selecting a respective button 554 (e.g., "Rule" button) to display a popup window 550a including at least one textbox 552a. Additionally or alternatively, a user may input (e.g., type and/or the like) the semantic equivalent via respective a textbox 552a for each item from selectable list 556.

Figure 5E:
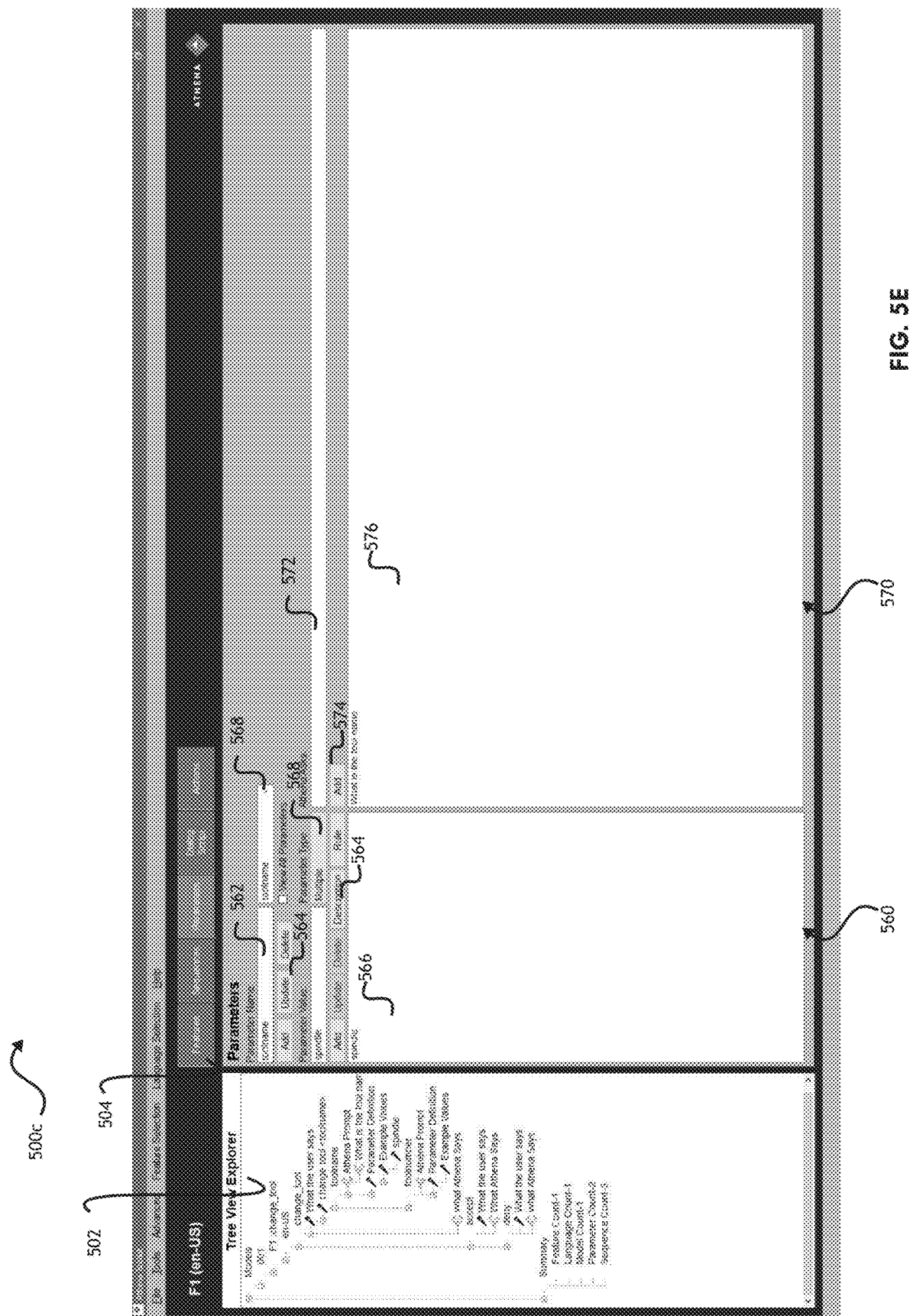
Figure 5F:
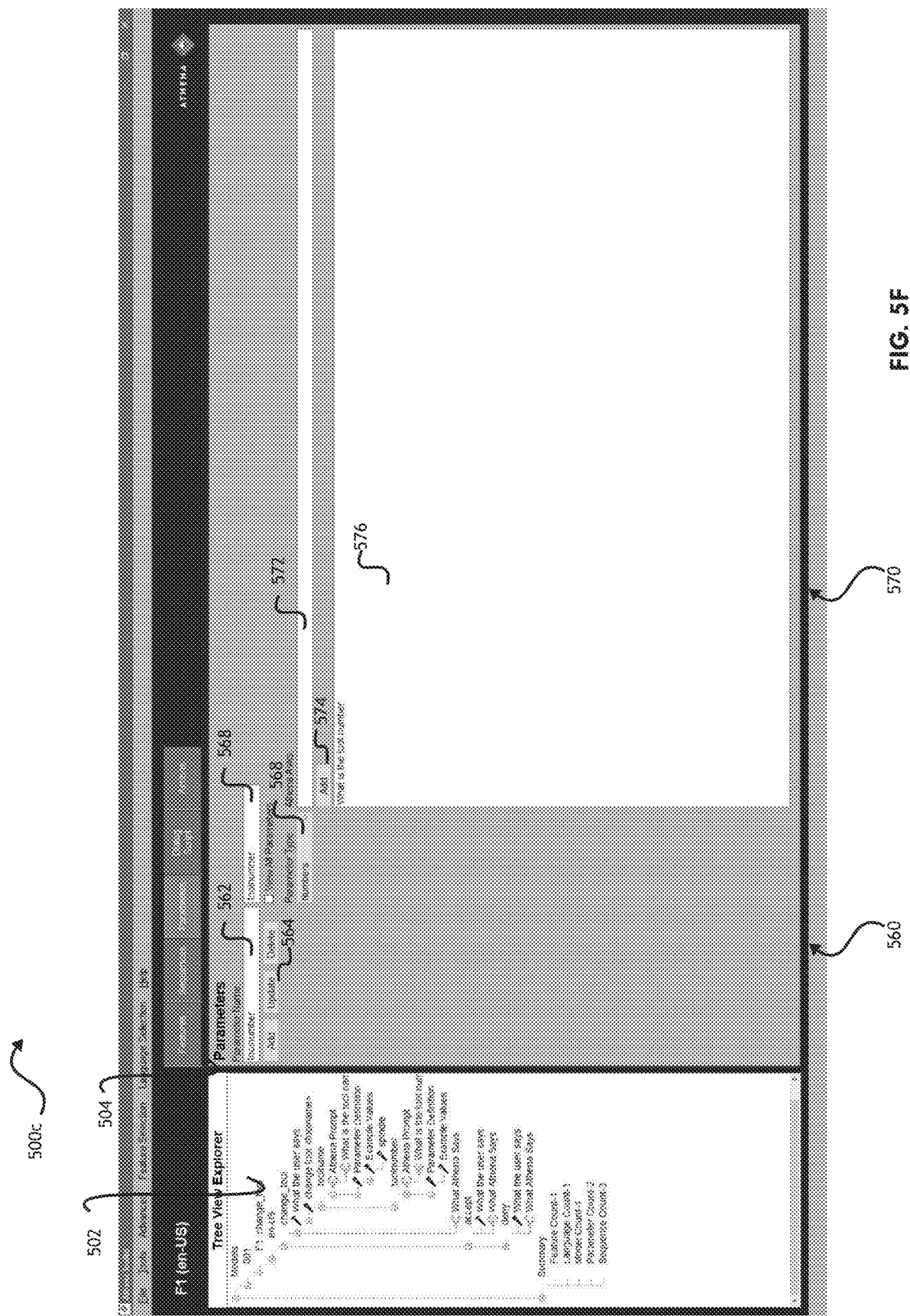
Figure 5G:
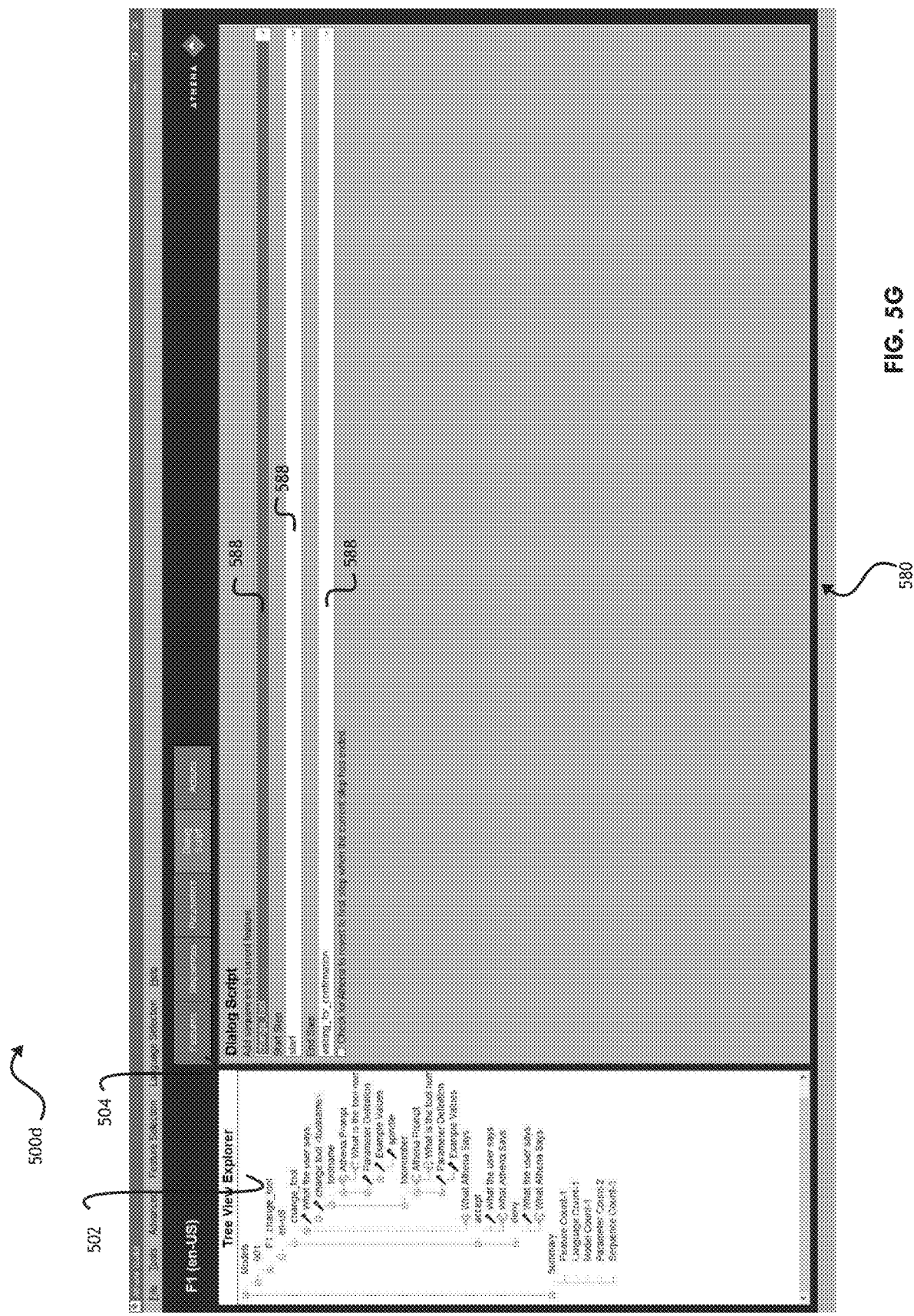
Figures 5H, 5I, 5J:
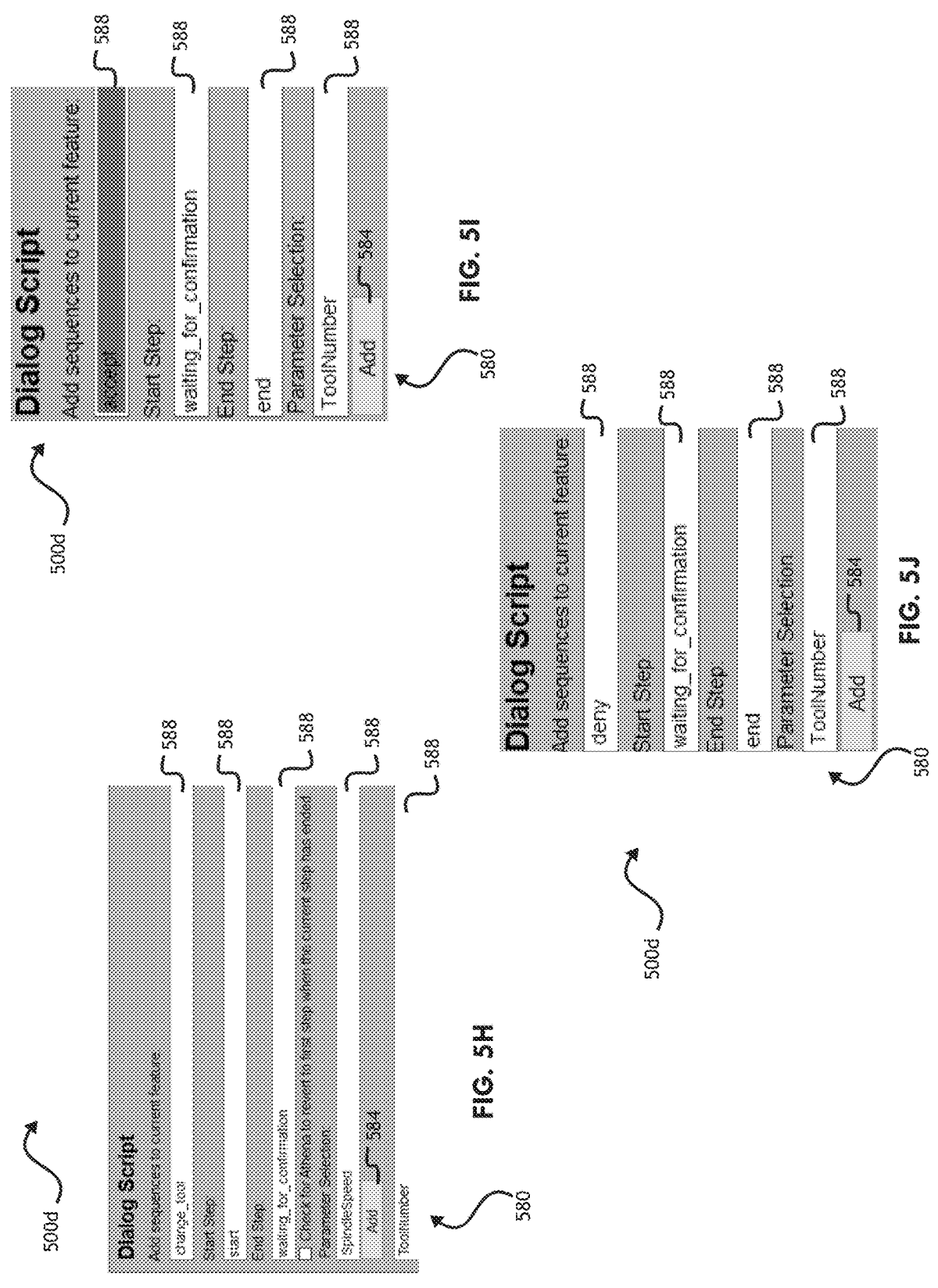

In some non-limiting embodiments, third view 500c of the GUI may be displayed (e.g., by user device 105, interface device 101, remote system 106, and/or the like). For example, as shown in FIGS. 5E-5F, third view 500c of the GUI may include tree explorer 502, navigation button(s) 504, and/or the like, as described herein.

In some non-limiting embodiments, third view 500c may include sixth set of graphical elements 560 (e.g., text boxes, buttons, selectable lists, checkboxes, radio buttons, any combination thereof, and/or the like) to receive sixth input associated with parameter data (e.g., first parameter data) associated with at least one parameter (e.g., value, category, word, and/or the like) associated with at least one item of expected dialogue. For example, fifth set of graphical elements 550 may include at least one textbox 562, at least one button 564, at least one selectable list 566, at least one dropdown menu 568, any combination thereof, and/or the like. In some non-limiting embodiments, sixth set of graphical elements 560 may be displayed (e.g., in the GUI by user device 105, interface device 101, remote system 106, and/or the like) in response to receiving at least one user selection of a navigation button 504 and/or in response to displaying third view 500c. In some non-limiting embodiments, a user may input at least a portion of the sixth input (e.g., associated with the (first) parameter data) by selecting a parameter type from a respective dropdown menu 568. Additionally or alternatively, e.g., based on the parameter type, the sixth input may include the user inputting at least a portion of the sixth input by typing in textbox 562, selecting one of the parameters from a respective dropdown menu 568, any combination thereof, and/or the like. For example, it may be unnecessary for a user to provide further input if the parameter type is a number, a letter, an alphanumeric sequence, a dictation, and/or the like, and/or a user may provide further input associated with the parameter if the parameter type is at least one specific word and/or phrase (e.g., "Multiple"), a custom set of values (e.g., number values, alphanumeric values, and/or the like) (e.g., "Custom"). Additionally or alternatively, the sixth input may include the user selecting button 564 to add the inputted (e.g., typed and/or selected) data to selectable list 566. In some non-limiting embodiments, the parameter data may include a name (e.g., parameter name and/or the like), a description (e.g., parameter description and/or the like), any combination thereof, and/or the like. In some non-limiting embodiments, the content of selectable list 564 may be updated and/or deleted by selecting an item in selectable list 564 and selecting a respective one of the buttons 564.

In some non-limiting embodiments, third view 500c may include seventh set of graphical elements 570 (e.g., text boxes, buttons, selectable lists, checkboxes, radio buttons, any combination thereof, and/or the like) to receive seventh input associated with at least a portion of expected dialog data (e.g., expected parameter dialogue data associated with at least one phrase for requesting a parameter by intelligent industrial assistant 102 and/or the like). For example, seventh set of graphical elements 570 may include at least one textbox 572, at least one button 574, at least one selectable list 576, any combination thereof, and/or the like. In some non-limiting embodiments, seventh set of graphical elements 570 may be displayed (e.g., in the GUI by user device 105, interface device 101, remote system 106, and/or the like) in response to receiving the sixth input(s) via sixth set of graphical elements 560. In some non-limiting embodiments, a user may input (e.g., type and/or the like) at least a portion of the seventh input (e.g., at least one phrase associated with expected parameter dialogue data) via textbox 572. Additionally or alternately, the seventh input may include the user selecting button 574 (e.g., after having typed each respective phrase associated with the expected parameter dialogue data into textbox 572) to add the inputted data to selectable list 576. In some non-limiting embodiments, the portion of the expected dialogue data may include a phrase (e.g., set of words and/or the like) and/or the like. In some non-limiting embodiments, the content of selectable list 576 may be updated and/or deleted by selecting an item in selectable list 576 and selecting a respective one of the buttons 574.

In some non-limiting embodiments, fourth view 500d of the GUI may be displayed (e.g., by user device 105, interface device 101, remote system 106, and/or the like). For example, as shown in FIGS. 5G-5J, fourth view 500d of the GUI may include tree explorer 502, navigation button(s) 504, and/or the like, as described herein.

In some non-limiting embodiments, fourth view 500d may include eighth set of graphical elements 580 (e.g., text boxes, buttons, selectable lists, checkboxes, radio buttons, any combination thereof, and/or the like) to receive eighth input associated with at least a portion of expected dialog data (e.g., script data associated with at least one phrase associated with a respective sequence of the features). For example, eighth set of graphical elements 580 may include at least one button 584, at least one dropdown menu 586, any combination thereof, and/or the like. In some non-limiting embodiments, at least a portion of eighth set of graphical elements 580 may be displayed (e.g., in the GUI by user device 105, interface device 101, remote system 106, and/or the like) in response to receiving at least one user selection of a navigation button 504 and/or in response to displaying fourth view 500*d*. Additionally or alternatively, at least a portion of eighth set of graphical elements 580 may be displayed (e.g., in the GUI by user device 105, interface device 101, remote system 106, and/or the like) in response to receiving at least one user selection of a sequence from a first (e.g., top) dropdown menu 588 listing the respective sequences (e.g., associated with the sequence data, as described herein). For example, a feature may include a plurality of sequences including, e.g., at least one command sequence (e.g., "change tool" and/or the like), at least one confirmation sequence (e.g., "accept," "deny," and/or the like), and/or the like. For each sequence, upon selection thereof by a user from the first (e.g., top) dropdown menu, at least two additional graphical elements (e.g., dropdown menus 588) may be selectable. For example, a second (e.g., middle) dropdown menu 588 may be associated with a starting step for the sequence. In some non-limiting embodiments, such second (e.g., middle) dropdown menu 588 may be set to "start," by default, which may be associated with the sequence being able to be started by the user speaking and/or otherwise inputting the expected initiating dialogue thereof (e.g., independent of other sequences). Additionally or alternatively, the second (e.g., middle) dropdown menu 588 may be set to match the ending step of another sequence (as further described below), which may be associated with the sequence being able to be started by the user speaking and/or otherwise inputting the expected initiating dialogue thereof after the other sequence with the matching ending step. In some non-limiting embodiments, a third (e.g., bottom) dropdown menu 588 may be associated with an ending step for the sequence. In some non-limiting embodiments, a third (e.g., bottom) dropdown menu 588 may be set to "end," by default, which may be associated with the dialog script ending after the sequence. Additionally or alternatively, such second (e.g., middle) dropdown menu 588 may be set to any other string and/or number (e.g., other than "start" or "end"), which may be associated with the sequence being a prerequisite of at least one other sequence such that the other sequence may only be able to be started by the user speaking and/or otherwise inputting the expected initiating dialogue thereof after the sequence with the matching ending step. In some non-limiting embodiments, a user may therefore be able to link sequences in the dialog script (e.g., by matching starting step(s) of at least one sequence with ending step(s) of other sequences) to generate a complex feature (e.g., containing at least two sequence(s) that are linked and/or ordered as described herein). In some non-limiting embodiments, upon selection of a sequence by a user from the first (e.g., top) dropdown menu 588, at least one additional dropdown menu 588 may be selectable. For example, an additional (e.g., fourth, fifth, and/or the like) dropdown menu 588 may be associated with at least one parameter associated with the sequence. In some non-limiting embodiments, the content of dropdown menus 588 may be updated by selecting a different item therein and/or typing a new item therein.

Figure 5K:
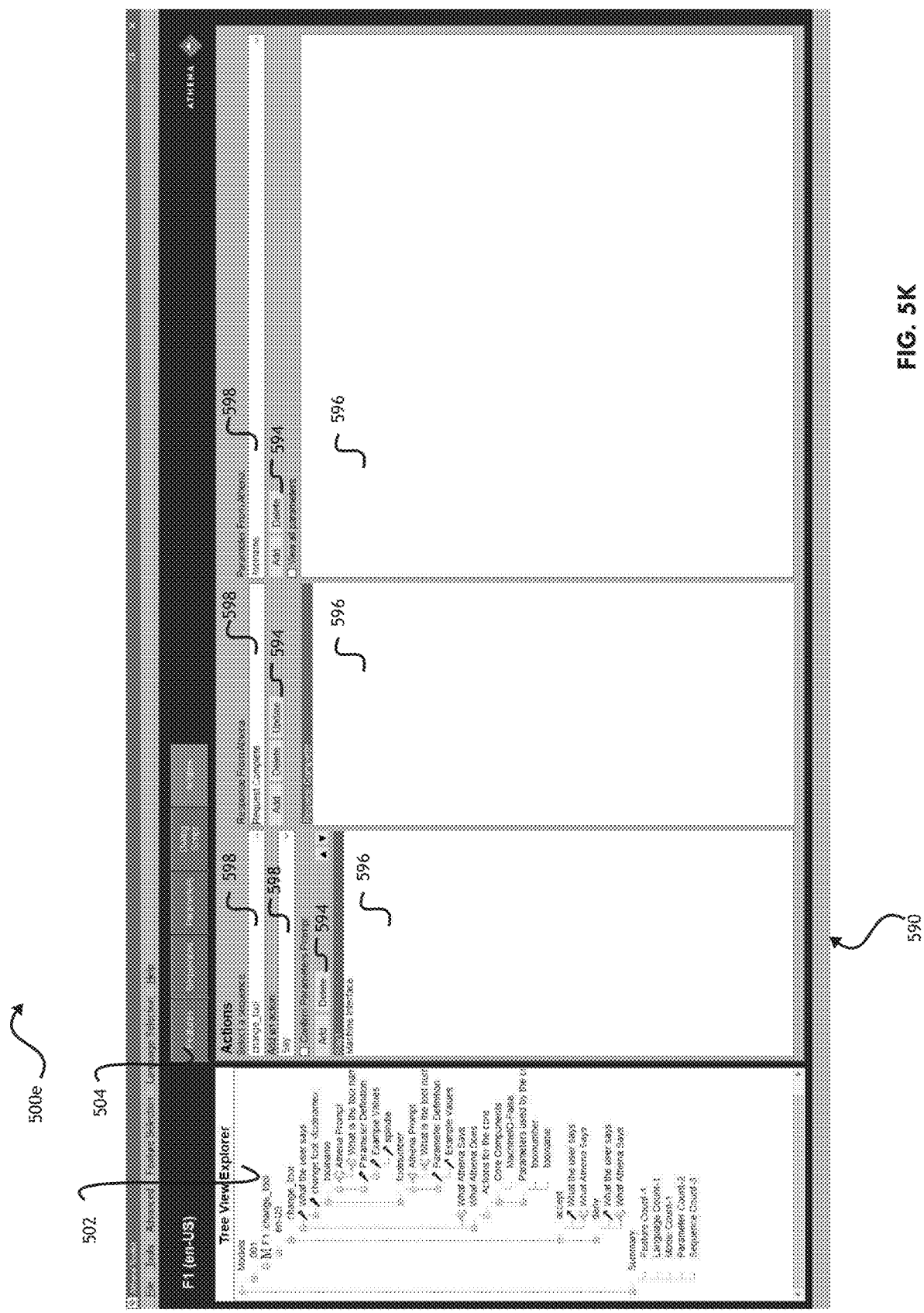
Figure 5L:
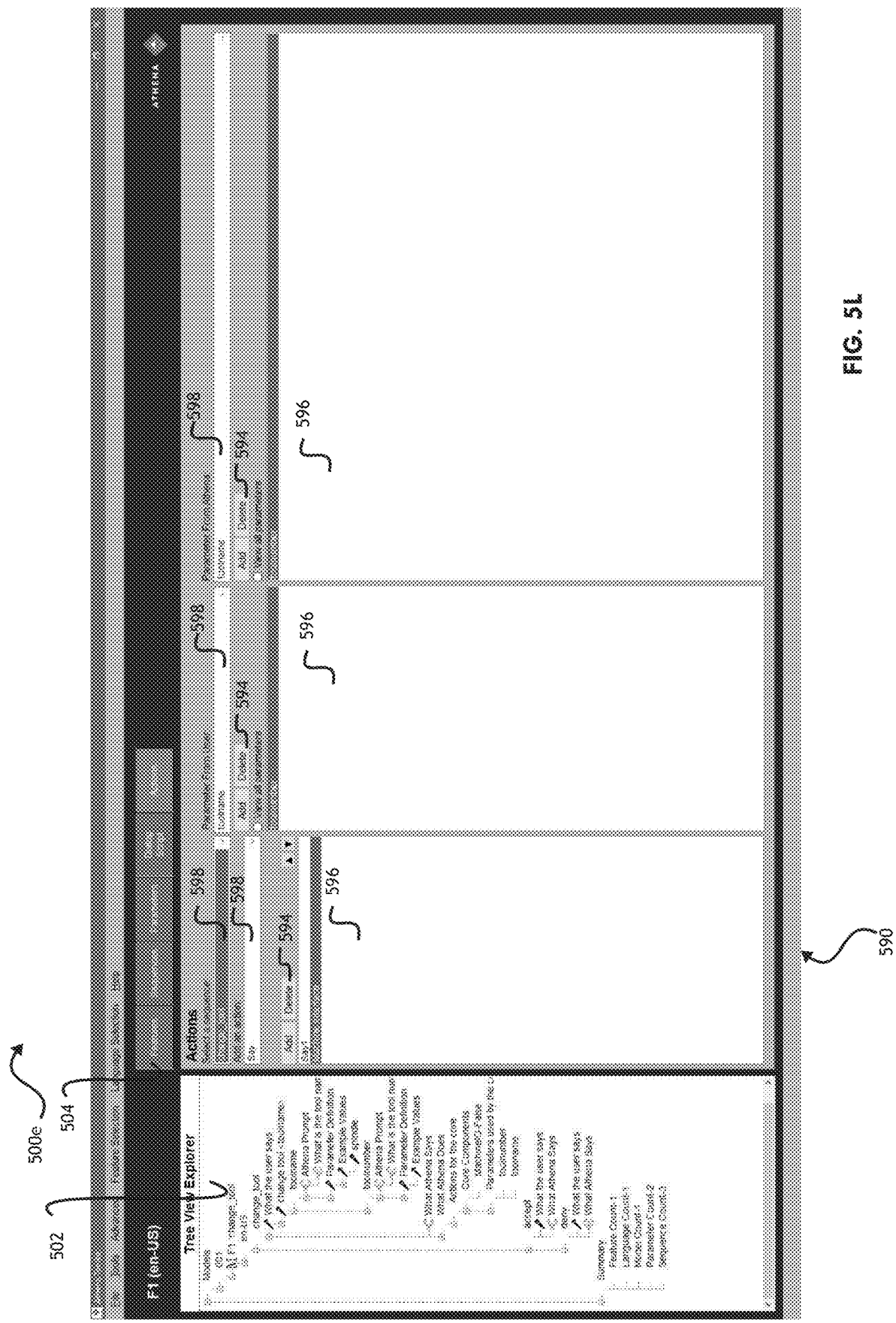

In some non-limiting embodiments, fifth view 500*c* of the GUI may be displayed (e.g., by user device 105, interface device 101, remote system 106, and/or the like). For example, as shown in FIGS. 5K-5L, fifth view 500*e* of the GUI may include tree explorer 502, navigation button(s) 504, and/or the like, as described herein.

In some non-limiting embodiments, fifth view 500*e* may include ninth set of graphical elements 590 (e.g., text boxes, buttons, selectable lists, checkboxes, radio buttons, any combination thereof, and/or the like) to receive ninth input associated with action data (e.g., first action data) associated with at least one action of the respective sequence. For example, ninth set of graphical elements 590 may include at least one button 594, at least one selectable list 596, at least one dropdown menu 598, any combination thereof, and/or the like. In some non-limiting embodiments, ninth set of graphical elements 590 may be displayed (e.g., in the GUI by user device 105, interface device 101, remote system 106, and/or the like) in response to receiving at least one user selection of a navigation button 504 and/or in response to displaying fifth view 500*e*. In some non-limiting embodiments, a user may input at least a portion of the ninth input (e.g., associated with the (first) action data) by selecting a sequence from a respective (e.g., first, top-left, and/or the like) dropdown menu 598. Additionally or alternatively, e.g., based on the selected sequence, the ninth input may include the user inputting at least a portion of the ninth input by selecting an action from a respective (e.g., second, bottom-left, and/or the like) dropdown menu 598. Additionally or alternatively, the ninth input may include the user selecting a respective button 594 (e.g., adjacent to the second, bottom-left, and/or the like dropdown menu 598) to add the inputted (e.g., selected) data to a respective (e.g., first, left, and/or the like) selectable list 596. In some non-limiting embodiments, the action data may include a name and/or type (e.g., action name, action type, and/or the like), a number (e.g., action number and/or the like, which may be appended to the name and/or type), any combination thereof, and/or the like. In some non-limiting embodiments, the content of the respective (e.g., first, left, and/or the like) selectable list 596 may be updated and/or deleted by selecting an item in selectable list 596 and selecting a respective one of the buttons 594.

In some non-limiting embodiments, e.g., based on the selected action (e.g., in the first/left selectable list 596), the ninth input may include the user selecting a parameter from a respective (e.g., second/middle and/or third/right) dropdown menu 598. For example, if the selected action includes an audio output of intelligent industrial assistant 102 (e.g., saying a phrase and/or the like), the second/middle dropdown menu 598 may be associated with at least one phrase to be spoken by intelligent industrial assistant 102. Additionally or alternatively, if the selected action includes a machine interface (e.g., of intelligent industrial assistant 102 and/or machine gateway 102*e*) for accessing by intelligent industrial assistant 102, the second/middle dropdown menu 598 may be associated with at least one parameter to input to industrial intelligent assistant 102 (e.g., based on use input) for performing the selected action. In some non-limiting embodiments, the third/right dropdown menu 598 may be associated with at least one parameter to be outputted from industrial intelligent assistant 102 (e.g., to a machine interface, as part of an audio output, and/or the like) for performing the selected action. In some non-limiting embodiments, the ninth input may include the user selecting a respective button 594 (e.g., adjacent to the second/middle and/or third/right dropdown menu 598) to add the inputted (e.g., selected) data to a respective (e.g., second/middle and/or third/right) selectable list 596. In some non-limiting embodiments, the content of the respective (e.g., second/ middle and/or third/right) selectable list 596 may be updated and/or deleted by selecting an item in selectable list 596 and selecting a respective one of the buttons 594.

Figure 6:
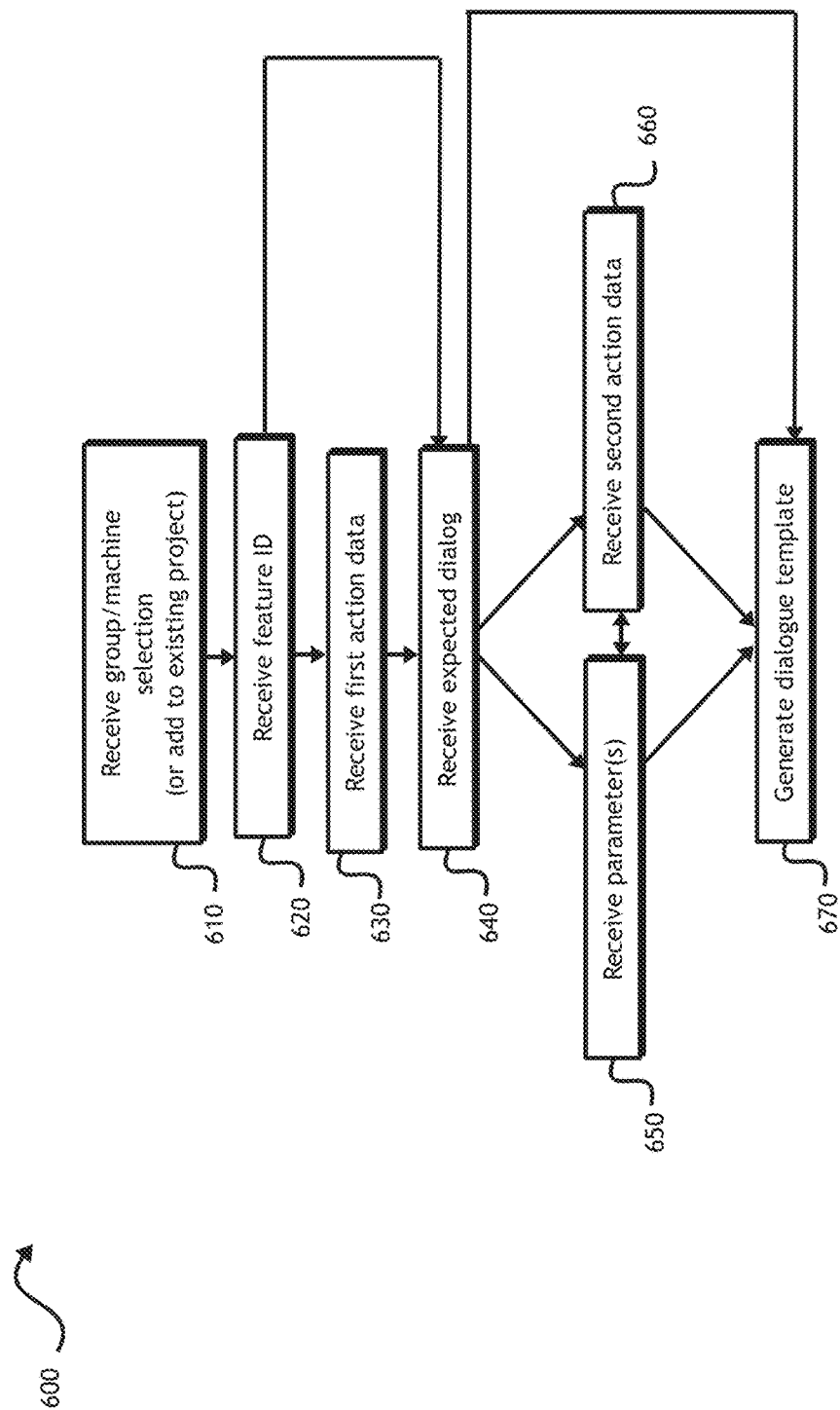
FIG. 6 is a flowchart of a non-limiting embodiment of an implementation of a non-limiting embodiment of the process shown in FIG. 3 according to the principles of the presently disclosed subject matter.

Referring now to FIG. 6, FIG. 6 is a flowchart of an exemplary implementation 600 of a non-limiting embodiment relating to process 300 shown in FIG. 3. In some non-limiting embodiments, one or more of the steps of implementation 600 may be performed (e.g., completely, partially, and/or the like) by user device 105, interface device 101, and/or remote system 106. In some non-limiting embodiments, one or more of the steps of implementation 600 may be performed (e.g., completely, partially, and/or the like) by another system, another device, another group of systems, or another group of devices (e.g., separate from or including user device 105, interface device 101, and/or remote system 106), such as intelligent industrial assistant 102 (e.g., one or more devices of intelligent industrial assistant 102), database 103*a* (e.g., one or more devices of database 103*a*), external database 103*b* (e.g., one or more devices of external database 103*b*), and/or industrial machine 104 (e.g., one or more devices of industrial machine 104).

As shown in FIG. 6, at step 610, implementation 600 may include receiving group identification data associated with a group of features (e.g., a group of features associated with an industrial machine 104, a database such as database 103*a* and/or external database 103*b*, and/or the like). For example, user device 105, interface device 101, remote system 106, and/or the like may receive group identification data (e.g., first group identification data) associated with a (first) group of features via a graphical user interface (GUI).

In some non-limiting embodiments, a first view of the GUI may be displayed (e.g., by user device 105, interface device 101, remote system 106, and/or the like). Additionally or alternatively, the first view may include at least a portion (e.g., a first portion) of a first set of graphical elements (e.g., text boxes, buttons, selectable lists, checkboxes, radio buttons, any combination thereof, and/or the like) to receive first input associated with the group identification data (e.g., first group identification data). In some non-limiting embodiments, a user may input (e.g., select and/or the like) at least a portion of the first input (e.g., associated with the (first) group identification data) via a first button associated with inputting new group identification data. Additionally or alternatively, the first input may include the user selecting a second button associated with loading a previously saved file that was previously associated with group identification data.

In some non-limiting embodiments, e.g., if the user has selected the first button associated with inputting new group identification data, a second view of the GUI may be displayed (e.g., by user device 105, interface device 101, remote system 106, and/or the like). Additionally or alternatively, the second view may include at least a portion (e.g., a second portion) of the first set of graphical elements to receive at least a portion of the first input associated with the group identification data (e.g., first group identification data). In some non-limiting embodiments, a user may input (e.g., select and/or the like) at least a portion of the first input (e.g., associated with the (first) group identification data) via a dropdown menu (e.g., including a listing of supported groups and/or the like). Additionally or alternatively, the first input may include the user selecting a third button (e.g., after having selected the (first) group identification data from the dropdown menu) to proceed with the selected group.

As shown in FIG. 6, at step 620, implementation 600 may include receiving feature identification data associated with a feature of the group of features. For example, user device 105, interface device 101, remote system 106, and/or the like may receive feature identification data (e.g., first feature identification data) associated with a (first) feature of the first group of features via a GUI.

In some non-limiting embodiments, a third view of the GUI may be displayed (e.g., by user device 105, interface device 101, remote system 106, and/or the like). Additionally or alternatively, the third view may include a second set of graphical elements (e.g., text boxes, buttons, selectable lists, checkboxes, radio buttons, any combination thereof, and/or the like) to receive second input associated with the feature identification data (e.g., first feature identification data). In some non-limiting embodiments, receiving first feature identification data may include receiving the second input via the second set of graphical elements. In some non-limiting embodiments, the second set of graphical elements 520 may be displayed (e.g., in the GUI by user device 105, interface device 101, remote system 106, and/or the like) in response to receiving at least one first input via the first set of graphical elements. In some non-limiting embodiments, a user may input (e.g., type and/or the like) at least a portion of the second input (e.g., associated with the (first) feature identification data) into a textbox.

As shown in FIG. 6, at step 630, implementation 600 may include receiving at least a portion of action data (e.g., first action data) associated with at least one action of the respective feature. For example, user device 105, interface device 101, remote system 106, and/or the like may receive at least a portion of action data (e.g., first action data) via a GUI.

In some non-limiting embodiments, a third view of the GUI may be displayed (e.g., by user device 105, interface device 101, remote system 106, and/or the like). Additionally or alternatively, the third view may include a portion (e.g., first portion) of a fifth set of graphical elements to receive at least a portion of fifth input associated with a portion of action data (e.g., first action data). In some non-limiting embodiments, a user may input (e.g., select and/or the like) at least a portion of the fifth input (e.g., associated with the (first) action data) via a dropdown menu (e.g., including a listing of supported actions and/or the like).

As shown in FIG. 6, at step 640, implementation 600 may include receiving expected dialogue data associated with expected dialogue of the feature. For example, user device 105, interface device 101, remote system 106, and/or the like may receive expected dialogue data associated with expected dialogue of the (first) sequences via a GUI.

In some non-limiting embodiments, a fourth view of the GUI may be displayed (e.g., by user device 105, interface device 101, remote system 106, and/or the like). Additionally or alternatively, the fourth view may include a third set of graphical elements to receive third input associated with the expected dialogue data. In some non-limiting embodiments, receiving the expected dialogue data may include receiving the third input via the third set of graphical elements.

In some non-limiting embodiments, the portion of the expected dialogue data may include expected initiating dialogue data associated with at least one phrase for initiating the first feature. Additionally or alternatively, expected dialogue data may include a plurality of alternative items of expected dialogue associated with one feature. For example, the plurality of alternative items of expected dialogue may include synonyms, alternative phrasings, and/or the like that express a same intent of the user to perform an activity (e.g., at least one action, task, and/or the like) associated with the same dialogue template (e.g., "Start warm up cycle," "Warm up the machine," and/or the like may be alternative items of expected dialogue to initiate a warm-up process for an industrial machine 104; "Run process 1234," "Start m-code 1234," and/or the like may be alternative items of expected dialogue to initiate a process associated with the stated code; "Report current tool," "Inform about current tool," and/or the like may be alternative items of expected dialogue to request information on a current tool; "Turn on the lights," "Lights on," and/or the like may be alternative items of expected dialogue to request turning on the lights; and/or the like). In some non-limiting embodiments, a user may input (e.g., type and/or the like) at least a portion of the third input (e.g., associated with the expected dialogue data) into a respective textbox. For example, a first textbox may be associated with expected dialogue of the user. Additionally or alternatively, a second textbox may be associated with expected dialogue of intelligent industrial assistant 102. Additionally or alternately, the third input may include the user selecting a respective one of the button(s) (e.g., after having typed each respective phrase associated with the expected parameter dialogue data into the respective textbox) to add the inputted data to the respective selectable list (e.g., first/left for the user, second/right for intelligent industrial assistant 102, and/or the like). In some non-limiting embodiments, the content of selectable list may be updated and/or deleted by selecting an item in selectable list.

As shown in FIG. 6, at step 650, implementation 600 may include receiving parameter data associated with at least one parameter (e.g., associated the expected dialogue data). For example, user device 105, interface device 101, remote system 106, and/or the like may parameter data associated with at least one parameter via a GUI.

In some non-limiting embodiments, a fourth view of the GUI may be displayed (e.g., by user device 105, interface device 101, remote system 106, and/or the like). Additionally or alternatively, the fourth view may include a fourth set of graphical elements to receive fourth input associated with parameter data associated with the expected dialogue data. In some non-limiting embodiments, receiving the parameter data may include receiving the fourth input via the fourth set of graphical elements.

In some non-limiting embodiments, parameter data may be associated with (e.g., identify, include, and/or the like) at least one parameter (e.g., value, category, word, and/or the like) associated with at least one item of expected dialogue. For example, parameter data may be associated with a part number, a part identification, a machine number (e.g., of a particular industrial machine 104, a model of industrial machine 104, and/or the like), a machine identifier, a number, a category (e.g., low, medium, high, slow, fast, on, off, and/or the like), a word (e.g., name of a part, a machine, a database, an item of media, and/or the like), an alphanumeric string, and/or the like. In some non-limiting embodiments, at least one item of parameter data may be associated with input from the user to intelligent industrial assistant 102. Additionally or alternatively, at least one item of parameter data may be associated with output (e.g., response and/or the like) from intelligent industrial assistant 102.

As shown in FIG. 6, at step 660, implementation 600 may include receiving at least a portion of action data (e.g., second action data) associated with at least one action of the respective feature. For example, user device 105, interface device 101, remote system 106, and/or the like may receive at least a portion of action data (e.g., second action data) via a GUI.

In some non-limiting embodiments, a fifth view of the GUI may be displayed (e.g., by user device 105, interface device 101, remote system 106, and/or the like). Additionally or alternatively, the fifth view may include a portion (e.g., second portion) of the fifth set of graphical elements to receive at least a portion of fifth input associated with a portion of action data (e.g., second action data). In some non-limiting embodiments, a user may input (e.g., select and/or the like) at least a portion of the fifth input (e.g., associated with the (first) action data) via at least one button, at least one textbox, at least one dropdown menu, and/or the like.

As shown in FIG. 6, at step 670, implementation 600 may include generating a dialogue template based on the group identification data, the feature identification data, the sequence identification data, the expected dialogue data, and the action data. For example, user device 105, interface device 101, remote system 106, and/or the like may generate a dialogue template (e.g., first dialogue template) based on the (first) group identification data, the (first) feature identification data, the (first) sequence identification data, the expected dialogue data, and the action data.

In some non-limiting embodiments, the dialogue template may include group identifier data associated with at least one group of features (e.g., group of features for an industrial machine, group of features for a database, group of features for a provider of industrial machines, group of features for a role of a user (e.g., machine operator and/or the like), and/or the like). Additionally or alternatively, each group of features associated with respective group identifier data may include at least one feature (e.g., a plurality of features and/or the like). Additionally or alternatively, each feature associated with respective feature identifier data may include at least one sequence (e.g., a plurality of sequences). Additionally or alternatively, each sequence associated with respective sequence identifier data may include at least one item of expected dialogue data (e.g., expected initiating dialogue data, parameter data, script data, and/or the like). Additionally or alternatively, each sequence associated with respective sequence identifier data may include at least one action (e.g. a plurality of actions and/or the like). In some non-limiting embodiments, script data may link at least two sequences (e.g., a plurality of sequences and/or the like) to form a complex feature, as described herein.

In some non-limiting embodiments, interface device 101, remote system 106, and/or the like may communicate the first dialogue template to intelligent industrial assistant 102. Additionally or alternatively, intelligent industrial assistant 102 may add the first dialogue template to package data (e.g., package 102cc and/or the like) of intelligent industrial assistant 102.

In some non-limiting embodiments, the dialogue template (e.g., first dialogue template) may be verified (e.g., checked to ensure it does not contain errors), e.g., by interface device 101, user device 105, remote system 106, intelligent industrial assistant 102, and/or the like.

In some non-limiting embodiments, the first dialogue template may be communicated to remote system 106 (e.g., from interface device 101, user device 105, intelligent industrial assistant 102, and/or the like). Additionally or alternatively, remote system 106 may add the first dialogue template to package data (e.g., package 102cc and/or the like) for intelligent industrial assistant 102. Additionally or alternatively, remote system 106 may communicate the package data (e.g., package 102cc and/or the like) to intelligent industrial assistant 102.

Referring now to FIGS. 7A-7F, FIGS. 7A-7F are screenshots of an exemplary GUI according to a non-limiting implementation of the process 300 shown in FIG. 3 and/or the implementation 600 shown in FIG. 6. In some non-limiting embodiments, one or more of the views of the GUI may be displayed (e.g., completely, partially, and/or the like) by user device 105, interface device 101, and/or remote system 106. In some non-limiting embodiments, one or more of the views of the GUI may be displayed (e.g., completely, partially, and/or the like) by another system, another device, another group of systems, or another group of devices (e.g., separate from or including user device 105, interface device 101, and/or remote system 106), such as intelligent industrial assistant 102 (e.g., one or more devices of intelligent industrial assistant 102), database 103a (e.g., one or more devices of database 103a), external database 103b (e.g., one or more devices of external database 103b), and/or industrial machine 104 (e.g., one or more devices of industrial machine 104).

Figure 7A:
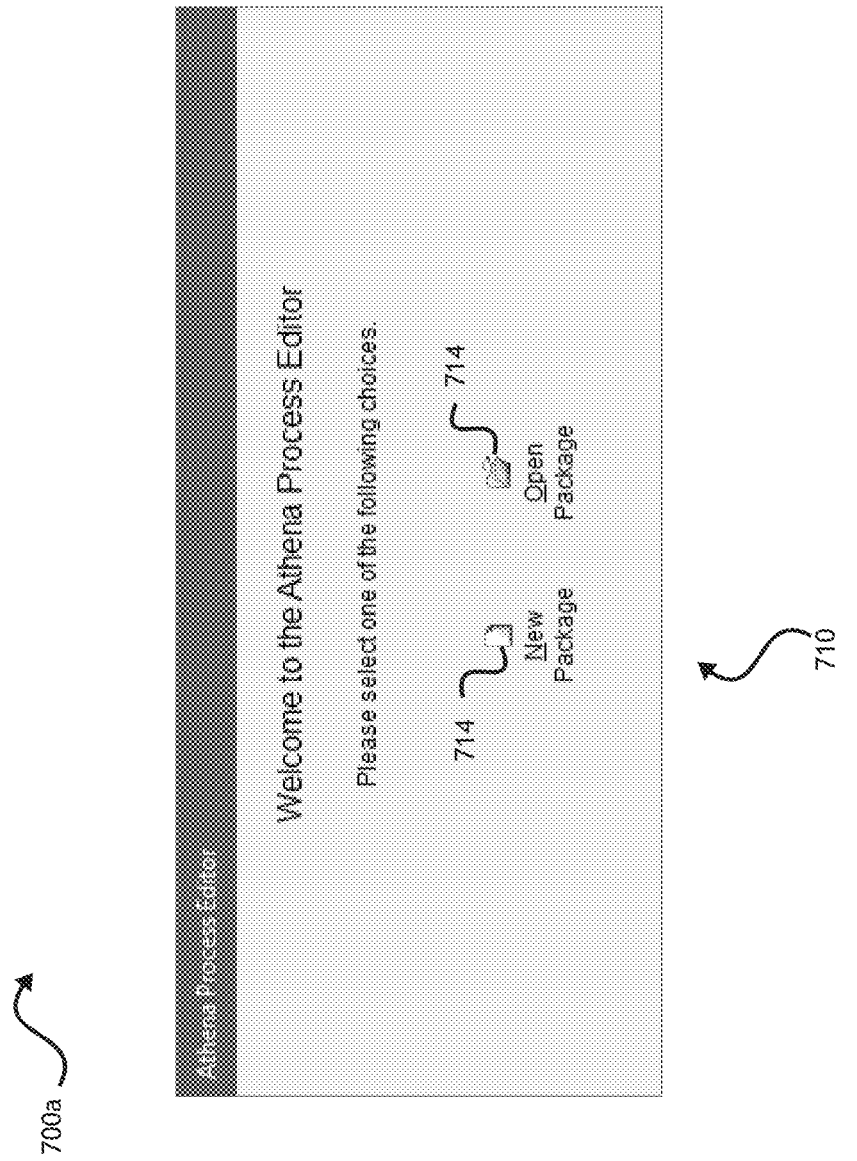
FIGS. 7A-7F are screenshots of an exemplary graphical user interface according to a non-limiting implementation of the process of FIG. 3, according to principles of the presently disclosed subject matter.

In some non-limiting embodiments, first view 700a of the GUI may be displayed (e.g., by user device 105, interface device 101, remote system 106, and/or the like). For example, as shown in FIG. 7A, first view 700a of the GUI may include at least a portion (e.g., a first portion) of a first set of graphical elements 710 (e.g., text boxes, buttons, selectable lists, checkboxes, radio buttons, any combination thereof, and/or the like) to receive first input associated with the group identification data (e.g., first group identification data). For example, (the first portion of) first set of graphical elements 710 may include at least one button 714 and/or the like. In some non-limiting embodiments, a user may input (e.g., select and/or the like) at least a portion of the first input (e.g., associated with the (first) group identification data) via a first (e.g., left) button 714 associated with inputting new group identification data. Additionally or alternately, the first input may include the user selecting a second (e.g., right) button 714 associated with loading a previously saved file that was previously associated with group identification data.

Figure 7B:
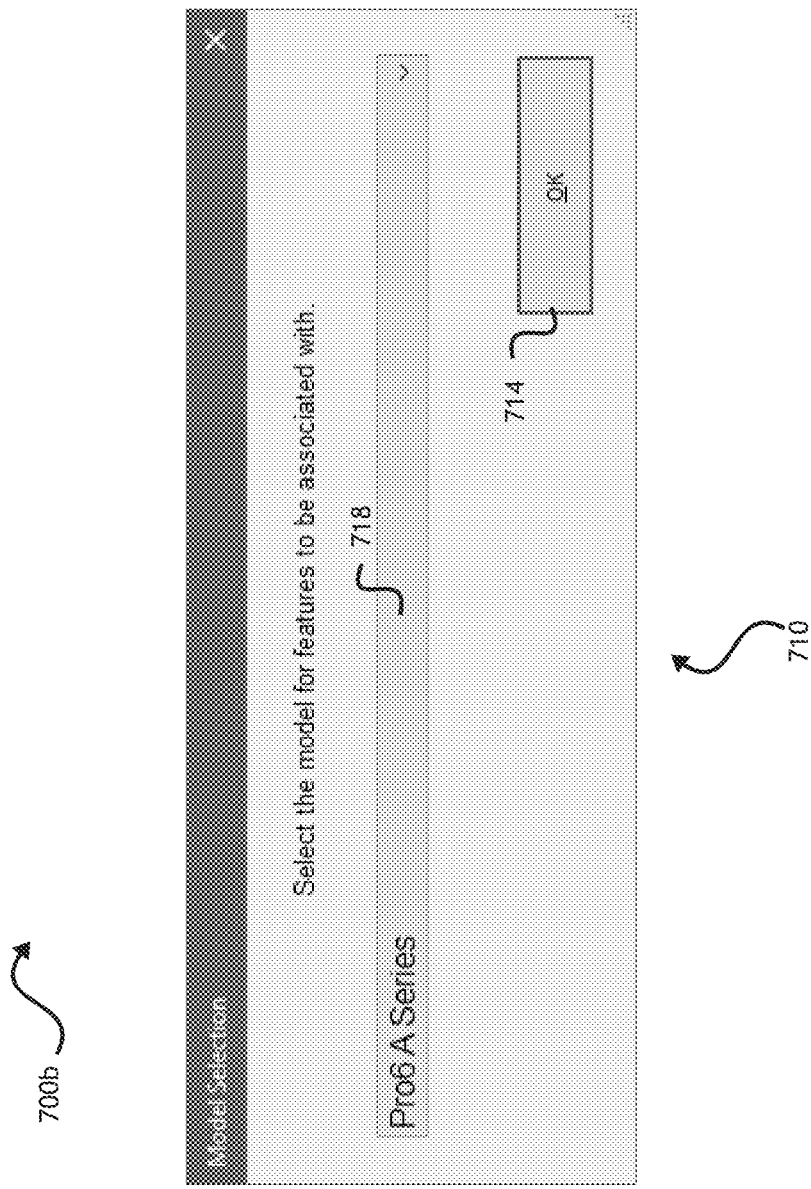

As shown in FIG. 7B, in some non-limiting embodiments, e.g., if the user has selected the first button 714 associated with inputting new group identification data, a second view 700b of the GUI may be displayed (e.g., by user device 105, interface device 101, remote system 106, and/or the like). Additionally or alternatively, the second view 700b may include at least a portion (e.g., a second portion) of the first set of graphical elements 710 to receive at least a portion of the first input associated with the group identification data (e.g., first group identification data). For example, (the second portion of) first set of graphical elements 710 may include at least one button 714, at least one dropdown menu 718, any combination thereof, and/or the like. In some non-limiting embodiments, a user may input (e.g., select and/or the like) at least a portion of the first input (e.g., associated with the (first) group identification data) via dropdown menu 718 (e.g., including a listing of supported groups and/or the like). Additionally or alternately, the first input may include the user selecting a third button 714 (e.g., after having selected the (first) group identification data from dropdown menu 718) to proceed with the selected group.

In some non-limiting embodiments, the group identification data may include a name (e.g., industrial machine name, features group name, any combination thereof, and/or the like), a number (e.g., industrial machine model number, industrial machine serial number, feature group number, any combination thereof, and/or the like), any combination thereof, and/or the like.

Figure 7C:
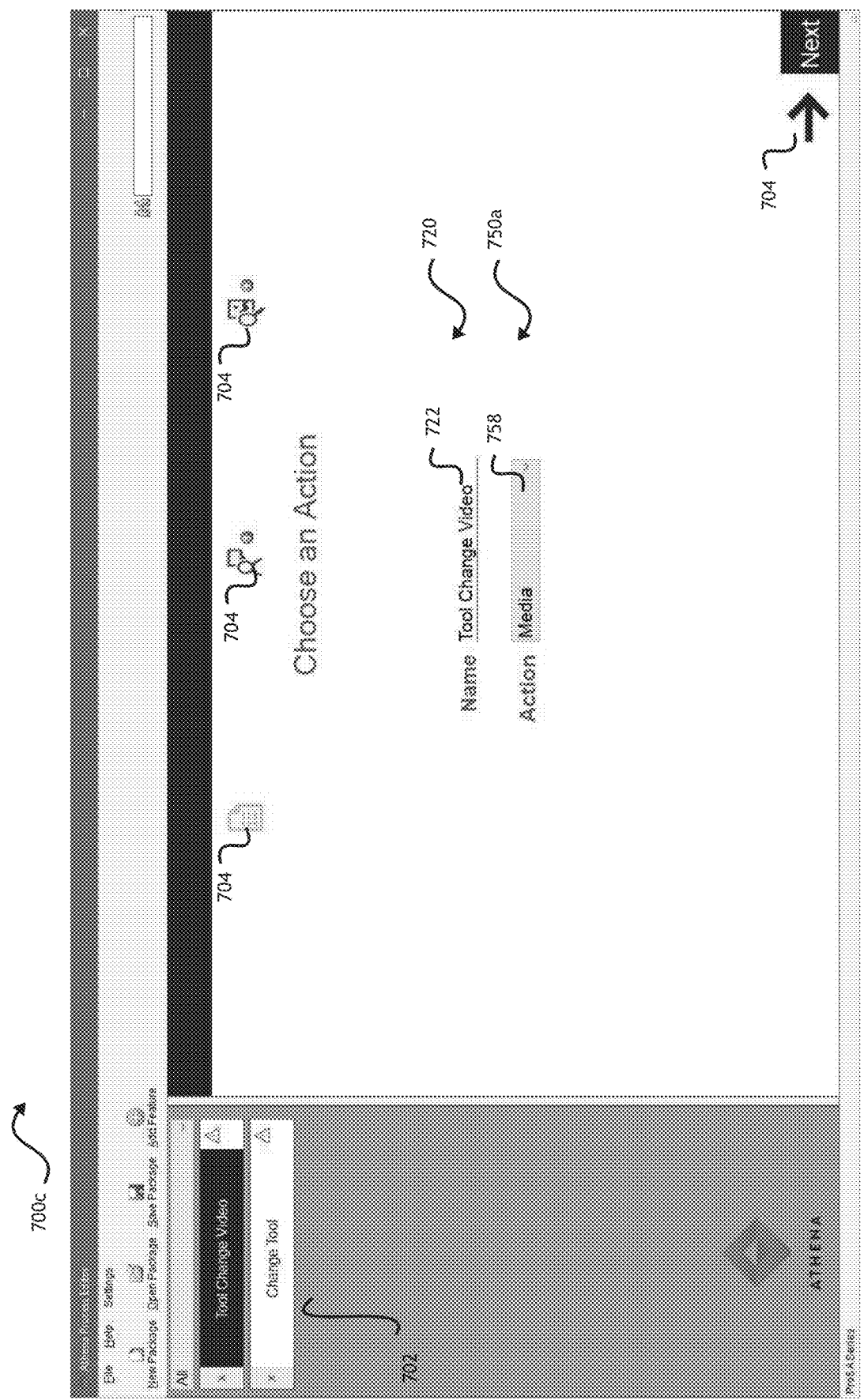

In some non-limiting embodiments, third view 700c of the GUI may be displayed (e.g., by user device 105, interface device 101, remote system 106, and/or the like). For example, as shown in FIG. 7C, third view 700c of the GUI may include feature listing 702 that dynamically updates a list of the features of the dialogue template being generated based on inputs received from the user. Additionally or alternatively, at least one button 704 (e.g., navigation button, tab button, and/or the like) may be included in the GUI (e.g., third view 700c thereof), and/or the selection of the button(s) 704 may navigate the GUI between the different views thereof.

In some non-limiting embodiments, the third view 700c may include second set of graphical elements 720 (e.g., text boxes, buttons, selectable lists, checkboxes, radio buttons, any combination thereof, and/or the like) to receive second input associated with the feature identification data (e.g., first feature identification data). For example, second set of graphical elements 720 may include at least one textbox 722 and/or the like. In some non-limiting embodiments, second set of graphical elements 720 may be displayed (e.g., in the GUI by user device 105, interface device 101, remote system 106, and/or the like) in response to receiving at least one first input via first set of graphical elements 710 and/or in response to displaying third view 700c. In some non-limiting embodiments, receiving feature identification data may include receiving the second input via the second set of graphical elements 720. In some non-limiting embodiments, a user may input (e.g., type and/or the like) at least a portion of the second input (e.g., associated with the (first) feature identification data) into textbox 722. In some non-limiting embodiments, the feature identification data may include a name (e.g., feature name and/or the like), a number (e.g., feature number and/or the like), any combination thereof, and/or the like.

In some non-limiting embodiments, third view 700c of the GUI may include first portion 750a of a fifth set of graphical elements to receive at least a portion of fifth input associated with a portion of action data (e.g., first action data). For example, first portion 750a of the fifth set of graphical elements may include dropdown menu 758 (e.g., including a listing of supported actions and/or the like) and/or the like. In some non-limiting embodiments, a user may input (e.g., select and/or the like) at least a portion of the fifth input (e.g., associated with the (first) action data) via dropdown menu 758.

Figure 7D:
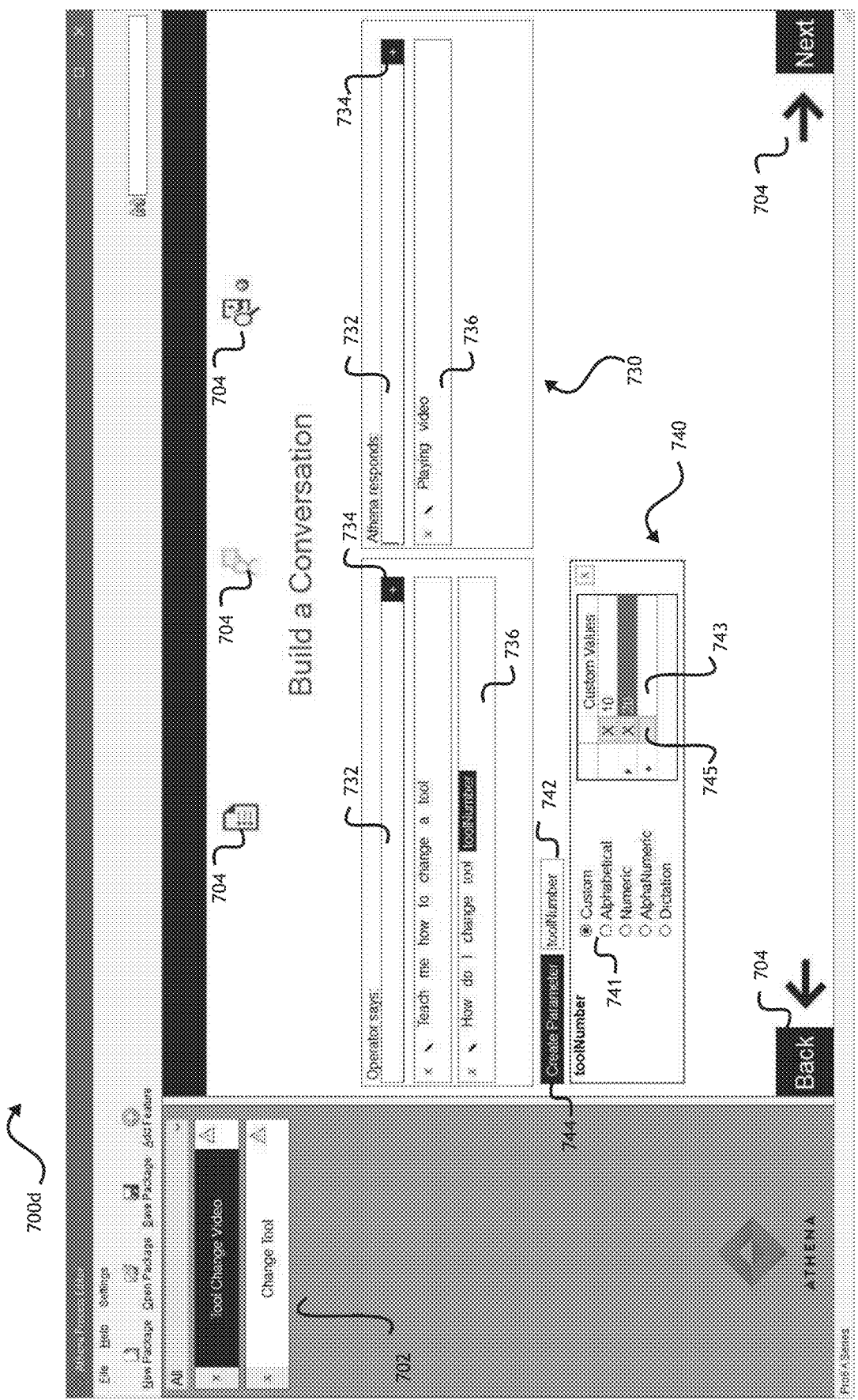

In some non-limiting embodiments, fourth view 700d of the GUI may be displayed (e.g., by user device 105, interface device 101, remote system 106, and/or the like). For example, as shown in FIG. 7D, fourth view 700d of the GUI may include feature listing 702, navigation button(s) 704, and/or the like, as described herein.

In some non-limiting embodiments, fourth view 700d may include third set of graphical elements 730 (e.g., text boxes, buttons, selectable lists, checkboxes, radio buttons, any combination thereof, and/or the like) to receive third input associated with expected dialog data, as described herein. For example, third set of graphical elements 730 may include at least one textbox 732, at least one button 734, at least one selectable list 736, any combination thereof, and/or the like. In some non-limiting embodiments, third set of graphical elements 730 may be displayed (e.g., in the GUI by user device 105, interface device 101, remote system 106, and/or the like) in response to receiving at least one user selection of a navigation button 704 and/or in response to displaying fourth view 700*d*.

In some non-limiting embodiments, the portion of the expected dialogue data may include expected initiating dialogue data associated with at least one phrase for initiating the first feature. Additionally or alternatively, expected dialogue data may include a plurality of alternative items of expected dialogue associated with one feature. For example, the plurality of alternative items of expected dialogue may include synonyms, alternative phrasings, and/or the like that express a same intent of the user to perform an activity (e.g., at least one action, task, and/or the like) associated with the same dialogue template (e.g., "Start warm up cycle," "Warm up the machine," and/or the like may be alternative items of expected dialogue to initiate a warm-up process for an industrial machine 104; "Run process 1234," "Start m-code 1234," and/or the like may be alternative items of expected dialogue to initiate a process associated with the stated code; "Report current tool," "Inform about current tool," and/or the like may be alternative items of expected dialogue to request information on a current tool; "Turn on the lights," "Lights on," and/or the like may be alternative items of expected dialogue to request turning on the lights; and/or the like). In some non-limiting embodiments, a user may input (e.g., type and/or the like) at least a portion of the third input (e.g., associated with the expected dialogue data) into a respective textbox 732. For example, a first (e.g., left) textbox 732 may be associated with expected dialogue of the user. Additionally or alternatively, a second (e.g., right) textbox 732 may be associated with expected dialogue of intelligent industrial assistant 102. Additionally or alternately, the third input may include the user selecting a respective one of the button(s) 734 (e.g., after having typed each respective phrase associated with the expected parameter dialogue data into the respective textbox 732) to add the inputted data to the respective selectable list 736 (e.g., first/left for the user, second/right for intelligent industrial assistant 102, and/or the like). In some non-limiting embodiments, the content of selectable list 736 may be updated and/or deleted by selecting an item in selectable list 736.

In some non-limiting embodiments, fourth view 700*d* may include fourth set of graphical elements 740 (e.g., text boxes, buttons, selectable lists, checkboxes, radio buttons, any combination thereof, and/or the like) to receive fourth input associated with parameter data (e.g., first parameter data) associated with at least one parameter (e.g., value, category, word, and/or the like) associated with at least one item of expected dialogue. For example, fourth set of graphical elements 740 may include at least one radio button 741, at least one textbox 742, at least one button 744, at least one customizable list of text fields 743, at least one text field button 745, any combination thereof, and/or the like. In some non-limiting embodiments, fourth set of graphical elements 740 may be displayed (e.g., in the GUI by user device 105, interface device 101, remote system 106, and/or the like) in response to receiving at least one user selection of a navigation button 704 and/or in response to displaying fourth view 700*d*. In some non-limiting embodiments, a user may input at least a portion of the fourth input (e.g., associated with the (first) parameter data) by selecting a parameter type from a respective radio button 741. Additionally or alternatively, a user may select a word from the selectable list 736 of phrases associated with the parameter, and/or the selected word may be displayed in textbox 742. Additionally or alternatively, e.g., based on the parameter type, the sixth input may include the user inputting at least one possible value (e.g., number values, alphanumeric values, and/or the like) of the parameter into a respective text field of customizable list of text fields 743. For example, it may be unnecessary for a user to provide further input (e.g., in customizable list of text fields 743) if the parameter type is a number, a letter, an alphanumeric sequence, a dictation, and/or the like. Additionally or alternatively, a user may provide further input (e.g., in customizable list of text fields 743) associated with the parameter if the parameter type is a custom set of values (e.g., number values, alphanumeric values, and/or the like) (e.g., "Custom"). In some non-limiting embodiments, the parameter data may include a name (e.g., parameter name based on the selected word and/or the like) and/or the like. In some non-limiting embodiments, the content of customizable list of text fields 743 (e.g., at least one text field thereof) may be updated and/or deleted by selecting the respective text field button 745.

Figure 7E:
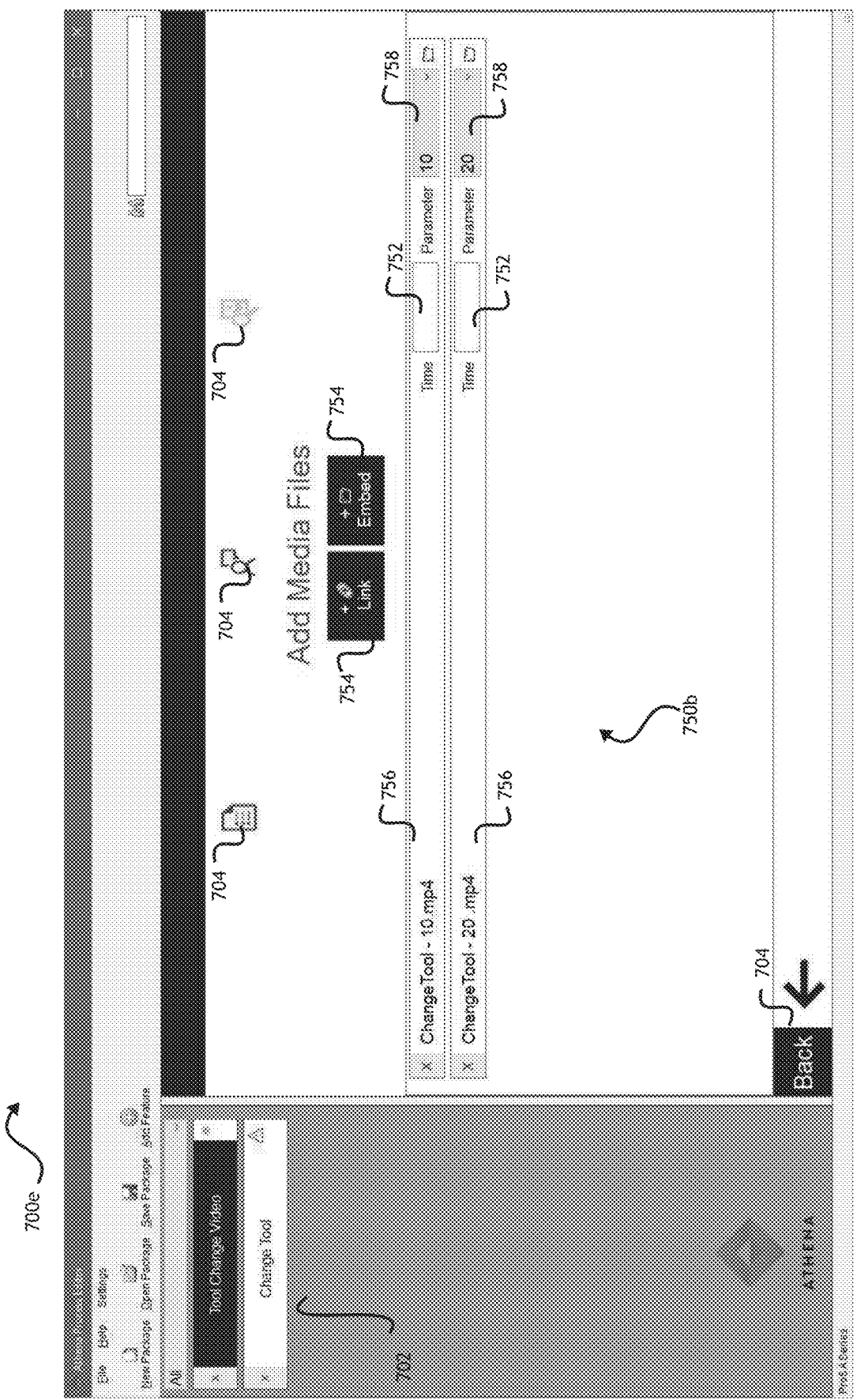

In some non-limiting embodiments, fifth view 700*e* of the GUI may be displayed (e.g., by user device 105, interface device 101, remote system 106, and/or the like). For example, as shown in FIG. 7E, fifth view 700*e* of the GUI may include feature listing 702, navigation button(s) 704, and/or the like, as described herein.

In some non-limiting embodiments, fifth view 700*e* of the GUI may include second portion 750*b* of the fifth set of graphical elements to receive at least a portion of fifth input associated with a portion of action data (e.g., second action data). For example, second portion 750*b* of the fifth set of graphical elements may include at least one textbox 752, at least one button 754, at least on selectable list item 756, at least one dropdown menu 758, and/or the like. In some non-limiting embodiments, a user may input (e.g., select and/or the like) at least a portion of the fifth input (e.g., associated with the (first) action data) by selecting a first (e.g., left) button 754 associated with inputting a link associated with a respective action. Additionally or alternatively, a user may input (e.g., select and/or the like) at least a portion of the fifth input (e.g., associated with the (first) action data) by selecting a second (e.g., right) button 754 associated with embedding a file associated with a respective action. Additionally or alternatively, the inputted data may be displayed in a respective selectable list item 756. In some non-limiting embodiments, at least one selectable list item 756 may be associated with a respective parameter by selecting the respective parameter from a respective dropdown menu 758 associated with the respective selectable list item 756. Additionally or alternatively, at least one selectable list item 756 may be associated with time data (e.g., for performing the action based on some time criterion, such as commanding an industrial machine to perform a process for an inputted period of time, starting a media item at an inputted time stamp, and/or the like) by typing in a respective textbox 752 associated with the respective selectable list item 756.

Figure 7F:
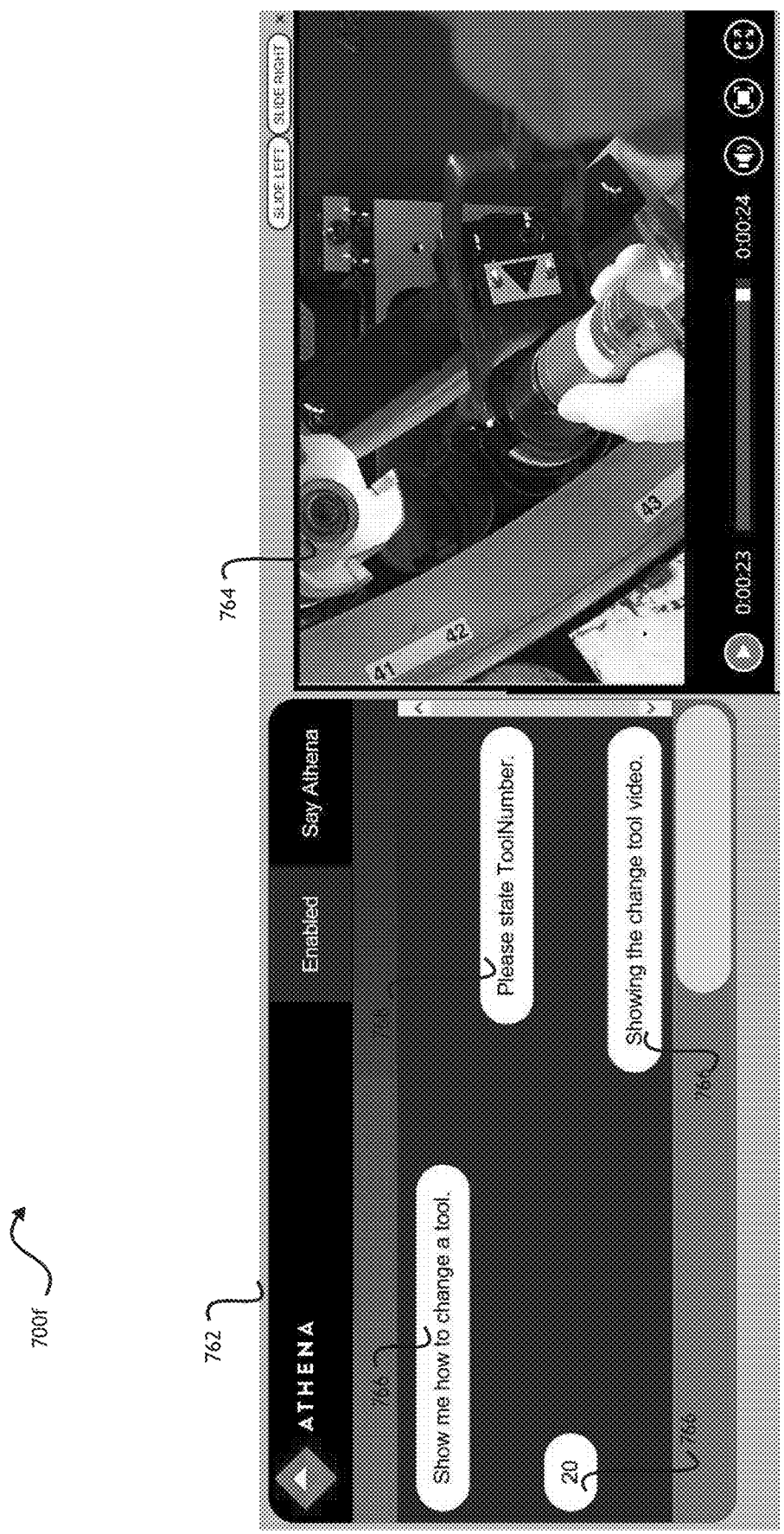

As shown in FIG. 7F, a dialogue window 762 may show natural language inputs 766 from a user and responses 768 from intelligent industrial assistant 102 based on at least one dialogue template. For example, the natural language inputs 766 from the user may be mapped to the dialogue template(s). Additionally or alternatively, e.g., based on action data associated with the dialogue template(s), media player 764 may play a media item (e.g., video and/or the like) in response to the natural language inputs 766 from the user.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for developing at least one dialogue template for an intelligent industrial assistant, comprising:
displaying, with at least one processor, a first set of graphical elements of a graphical user interface;
receiving, by the first set of graphical elements of the graphical user interface, first group identification data associated with a first group of features associated with a first industrial machine, the first group identification data comprising at least one identifier of the first industrial machine;
in response to receiving the first group identification data, displaying, with at least one processor, a second set of graphical elements of the graphical user interface;
receiving, by the second set of graphical elements of the graphical user interface, first feature identification data associated with a first feature of the first group of features;
in response to receiving the first feature identification data, displaying, with at least one processor, a third set of graphical elements of the graphical user interface;
receiving, by the third set of graphical elements of the graphical user interface, first sequence identification data associated with a first sequence performable by the intelligent industrial assistant based on the first feature;
in response to receiving the first sequence identification data, displaying, with at least one processor, a fourth set of graphical elements of the graphical user interface;
receiving, by the fourth set of graphical elements of the graphical user interface, first expected dialogue data associated with first expected dialogue of the first sequence, the first expected dialogue data comprising parameter data associated with at least one parameter of the first expected dialogue data;
in response to receiving the first expected dialogue data, displaying, with at least one processor, a fifth set of graphical elements of the graphical user interface;
receiving, by the fifth set of graphical elements of the graphical user interface, action data associated with at least one action of the first sequence;
receiving, by the graphical user interface, second sequence identification data associated with a second sequence performable by the intelligent industrial assistant based on the first feature; and
receiving, by the graphical user interface, second expected dialogue data associated with second expected dialogue of the second sequence, wherein an ending step of the first expected dialogue data matches a starting step of the second expected dialogue data to link the first sequence to the second sequence, wherein the first feature comprises a complex feature comprising the first sequence as a prerequisite to the second sequence such that the second sequence is only started by a user input associated with the second expected dialogue data after the ending step of the first expected dialogue data; and generating, with at least one processor, a first dialogue template based on the first group identification data, the first feature identification data, the first sequence identification data, the first expected dialogue data, the action data, the second sequence identification data, and the second expected dialogue data.

2. The method of claim 1, further comprising:
adding the first dialogue template to package data for the intelligent industrial assistant; and
communicating the package data to the intelligent industrial assistant.

3. The method of claim 1, further comprising:
communicating the first dialogue template to the intelligent industrial assistant, wherein the intelligent industrial assistant adds the first dialogue template to package data of the intelligent industrial assistant.

4. The method of claim 1, further comprising:
displaying, with at least one processor, a first view of the graphical user interface, the first view comprising the first set of graphical elements and the second set of graphical elements.

5. The method of claim 4, further comprising:
displaying, with at least one processor, a second view of the graphical user interface, the second view comprising the third set of graphical elements and a first portion of the fourth set of graphical elements to receive a first portion of the first expected dialogue data, the first portion of the first expected dialogue data comprising expected initiating dialogue data associated with at least one phrase for initiating the first sequence.

6. The method of claim 5, further comprising:
displaying, with at least one processor, a third view of the graphical user interface, the third view comprising a second portion of the fourth set of graphical elements to receive a second portion of the first expected dialogue data, the second portion of the first expected dialogue data comprising the parameter data associated with the at least one parameter of the first expected dialogue data.

7. The method of claim 6, further comprising:
displaying, with at least one processor, a fourth view of the graphical user interface, the fourth view comprising a third portion of the fourth set of graphical elements to receive a third portion of the first expected dialogue data, the third portion of the first expected dialogue data comprising script data based on the at least one parameter of the first expected dialogue data.

8. The method of claim 7, further comprising:
displaying, with at least one processor, a fifth view of the graphical user interface, the fifth view comprising the fifth set of graphical elements to receive the action data based on the first sequence identification data and the at least one parameter of the first expected dialogue data.

9. The method of claim 1, wherein the action data comprises at least one of an audio output of the intelligent industrial assistant, a media item for display by the intelligent industrial assistant, a tabular list for display by the intelligent industrial assistant, a report template for outputting by the intelligent industrial assistant, a machine interface for accessing by the intelligent industrial assistant, a database interface for accessing by the intelligent industrial assistant, or a combination thereof.

10. The method of claim 1, further comprising verifying, with at least one processor, the first dialogue template does not contain errors.

11. The method of claim 1, further comprising:
receiving, with at least one processor, language data associated with at least one language associated with at least one of the first group identification data, the first feature identification data, the first sequence identification data, or a combination thereof.

12. The method of claim 1, further comprising:
communicating the first dialogue template to a remote system, wherein the remote system adds the first dialogue template to package data for the intelligent industrial assistant.

13. The method of claim 12, wherein the remote system communicates the package data to the intelligent industrial assistant.

14. A system for developing at least one dialogue template for an intelligent industrial assistant, comprising:
at least one processor; and
at least one non-transitory computer readable medium comprising instructions to direct the at least one processor to:
display a first set of graphical elements of a graphical user interface;
receive, by the first set of graphical elements of the graphical user interface, first group identification data associated with a first group of features associated with a first industrial machine, the first group identification data comprising at least one identifier of the first industrial machine;
in response to receiving the first group identification data, display a second set of graphical elements of the graphical user interface;
receive, by the second set of graphical elements of the graphical user interface, first feature identification data associated with a first feature of the first group of features;
in response to receiving the first feature identification data, display a third set of graphical elements of the graphical user interface;
receive, by the third set of graphical elements of the graphical user interface, first sequence identification data associated with a first sequence performable by the intelligent industrial assistant based on the first feature;
in response to receiving the first sequence identification data, display a fourth set of graphical elements of the graphical user interface;
receive, by the fourth set of graphical elements of the graphical user interface, first expected dialogue data associated with first expected dialogue of the first sequence, the first expected dialogue data comprising parameter data associated with at least one parameter of the first expected dialogue data;
in response to receiving the first expected dialogue data, display a fifth set of graphical elements of the graphical user interface;
receive, by the fifth set of graphical elements of the graphical user interface, action data associated with at least one action of the first sequence;
receive, by the graphical user interface, second sequence identification data associated with a second sequence performable by the intelligent industrial assistant based on the first feature; and
receive, by the graphical user interface, second expected dialogue data associated with second expected dialogue of the second sequence, wherein an ending step of the first expected dialogue data matches a starting step of the second expected dialogue data to link the first sequence to the second sequence, wherein the first feature comprises a complex feature comprising the first sequence as a prerequisite to the second sequence such that the second sequence is only started by a user input associated with the second expected dialogue data after the ending step of the first expected dialogue data; and
generate a first dialogue template based on the first group identification data, the first feature identification data, the first sequence identification data, the first expected dialogue data, the action data, the second sequence identification data, and the second expected dialogue data.

15. A computer program product for developing at least one dialogue template for an intelligent industrial assistant, the computer program product comprising at least one non-transitory computer-readable medium including one or more instructions that, when executed by at least one processor, cause the at least one processor to:
display a first set of graphical elements of a graphical user interface;
receive, by the first set of graphical elements of the graphical user interface, first group identification data associated with a first group of features associated with a first industrial machine, the first group identification data comprising at least one identifier of the first industrial machine;
in response to receiving the first group identification data, display a second set of graphical elements of the graphical user interface;
receive, by the second set of graphical elements of the graphical user interface, first feature identification data associated with a first feature of the first group of features;
in response to receiving the first feature identification data, display a third set of graphical elements of the graphical user interface;
receive, by the third set of graphical elements of the graphical user interface, first sequence identification data associated with a first sequence performable by the intelligent industrial assistant based on the first feature;
in response to receiving the first sequence identification data, display a fourth set of graphical elements of the graphical user interface;
receive, by the fourth set of graphical elements of the graphical user interface, first expected dialogue data associated with first expected dialogue of the first sequence, the first expected dialogue data comprising parameter data associated with at least one parameter of the first expected dialogue data;
in response to receiving the first expected dialogue data, display a fifth set of graphical elements of the graphical user interface;
receive, by the fifth set of graphical elements of the graphical user interface, action data associated with at least one action of the first sequence; and
receive, by the graphical user interface, second sequence identification data associated with a second sequence performable by the intelligent industrial assistant based on the first feature; and
receive, by the graphical user interface, second expected dialogue data associated with second expected dialogue of the second sequence, wherein an ending step of the first expected dialogue data matches a starting step of the second expected dialogue data to link the first sequence to the second sequence, wherein the first feature comprises a complex feature comprising the first sequence as a prerequisite to the second sequence such that the second sequence is only started by a user input associated with the second expected dialogue data after the ending step of the first expected dialogue data; and generate a first dialogue template based on the first group identification data, the first feature identification data, the first sequence identification data, the first expected dialogue data, the action data, the second sequence identification data, and the second expected dialogue data.

\* \* \* \* \*